(12) United States Patent
Hatami-Hanza

(10) Patent No.: US 10,795,949 B2
(45) Date of Patent: Oct. 6, 2020

(54) METHODS AND SYSTEMS FOR INVESTIGATION OF COMPOSITIONS OF ONTOLOGICAL SUBJECTS AND INTELLIGENT SYSTEMS THEREFROM

(71) Applicant: Hamid Hatami-Hanza, Thornhill (CA)

(72) Inventor: Hamid Hatami-Hanza, Thornhill (CA)

(73) Assignee: Hamid Hatami-Hanza, Thornhill, Ontario (CA)

( * ) Notice: Subject to any disclaimer, the term of this patent is extended or adjusted under 35 U.S.C. 154(b) by 455 days.

(21) Appl. No.: 15/597,080

(22) Filed: May 16, 2017

(65) Prior Publication Data

US 2017/0249387 A1 Aug. 31, 2017

Related U.S. Application Data

(60) Continuation-in-part of application No. 14/694,887, filed on Apr. 23, 2015, now Pat. No. 9,684,678, and a continuation of application No. 14/607,588, filed on Jan. 28, 2015, now Pat. No. 9,842,129, and a continuation of application No. 14/274,731, filed on May 11, 2014, now abandoned, and a continuation of application No. 14/151,022, filed on Jan. 9, 2014, (Continued)

(30) Foreign Application Priority Data

Jul. 26, 2007 (CA) ........................... 2595541

(51) Int. Cl.
*G06Q 10/10* (2012.01)
*G06F 16/951* (2019.01)
*G06F 16/00* (2019.01)
*G06N 5/02* (2006.01)
*G06N 3/08* (2006.01)
*G06F 17/21* (2006.01)
*H04L 29/06* (2006.01)

(52) U.S. Cl.
CPC ............ *G06F 16/951* (2019.01); *G06F 16/00* (2019.01); *G06N 3/08* (2013.01); *G06N 5/02* (2013.01)

(58) Field of Classification Search
USPC ........................... 705/7.11; 382/254; 706/46
See application file for complete search history.

(56) References Cited

U.S. PATENT DOCUMENTS 7,257,767 B1 * 8/2007 Carden, Jr. ........... G06F 40/151
715/234
2002/0146178 A1 * 10/2002 Bolle ................. G06K 9/00067
382/254

(Continued)

*Primary Examiner* — Oluseye Iwarere
*Assistant Examiner* — Reva R Moore

(57) ABSTRACT

Methods and systems are given for investigation of compositions of ontological subjects in accordance with various aspects of significance. Accordingly, the present invention provide a unified method and process of investigating the compositions of ontological subjects, modeling an unknown system, and obtaining as much worthwhile information and knowledge as possible about the system or the composition or the body of knowledge along with exemplary services utilizing such investigations. The data structures built and the knowledge acquired by a machine through executing the investigation methods of the present disclosure enables artificial intelligent systems, machines, and agents to perform intelligent tasks and jobs.

18 Claims, 18 Drawing Sheets

Related U.S. Application Data now Pat. No. 9,613,138, and a continuation of application No. 14/018,102, filed on Sep. 4, 2013, now abandoned, and a continuation-in-part of application No. 13/962,895, filed on Aug. 8, 2013, now Pat. No. 8,793,253, and a continuation of application No. 13/789,644, filed on Mar. 7, 2013, now Pat. No. 9,069,828, and a division of application No. 13/740,228, filed on Jan. 13, 2013, now Pat. No. 9,183,505, and a continuation-in-part of application No. 13/608,333, filed on Sep. 10, 2012, now Pat. No. 9,070,087, and a continuation of application No. 12/955,496, filed on Nov. 29, 2010, now Pat. No. 8,775,365, and a division of application No. 12/946,838, filed on Nov. 15, 2010, now Pat. No. 8,560,599, and a division of application No. 12/939,112, filed on Nov. 3, 2010, now Pat. No. 8,401,980, and a continuation of application No. 12/908,856, filed on Oct. 20, 2010, now abandoned, and a division of application No. 12/755,415, filed on Apr. 7, 2010, now Pat. No. 8,612,445, and a continuation of application No. 12/547,879, filed on Aug. 26, 2009, now Pat. No. 8,452,725.

(60) Provisional application No. 61/546,054, filed on Oct. 11, 2011, provisional application No. 61/311,368, filed on Mar. 7, 2010, provisional application No. 61/263,685, filed on Nov. 23, 2009, provisional application No. 61/259,640, filed on Nov. 10, 2009, provisional application No. 61/253,511, filed on Oct. 21, 2009, provisional application No. 61/177,696, filed on May 13, 2009, provisional application No. 61/093,952, filed on Sep. 3, 2008.

(56) References Cited

U.S. PATENT DOCUMENTS

| | | | |
|---|---|---|---|
| 2006/0031217 A1* | 2/2006 | Smith | G06K 9/00711 |
| 2006/0116926 A1* | 6/2006 | Chen | G06Q 30/0247 |
| | | | 705/14.23 |
| 2007/0112714 A1* | 5/2007 | Fairweather | G06F 9/4493 |
| | | | 706/46 |

* cited by examiner $$asm_{ij}^{k|l} = f\left(com_{ij}^{k|l}, vsm_i^{k|l}, vsm_j^{k|l}\right) \quad \ldots \quad i,j = 1..N$$

$vsm_i^{k|l}$: *value significance of* $OS_i^k$ $com_{ij}^{k|l}$: *The Co − Occurance number of* $OS_i^k$ *with* $OS_j^k$ *in* $OS^l$ *s*

$asm_{ij}^{k|l}$: *The association Strength of* $OS_i^k$ *with* $OS_j^k$ $$ASM^{1|1} = \begin{array}{c} \\ OS_1^1 \\ \vdots \\ OS_i^1 \\ \vdots \\ OS_N^1 \end{array} \overset{\begin{array}{ccccc} OS_1^1 & \cdots & OS_j^1 & \cdots & OS_N^1 \end{array}}{\begin{pmatrix} asm_{11} & \cdots & asm_{1j} & \cdots & asm_{1N} \\ & & \vdots & & \\ asm_{i1} & \cdots & asm_{ij} & \cdots & asm_{iN} \\ & & \vdots & & \\ asm_{N1} & \cdots & asm_{Nj} & \cdots & asm_{NN} \end{pmatrix}} \begin{array}{l} \\ \\ \rightarrow RVSM\_2_i^{1|1} \\ \\ \end{array}$$

$\rightarrow RVSM\_1_j^{1|1}$ $$\left(RVSM\_1_{j,:}^{2\rightarrow 1|1}\right)^T = (PM12)^T \times RVSM\_1_j^{1|1} =$$

$$\begin{array}{c} OS_1^2 \\ \vdots \\ OS_j^2 \\ \vdots \\ OS_M^2 \end{array} \overset{\begin{array}{ccccc} OS_1^1 & \cdots & OS_i^1 & \cdots & OS_N^1 \end{array}}{\begin{pmatrix} pm_{11}^{12} & \cdots & pm_{1i}^{12} & \cdots & pm_{1N}^{12} \\ & & \vdots & & \\ pm_{j1}^{12} & \cdots & pm_{ji}^{12} & \cdots & pm_{jN}^{12} \\ & & \vdots & & \\ pm_{1M}^{12} & \cdots & pm_{Mi}^{12} & \cdots & pm_{MN}^{12} \end{pmatrix}} \times RVSM\_1_j^{1|1}$$

$$\left(RVSM\_2_{i,:}^{2\rightarrow 1|1}\right)^T = \left(RVSM\_2_i^{1|1}\right) \times PM12 = \left(RVSM\_2_i^{1|1}\right) \times$$

$$\begin{array}{c} OS_1^1 \\ \vdots \\ OS_i^1 \\ \vdots \\ OS_N^1 \end{array} \overset{\begin{array}{ccccc} OS_1^2 & \cdots & OS_j^2 & \cdots & OS_M^2 \end{array}}{\begin{pmatrix} pm_{11}^{12} & \cdots & pm_{1j}^{12} & \cdots & pm_{1M}^{12} \\ & & \vdots & & \\ pm_{i1}^{12} & \cdots & pm_{ij}^{12} & \cdots & pm_{iN}^{12} \\ & & \vdots & & \\ pm_{N1}^{12} & \cdots & pm_{Nj}^{12} & \cdots & pm_{NN}^{12} \end{pmatrix}}$$

FIG. 7

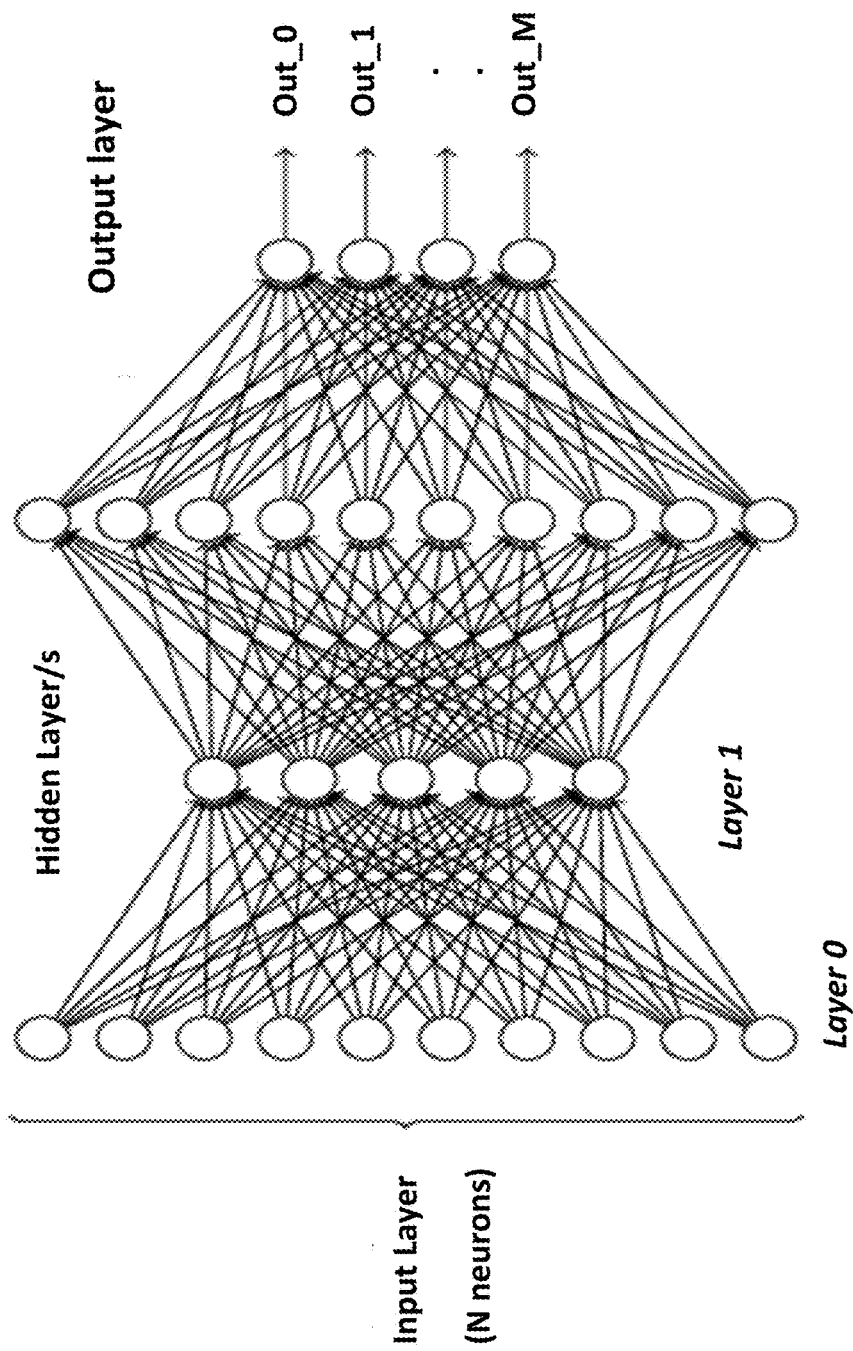
FIG. 11-A

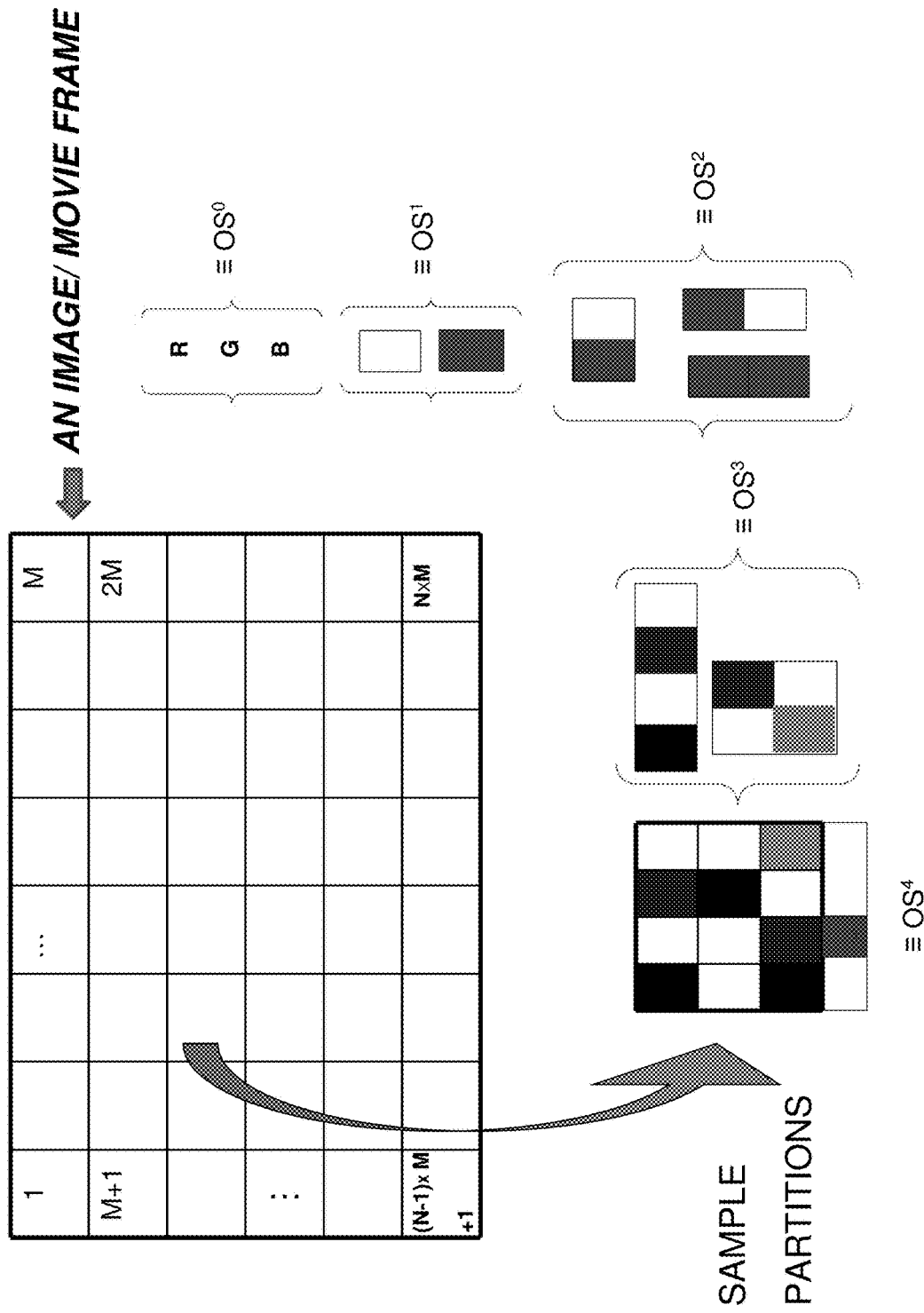
FIG 11-B

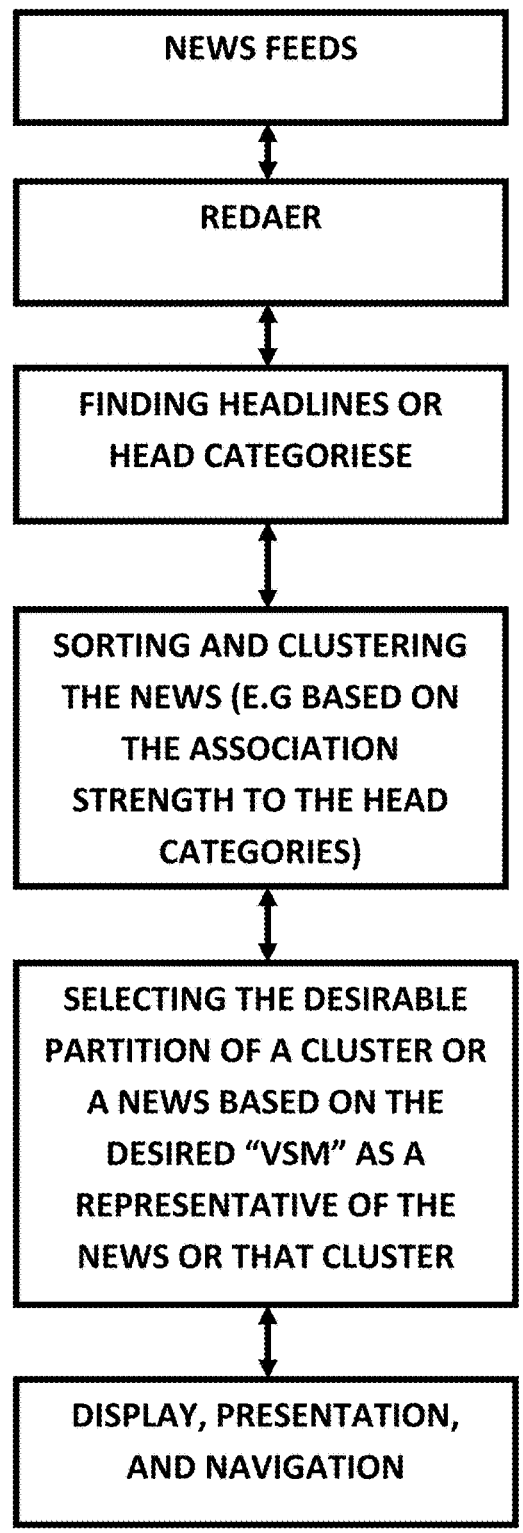
FIG. 11-C

METHODS AND SYSTEMS FOR INVESTIGATION OF COMPOSITIONS OF ONTOLOGICAL SUBJECTS AND INTELLIGENT SYSTEMS THEREFROM

CROSS-REFERENCED TO RELATED APPLICATIONS

This application is a continuation in part of and claims the benefits of the U.S. patent application Ser. No. 14/694,887 entitled "Methods and Systems For investigation Of Compositions of Ontological Subjects" filed on Apr. 23, 2015 which claims the priority and the benefits from the U.S. patent application Ser. No. 13/608,333 entitled "Methods and Systems For investigation Of Compositions of Ontological Subjects" filed on Sep. 10, 2012, which claims priority to U.S. provisional patent application No. 61/546,054 filed on Oct. 10, 2011 entitled the same, and which also cross-referenced and claimed the benefits of:

the U.S. patent application Ser. No. 12/179,363 entitled "ASSISTED KNOWLEDGE DISCOVERY AND PUBLICATION SYSTEM AND METHOD", filed on Jul. 24-2008, which claims priority from Canadian Patent Application Ser. No CA 2,595,541, filed on Jul. 26, 2007, entitled the same; and the U.S. patent application Ser. No. 13/789,644 filed on Mar. 7, 2013 which is a continuation of U.S. patent application Ser. No. 12/547,879 filed on Aug. 26, 2009, now U.S. Pat. No. 8,452,725, entitled "SYSTEM AND METHOD OF ONTOLOGICAL SUBJECT MAPPING FOR KNOWLEDGE PROCESSING APPLICATIONS", which claims priority from the U.S. provisional patent application No. 61/093,952 filed on Sep. 3, 2008, entitled the same; and the U.S. patent application Ser. No. 14,151,022 filed on Jan. 9, 2014 which is a continuation in part of the U.S. patent application Ser. No. 13/962,895, now U.S. Pat. No. 8,983,897, filed on Aug. 8, 2013, entitled "UNIFIED SEMANTIC RANKING OF COMPOSITIONS OF ONTOLOGICAL SUBJECTS" which is a divisional of and claims the benefit of the U.S. patent application Ser. No. 12/755,415, now U.S. Pat. No. 8,612,445, filed on Apr. 7, 2010, which claims priority from U.S. provisional patent application No. 61/177,696 filed on May 13, 2009 entitled: "System and Method for a Unified Semantic Ranking of Compositions of Ontological Subjects and the Applications Thereof"; and the U.S. patent application Ser. No. 12/908,856 entitled "SYSTEM AND METHOD OF CONTENT GENERATION", filed on Oct. 20, 2010, which claims priority from U.S. provisional application No. 61/253,511 filed on Oct. 21, 2009, entitled the same; and the U.S. patent application Ser. No. 14/607,588, filed on Feb. 7, 215, entitled "Association strengths and value significances of ontological subjects of networks and compositions" which is a divisional of and claims the benefits of the U.S. patent application Ser. No. 13/740,228, filed on Jan. 13, 2013, entitled "SYSTEM AND METHOD FOR VALUE SIGNIFICANCE EVALUATION OF ONTOLOGICAL SUBJECTS OF NETWORKS AND THE APPLICATION THEREOF" which is a divisional of and claims the benefits of the U.S. patent application Ser. No. 12/939,112, filed on Nov. 3, 2010, now U.S. Pat. No. 8,401,980, entitled "METHODS FOR DETERMINING CONTEXT OF COMPOSITIONS OF ONTOLOGICAL SUBJECTS AND THE APPLICATIONS THEREOF USING VALUE SIGNIFICANCE MEASURES (VSMS), CO-OCCURRENCES AND FREQUENCY OF OCCURRENCES OF THE ONTOLOGICAL SUBJECTS SYSTEM", which claims priority from U.S. provisional application No. 61/259,640 filed on Nov. 10, 2009, entitled "SYSTEM AND METHOD FOR VALUE SIGNIFICANCE EVALUATION OF ONTOLOGICAL SUBJECTS OF NETWORKS AND THE APPLICATION THEREOF"; and the U.S. patent application Ser. No. 14/018,102, filed on Sep. 4, 2014, which is a divisional of and claims the benefits of the U.S. patent application Ser. No. 12/946,838, filed on Nov. 15, 2010, now U.S. Pat. No. 8,560,599 B2 entitled: "AUTOMATIC CONTENT COMPOSITION GENERATION", which claims priority from U.S. provisional application No. 61/263,685 filed on Nov. 23, 2009, entitled "Automatic Content Composition Generation"; and the U.S. patent application Ser. No. 14/247,731, filed on May 11, 214 which is a continuation of the U.S. patent application Ser. No. 12/955,496, filed on Nov. 29, 2010, now U.S. Pat. No. 8,775,365 entitled "INTERACTIVE AND SOCIAL KNOWLEDGE DISCOVERY SESSIONS" which claims priority from U.S. provisional patent application No. 61/311,368 filed on Mar. 7, 2010, entitled "Interactive and Social Knowledge Discovery Sessions", all by the same applicant which are all incorporated entirely as references in this application."; and The U.S. application Ser. No. 14/616,687 entitled "Ontological Subjects Of A Universe And Knowledge Processing Thereof" filed on Feb. 7, 2015.

This application also cross-references and claims the benefits of the co-pending U.S. application Ser. No. 15/589,914 entitled "Ontological Subjects Of A Universe And Knowledge Representations Thereof" filed on May 8, 2017, which is also incorporated here by reference along with the referenced applications therein in their entirety for all purposes.

FIELD OF INVENTION

This invention generally relates to information processing, ontological subject processing, knowledge processing and discovery, computational genomics, knowledge retrieval, artificial intelligence, signal processing, information theory, natural language processing and the applications.

BACKGROUND OF THE INVENTION

In these day and age that data is generated at an unprecedented rate it is very hard for a human operator to analyze large bodies of data in order to extract the real information, the knowledge therein, spot a novelty, and using them to further advance the state of knowledge or discovery of a real knowledge about a subject matter.

For example for any topic or subject there are vast amount of textual, or convertible to textual characters, repositories such as collection of research papers in any particular topic or subject, images, news feeds, interviews, talks, video collections, corporate databases, surveillance pictures and videos, and the like. Gaining any benefit from such unstructured collections of information needs lots of expertise, time, and many years of training just even to separate the facts and extract value out of these immense amounts of data. Not every piece of data is worthy of attention and investigation or investment of expensive times of experts and professionals or data processing resources.

Moreover, there is no guarantee that a human investigator or researcher can accurately analyze the vast collection of documents, data, and information. The results of the investigations are usually biased by the individual's knowledge, experiences, and background. The complexities of relations in the bodies of data limit the throughputs of knowledge-based professionals and the speed at which credible knowledge can be produced. The desired speed or rate of knowledge discovery apparently is much higher than the present rate of knowledge discovery and production.

SUMMARY OF THE INVENTION

There is a need to enhance the art of knowledge discovery and investigation methods in terms of accuracy, effectiveness on unknown compositions, thoroughness, speed, and throughput.

Additionally, in some instances, there could be compositions such as, an alien language composition, a body of knowledge unfamiliar to an individual investigator, a corporate database, a computer code program, a collection of reports, genetic code strings and the like that we do not have any prior information about the meaning and implications of these compositions and the parts therein. Investigating such compositions is of immense interest and value.

It is also very desirable to enable a data processing system, such as a computer system comprise of data processing or computing devices/units, data storage units/devices, and/or environmental data acquisitions units/devices, and/or data communication units/devices, and/or input/output units/devices, and/or limbs, to learn as much information and gain knowledge/data by processing compositions of data of various forms and/or become able to produce new knowledge and useful data or compositions of data and/or autonomous decision making according to some codes of conducts. Such an enabled machine would be of an immense assistance to the development of human civilization much further and much faster leading to abundance, economic prosperity, biological and mental health, and well-being of society in general.

Accordingly, the present invention discloses a systematic, computer implementable, process efficient and scalable method/s of investigation of all types of compositions of ontological subjects such as textual, data files, networks and graphs, genetic codes, any types of string, and the likes. The given methods, algorithms, and services are accompanied with theoretical modeling and mathematical formulations which, once implemented, results in robust and fundamental algorithms and processes for investigating various aspects of a composition and for numerous applications.

According to the teachings of the present invention any compositions of ontological subjects is viewed as an unknown system or system of knowledge that the purpose of the investigation is to obtain as much worthy information and knowledge about such an unknown system.

The present invention therefore investigate the "compositions of ontological subjects" or a "body of knowledge" or a "system of knowledge" (as are called from time to time in this disclosure) by providing the investigation methods for identifying the most significant constituent ontological subjects for a given body of knowledge or the given compositions in respect to one or more significance aspect/s. The significance aspects generally include the "intrinsic significance aspects" and/or "associational/relational significance aspects".

In the general aspect of this invention, conceptual "measures of significances" are disclosed along with their rational and justifications. These conceptual "measures of significances" further are accompanied with systematic methods of calculation and quantifications of their values in order to provide the instrumental tools in implementations/utilization of the disclosed method/s of the investigation of compositions of ontological subjects. These measures are, for example, called "value significance measures" (VSM/s in short), "association strength measures" (or ASM for short), "novelty value significance measures" (or NVSM for short), and/or "relational/associational" type measures, and various combinations of them (referred herein as XY_VSM in general form) that are used to find and spot the "aspectual significant" parts or partitions of the composition for further investigation and/or further processing and/or presentation to a client.

According to one general embodiment of the disclosed method/s of the present invention, a composition of ontological subjects or a body of knowledge is break down to it's constituent ontological subjects which are grouped in different set which each set labeled with different orders, from which one or more array of data, respective of the information of the participations of the constituent ontological subjects of different orders into each other, are formed. The data therefore is used to evaluate various significance values of the constituent ontological subjects of the different order according to the disclosed measures of various aspects of significance.

Accordingly, in one aspect of the present invention, measure/s are given for valuation of "value significances" of the ontological subjects of the composition. These values are intrinsic values of the ontological subjects of the composition based on their significance role which is calculated from the participations pattern/s of the ontological subjects of the composition with each other.

In another aspect various measures of "association strength" are given from which the relations of ontological subjects of the composition can be revealed. Algorithms and formulations and calculation methods are given to evaluate such "association strength" according to various exemplary association aspects.

According to another aspect of the present invention measures are given for evaluating the "relational association strengths" of the ontological subjects of different orders to each other or to one or more target ontological subject.

According to another aspect of the present invention measures are given for evaluating the "relational value significances" of the ontological subjects of different orders to each other or to one or more target ontological subject.

According to another aspect of the invention, various types of measures are given to evaluate the "novelty value significances" of the ontological subjects of the composition or the body of knowledge. Method/s are, therefore, given for efficient calculations and processing and presentation of the results.

Accordingly, in yet another aspect of the invention, various measure of the "relational novelty value significances" are given for evaluating one type of the general "novelty value significances" in relation to one or more target ontological subjects of the composition or the body of knowledge.

According to yet another aspect of the invention various measure of the "associational novelty value significances" are given for evaluating another type of the general "novelty value significance" involving the association of one or more target ontological subjects of the composition or the body of knowledge.

According to yet another aspect of the invention various measure of the "intrinsic novelty value significances" are given for evaluating yet another type of "novel value significance" which is an intrinsic novelty value of one or more of ontological subjects of the composition or the body of knowledge.

According to another aspect of the invention, the values are assigned to a predetermined list of ontological subjects (e.g. one or more of the special words that usually are used to express a particular attribute such as a novelty or a reasoning or concluding remarks, such as 'therefore, consequently, in spite of, . . . however, but, . . . etc.). These are called "special significance conveyers" to pre-selectedly amplify or dampen the significances of such special OSs of a composition in eth final output or result.

Furthermore, specific examples and general forms and methods are given as how to synthesize and/or shape a desired from of a "value significance measure" and how to build and calculate the respective filter for that "value significance measure" by combining one or more of the USM vectors of one or more type or number of the XY-VSM.

These various "XY-value significance measures" then can be employed in many applications for which at least one "aspectual significance measure" is of interest and importance. Depends on the desired application one can use the applicable and desirable embodiments for the intended application such as web page ranking, document clustering, single and multi-document summarization/distillation, question answering, graphical representation of the compositions, context extraction and representation, knowledge discovery, novelty detection, composing new compositions, engineering new compositions, composition comparison, approximate reasoning, artificial intelligence, robotic, robotics vision, human/computer interaction, computer conversation, as well as other areas of science and technology such as genetic analysis and synthesize, signal processing, economics, marketing, customer care, and the like.

Along the disclosure, methods, formulations, and algorithms are given for efficient and versatile computer implementable evaluation of the various "value significance measures" of ontological subject of different orders used in a system of knowledge. In essence, using the participation information of a set of lower order OSs into a set of the same or higher order OSs, the present invention provide a unified method and process of investigating the compositions of ontological subjects, modeling an unknown system, and obtaining as much worthwhile information and knowledge as possible about the system or the composition or the body of knowledge. The "aspectual investigation's goals" can be wide-open, however, in light of the teachings of the present invention becomes a straightforward, implementable, and practical possibility.

Accordingly, in another aspect of the invention, a number of exemplary applications are described and presented with the illustrating block diagrams of the method and algorithm along with the associated systems for performing such applications. These applications and systems are presented to exemplify the way that the present invention's methods of investigations might be employed to perform one or more of the desired processes to get the respective output or the content, answer, data, graphs, analysis, etc.

Therefore beside that an ontological subjects of a composition is not only represented by a string of characters but also there would be additional vast information available for the ontological subject corresponding to its type/s of significance and relationship with other ontological subjects of the composition. Said additional information or data is learnt, through implementing the methods of current disclosure and the incorporated references herein, from the ways these ontological subjects being used or composed together to make up a composition or more generally to form a body of knowledge.

These information, data, or values of different objects of this disclosure (e.g. association strength measures, significance measure etc.) are placed in one or more data structures which can be representative of data arrays corresponding to vectors or matrix for convenience of calculations by data processing devices. The data processing devices to carry out the calculations, storing, and data transportation between the various part of one or more computer systems can be selected from such technologies such as electronic or optical based processors, semiconductor based or quantum computers, application specific processing devices and the like. Different embodiments are given for ease of calculations and processing the data of said one or more data structures or vectors or matrices than can be implement with information, computing, or data processing systems of certain processing speeds and/or storage media access speed and capacities such as certain RAM capacity, SSD, HD, and/or optical memories and the like with required access time.

In this way the implicit information not recognizable, useable, or appreciable by a human (due to inherent biological limitations) can be extracted, stored and become useable by a data processing system or machine. Said data processing system or machine therefore will become able to use its superior processing speed and unmatched, by human, memory capacity or environmental data acquisition capabilities, to perform intelligent tasks. Examples of such intelligent tasks could be, but of course not limited to, conversing intelligently or evaluating a merit of a composition, recognizing visual objects, DNA analysis, knowledge discovery, automatic research and discovery, or composing an essay or a multimedia content, decision making, automatic knowledge discovery, controlling physical action/reaction of a machine of its limbs, management of tasks and sessions, autonomous navigation, and in general such tasks that currently can only be done by human being. Intelligent beings (or artificially intelligent beings) of various kinds, technologies, and forms, (e.g. a humanoid robot maid, a genetically modified being, a transportation intelligent beings such a an autonomous car or an autonomous agricultural machine, a robotic explorer, etc.), are exemplary beneficiaries of implementing and employing the methods and systems of the current disclosure.

More illustrating application system examples are further given to illustrate the application of the methods and systems of this disclosure in implementing neural networks more efficiently and processing images for such applications such as image recognition and environmental knowledge acquisition through visual data files.

All the methods, the systems and applications of this disclosure are used to implement a real and useful intelligent being which is capable performing intelligent tasks, such as recognition of objects, conversing with human client/user/master, reasoning, new knowledge discovery, navigation instructions, and all types of intelligent assistant systems, either by imbedding the software and computable/executable codes into a desired system or by specific physical building of such systems.

According to another aspect of the present invention, there are provided embodiments for using the investigation methods of compositions and bodies of knowledge to build and initialize a machine learning neural networks and training such networks. Further embodiments and exemplary methods and systems are given for using the methods of this disclosure in image and visual content processing.

Further, in another aspect, the invention provides data processing systems comprising computer hardware, software, internet infrastructure, and other customary appliances of an E-business, cloud computing, distributed networks, and services to perform and execute said methods in providing a variety of services for a client/user's desired applications or to provide a needed or requested data to a human/agent client.

BRIEF DESCRIPTION OF THE DRAWINGS

FIG. 7: shows one exemplary instance of implementing the formulations and algorithm/s illustrating one way of using the "participation matrix" (PM) and the "association strength matrix" (ASM) to calculate the two different types of the associations strength of the OSs of order 2 to the OSs of the order 1, according to one embodiment of the present invention. This Figure is to demonstrate the use of various VSM vectors (filters) in the calculations.

FIG. 11-A: shows an exemplary application and realization of the disclosed method using a neural network in which the connection weight between neurons is adjusted using the various associations strengths measure according to the teaching of this disclosure a block diagram of an exemplary application for investigation of a body of news feeds.

FIG. 11-B: illustrate an exemplary application and realization of the disclosed method in investigation visual compositions such as images/movie frames/pictures composed of data of corresponding to the constituent pixels. One exemplary choice of partitioning an image is given. Dark or white rectangles are indicatives of a pixels. All the investigation methods of this disclosure are therefore can be used to investigate and process an image or set of images (e.g. a video clip).

FIG. 11-C: is a block diagram of an exemplary application for investigation of a body of news feeds.

DETAILED DESCRIPTION

I—Intruduction

Figure 1:
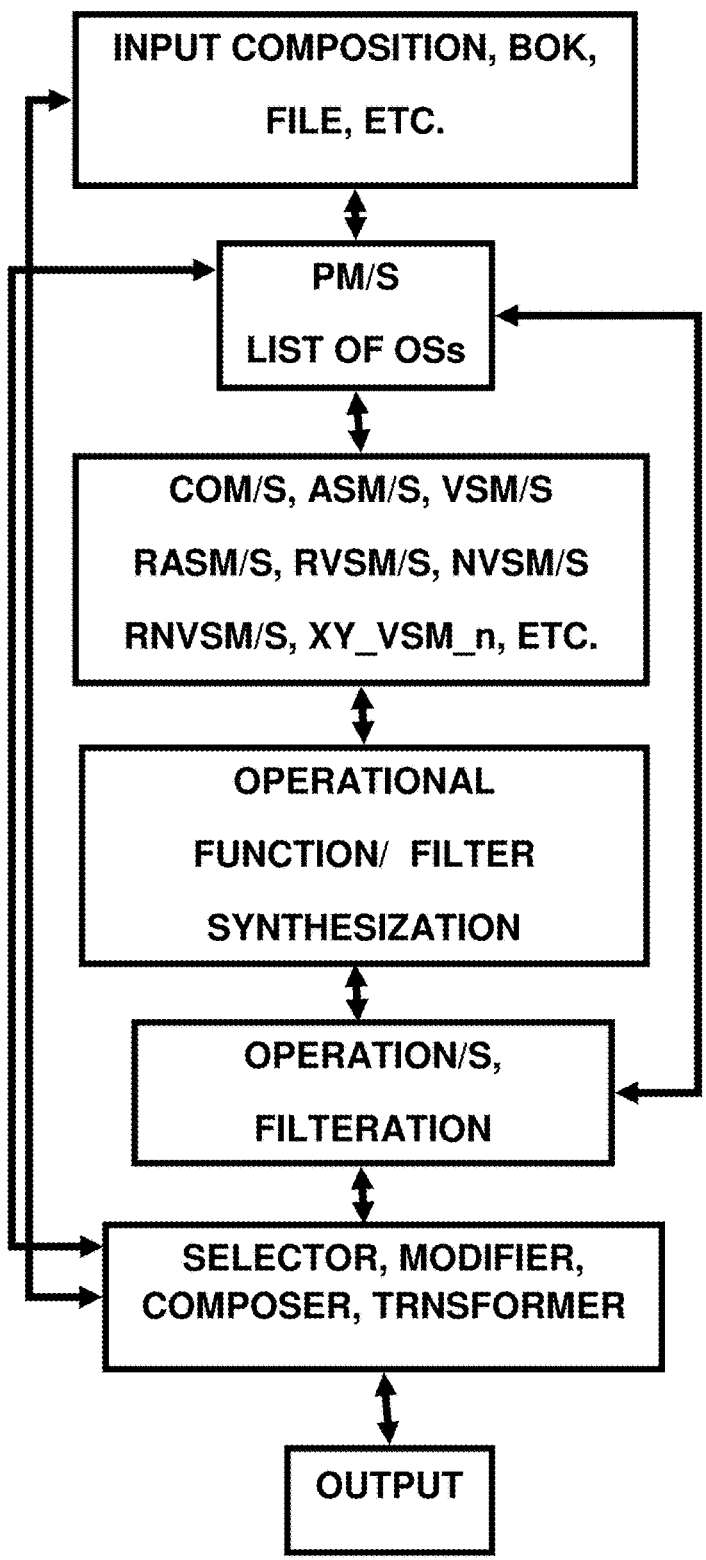
FIG. 1: shows one exemplary block diagram of a system or a software artifact that generates various outputs from a body of knowledge or a composition according to one embodiment of the present invention.

A system of knowledge, here, means a composition or a body of knowledge in any field, narrow or wide, composed of data symbols such as alphabetical/numerical characters, any array of data, binary or otherwise, or any string of data etc. In this disclosure, however, for the sake and ease of explanation and comprehension, we mostly exemplify the compositions and bodies of knowledge with those that are expressed in natural language symbols with textual characters Accordingly, for instance a system of knowledge can be defined about the process of stem cell differentiation. In this example there are many unknowns that are desired to be known. So consider someone has collected many or all textual compositions about this subject. Apparently the collections contains many useful information about the subject that are important but can easily be overlooked by a human due to the limitations of processing capability and memory capacity of individuals' brains.

Another example of a body of knowledge according to the given definitions is a picture or a video signal. A picture or a video frame is consists of colored pixels that have participated in a picture to form and convey the information about the picture. Apparently some colored pixels of the picture are more significant or play a more distinguishing role in that picture. Moreover their combination or the way or the pattern that they participate together in any small parts or segments of that picture are also important in the way the pixels are conveying the information about the picture to an observer's eyes or a camera.

Yet another example of a composition or a body of knowledge could be a string of genetic codes, a DNA string, or a DNA strand, a whole genome, and the like.

Moreover any system, simple or complicated, can be identified and explained by its constituent parts and the relation between the parts. Additionally, any system or body of knowledge can also be represented by network/s or graphs that shows the connection and relations of the individual parts of the system. The more accurate and detailed the identification of the parts and their relations the better the system is defined and designed and ultimately the better the corresponding tangible systems will function. Most of the information about any type of existing or new systems can be found in the body of many textual compositions. Nevertheless, these vast bodies of knowledge are unstructured, dispersed, and unclear for non expert in the field.

In the present invention, the purpose of the investigation is to model and gain as much information and knowledge about an unknown system comprised of ontological subjects while the source of the information about such a system is a given composition of ontological subjects wherein the composition is readable by a computer. Therefore, some information about such an unknown system is supposedly embedded in a body of knowledge or system of knowledge or generally in the given composition. The investigator, hence, will have to be able to capture or produce as much knowledge about the system from the information in the given composition.

Consequently, according to the present disclosure, the investigation is performed according to at least one significant/important aspect in the investigation of bodies of knowledge (i.e. compositions).

The "investigation important aspect" can, for example, be one or more of the following goals:

1. identifying and recognizing the most significant constitutes parts of the bodies of knowledge according to at least one "significance aspect",
2. identifying the associated constituent parts of the bodies of knowledge, and
3. identifying and/or finding (through discovery and/or reasoning) the informative constituent parts and informative combinations of the constituent parts of the composition by, for example, finding or composing the expressions that show a relationship between two or more of constituent parts of the bodies of knowledge.

Each of these "important aspect" or stages (1, 2, and 3 in the above) of the investigation, of course, can further be break down to two or more stages or steps or be combined together to perform a desirable investigation goal or to define the "investigation important aspect".

For instance, according to one exemplary investigation method embodiment of the present invention, the "investigation important aspect" is to identify a relationship between two or more significant parts of the composition, the investigator may perform the following:

1. identifying the most significant constituent part/s,
2. identifying the associated constituent parts of the bodies of knowledge, and
3. finding or composing expressions that express the relationship between one or more significant parts having certain level of association to one or more of other significant parts.

Therefore depends on the goal of the investigation the "investigation important aspect" can be defined and performed in more detailed processes. The present invention gives a number of such investigation goals and the methods of achieving the desired outcome. Moreover, the present invention provides a variety of tools and investigation methods that enables a user to deal with investigation of compositions of ontological subjects for any kind of goals and any types of the composition.

As defined along this disclosure as well as the incorporated references herein, the constituent parts of the bodies of knowledge are called "Ontological Subjects" (OS). The ontological subjects further are grouped into different sets labeled with orders as will be explained in the definition of section of this disclosure too.

The "significance aspects", based on which the significances of the OSs of compositions are defined and calculated, are various that can be looked at. For instance one "significance aspect" could be an intrinsic significance of an OS which shows the overall or intrinsic significance of an OS in a body of knowledge. Another significance aspect is considered to be a significant aspect in relation or relative to one or more of the OSs of the body of knowledge.

Yet another significance aspect is considered to be an intrinsic novelty value of an OS in a body of knowledge or a composition. And yet another significance aspect is defined as a relative or relational novelty value of an OS related to one or more of the OSs of the body of knowledge or a composition.

Many other desirable significance aspect might be defined by different people depends on the application and the goal of the investigation of a composition or a body of knowledge. Also any combinations of such significance aspects can be regarded as a significance aspect.

Accordingly a "significance aspect" is the orientation that one can use to reason on how to put a significance value on an ontological subject of a composition or a body of knowledge.

In other words, a "significance aspect" is a qualitative quality that can polarize or differentiate the ontological subjects and be used to define "value significance measures" and consequently suggest or construct various value functions or significance weighting functions on the ontological subjects of a composition or a body of knowledge.

These functions, individually or in combination, therefore can be employed and utilized to spot and/or filter out the one or more ontological subjects of a composition or a body of knowledge for different purposes and applications or generally for investigation of bodies of knowledge.

For instance and in accordance with one aspect of the present disclosure, for the purpose of investigation of the compositions of ontological subjects, a general form of evaluating "value significances" of the ontological subjects of a composition or a body of knowledge or a network is given along with a number of exemplified such value significances and their applications. Such investigation method/s will speed up the research process and knowledge discovery, and design cycles by guiding the users to know the substantiality of each part in the system. Consequently dealing with all parts of the system based on the value significance priority or any other predetermined criteria can become a systematic process and more yielding to automation.

As will be explained in the next section, having constructed one or more arrays of data indicative of relations of constituent part, it will become necessary and desirable to spot the significant part and/or separate the parts that their significance is defined in relation to a target part. Thereby relational value significances are defined here. The relational value significances are instrumental in clustering a collection of composition or clustering partitions of composition in regards to one or more of a target OS or the parts of the system of knowledge.

Furthermore exemplary algorithms and systems are given to be used for providing the respective data and/or such application/s as one or more services to the computer program agents as well as human users.

Application of such methods and systems of investigations of compositions of ontological subjects would be very many and various. For example lets say after or before a conference, with many expert participants and many presented papers, one wants to compare the submitted contributing papers, draw some conclusions, and/or get the direction for future research or find the more important subjects to focus on, he or she could use the system, employing the disclosed methods, to find out the value significance of each concept along with their most important associations and interrelations. This is not an easy task for the individuals who do not have many years of experience and a deep and wide breadth of knowledge in the respective domain of knowledge.

Or consider a market research analyst who is assigned to find out the real value of an enterprise by researching the various sources of information. Or rank an enterprise among its competitors by identifying the strength and weakness of the enterprise constituent parts or partitions. Or in another instance an enterprise, a blogger, a website owner, a content publisher, or a Facebook subscriber wants to find out the most valuable or the most interesting contents, comments, or any parts of such discussions. The investigation method of the present invention therefore can provide such information and knowledge with high confidence.

Many other consecutive applications such as searching engines, question answering, summarization, categorization, distillation, computer conversing, artificial intelligence, genetics, etc. can be performed, enhanced, and benefit from having an estimation of the various "value significances" of the partitions of the body of knowledge and a through investigation method of such compositions.

In order to describe the disclosure in details we first define a number of terms that are used frequently throughout this description. For instance, the information bearing symbols are called Ontological Subjects and are defined herein below, along with others terms, in the definitions sections.

I-I—Definitions

This disclosure uses the definitions that were introduced in the U.S. patent application Ser. No. 12/755,415 filed on Apr. 7, 2010, and Ser. No. 12/939,112 filed on Nov. 3, 2010, which are incorporated herein as references, and are recited here again along with more clarifying points according to their usage in this disclosure and the mathematical formulations herein.

1. ONTOLOGICAL SUBJECT: symbol or signal referring to a thing (tangible or otherwise) worthy of knowing about. Therefore Ontological Subject means generally any string of characters, but more specifically, characters, letters, numbers, words, binary codes, bits, mathematical functions, sound signal tracks, video signal tracks, electrical signals, chemical molecules such as DNAs and their parts, or any combinations of them, and more specifically all such string combinations that indicates or refer to an entity, concept, quantity, and the incidences of such entities, concepts, and quantities. In this disclosure Ontological Subject/s and the abbreviation OS or OSs are used interchangeably.

2. ORDERED ONTOLOGICAL SUBJECTS: Ontological Subjects can be divided into sets with different orders depends on their length, attribute, and function. Basically the order is assigned to a group or set of ontological subjects having at least one common predefined attribute, property, attribute, or characteristic. Usually the orders in this disclosure are denoted with alpha numerical characters such as 0, 1, 2, etc or OS1, OS2, etc. or any other combination of characters so as to distinguish one group or set of ontological subjects, having at least one common predefined characteristic, with another set or group of ontological subjects having another at least one common characteristic. This order/s will also be reflected in denoting/corresponding the data objects or the mathematical objects in the formulations to distinguish these data objects in relation to their corresponding ontological subject set or its order, as will be used and introduced throughout this disclosure. For instance, for ontological subjects of textual nature, one may characterizes or label letters as zeroth order OS, words or multiple word phrases as the first order, sentences or multiple word phrases as the second order, paragraphs as the third order, pages or chapters as the fourth order, documents as the fifth order, corpuses as the sixth order OS and so on. As seen the order can be assigned to a group or set of ontological subjects based on at least one common predefined characteristic of the members of the set. So a higher order OS is a combination of, or a set of, lower order OSs or lower order OSs are members of a higher order OS. Equally one can order the genetic codes in different orders of ontological subjects. For instance, the 4 basis of a DNA molecules as the zeroth order OS, the base pairs as the first order, sets of pieces of DNA as the second order, genes as the third order, chromosomes as the fourth order, genomes as the fifth order, sets of similar genomes as the sixth order, sets of sets of genomes as the seventh order and so on. Yet the same can be defined for information bearing signals such as analogue and digital signals representing audio or video information. For instance for digital signals representing a signal, bits (electrical One and Zero) can be defined as zeroth order OS, the bytes as first order, any sets of bytes as third order, and sets of sets of bytes, e.g. a frame, as fourth order OS and so on. Yet in another instance for a picture or a video frame, the pixels with different color can be regarded as first order OS (the RGB values of a pixel can be regarded as zeroth order Oss), a set whose members contain two or more number of pixels (e.g. a segment of a picture) can be regarded as OSs of second order, a set whose members contain of two or more such segments as third order OS, a set whose members contain of two or more such third order OSs as fourth order OS, whole frame as fifth order OS, and a number of frames (like a certain period of duration of a movie such as a clip) as sixth order and so on. Therefore definitions of orders for ontological subjects are arbitrary set of initial definitions that one can stick to in order to make sense of the methods and mathematical formulations presented herein and being able to interpret the consequent results or outcomes in more sensible and familiar language."

More importantly Ontological Subjects can be stored, processed, manipulated, and transported by transferring, transforming, and using matter or energy (equivalent to matter) and hence the OS processing is an instance of physical transformation of materials and energy.

3. COMPOSITION: is an OS composed of constituent ontological subjects of lower or the same order, particularly text documents written in natural language documents, genetic codes, encryption codes, data files, voice files, video files, and any mixture thereof. A collection, or a set, of compositions is also a composition. Therefore a composition is in fact an Ontological Subject of particular order which can be broken to lower order constituent Ontological Subjects. In this disclosure, the preferred exemplary composition is a set of data containing ontological subjects, for example a webpage, papers, documents, books, a set of webpages, sets of PDF articles, multimedia files, or even simply words and phrases. Moreover, compositions and bodies of knowledge are basically the same and are used interchangeably in this disclosure. Compositions are distinctly defined here for assisting the description in more familiar language than a technical language using only the defined OSs notations.

4. PARTITIONS OF COMPOSITION: a partition of a composition, in general, is a part or whole, i.e. a subset, of a composition or collection of compositions. Therefore, a partition is also an Ontological Subject having the same or lower order than the composition as an OS. More specifically in the case of textual compositions, parts or partitions of a composition can be chosen to be characters, words, sentences, paragraphs, chapters, webpage, documents, etc. A partition of a composition is also any string of symbols representing any form of information bearing signals such as audio or videos, texts, DNA molecules, genetic letters, genes, and any combinations thereof. However one preferred exemplary definition of a partition of a composition in this disclosure is word, sentence, paragraph, page, chapters, documents, sets of documents, and the like, or WebPages, and partitions of a collection of compositions can moreover include one or more of the individual compositions. Partitions are also distinctly defined here for assisting the description in more familiar language than a technical language using only the general OSs definitions.

5. SIGNIFICANCE MEASURE: assigning a quantity, or a number or feature or a metric for an OS from a set of OSs so as to assist to distinguishing or selecting one or more of the OSs from the set. More conveniently and in most cases the significance measure is a type of numerical quantity assigned to a partition of a composition. Therefore significance measures are functions of OSs and one or more other related mathematical objects, wherein a mathematical object can, for instance, be a mathematical object containing information of participations of OSs in each other, whose values are used in the decisions about the constituent OSs of a composition. For instance, "Relational, and/or associational, and/or novel significances" are one form or a type of the general "significance measures" concept and are defined according to one or more the aspect of interest and/or in relation to one or more OSs of the composition.

6. FILTRATION/SUMMARIZATION: is a process of selecting one or more OS from one or more sets of OSs according to predetermined criteria with or without the help of value significance and ranking metric/s. The selection or filtering of one or more OS from a set of OSs is usually done for the purposes of representation of a body of data by a summary as an indicative of that body in respect to one or more aspect of interest. Specifically, therefore, in this disclosure searching through a set of partitions or compositions, and showing the search results according to the predetermined criteria is considered a form of filtration/summarization. In this view finding an answer to a query, e.g. question answering, or finding a composition related or similar to an input composition etc. is also a form of searching through a set of partitions and therefore are a form of summarization or filtration according to the given definitions here.

7. THE USAGE OF QUOTATION MARKS " ": throughout the disclosure several compound names of concepts, variable, functions and mathematical objects and their abbreviations (such as "participation matrix", or PM for short, "Co-Occurrence Matrix", or COM for short, "value significance measure", or VSM for short, and the like) will be introduced, either in singular or plural forms, that once or more is being placed between the quotation marks (" ") for identifying them as one object (or a regular expression that is used in this disclosure frequently) and must not be interpreted as being a direct quote from the literatures outside this disclosure."

8. UNIVERSES OF COMPOSITIONS: Universe: in this disclosure "universe" is frequently used and have few intended interpretation: when "universe x" (x is a number or letter or word or combination thereof) is used it mean the universe of one or more compositions, that is called x, and contains none, one or more ontological subjects. By "real universe" or "our universe" we mean our real life universe including everything in it (physical and its notions and/or so called abstract and its notions) which is the largest universe intended and exist. Furthermore, "universal" refers to the real universe.

Furthermore, in the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

1. Reference throughout this specification to "one embodiment", "an embodiment", "one example" or "an example" means that a particular feature, structure or characteristic described in connection with the embodiment or example is included in at least one embodiment of the present embodiments. Thus, appearances of the phrases "in one embodiment", "in an embodiment", "for instance", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

2. Embodiments in accordance with the present embodiments may be implemented as an apparatus, method, or computer program product. Accordingly, the present embodiments may take the form of an entirely hardware embodiment, an entirely software embodiment (including firmware, resident software, micro-code, etc.), or an embodiment combining software and hardware aspects that may all generally be referred to herein as a "module" or "system." Furthermore, the present embodiments may take the form of a computer program product embodied in any tangible medium of expression having computer-usable program code embodied in the medium.

3. Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present embodiments may be written in any combination of one or more programming languages.

4. Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

5. The flowchart and block diagrams in the flow diagrams illustrate the architecture, functionality, and operation of possible implementations of systems, methods, and computer program products according to various embodiments of the present embodiments. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

6. As used herein, the terms "comprises," "comprising," "includes," "including," "has," "having," or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

7. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

8. Additionally, any examples or illustrations given herein are not to be regarded in any way as restrictions on, limits to, or express definitions of any term or terms with which they are utilized. Instead, these examples or illustrations are to be regarded as being described with respect to one particular embodiment and as being illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," and "in one embodiment."

Now the invention is disclosed in details in reference to the accompanying Figures and exemplary cases and embodiments in the following subsections.

II—Description

The methods and systems that are devised here is to solve the proposed problem of investigating compositions of ontological subjects through algorithmic manipulating and assigning and calculating various "value significance" quantities to the constituent ontological subjects of a composition or a network of ontological subjects. It is further to disclose the methods of measuring the significance of the value/s so that the right "Value Significance Measure/s (USM)", can be defined, synthesized, and be calculated for a desired aspect of investigation and be used for further processing of many related applications or other measures.

The methods and systems of the present invention and can be used for applications ranging from document classification, search engine document retrieval, news analysis, knowledge discovery and research trajectory optimization, question answering, computer conversation, spell checking, summarization, categorizations, categorization, clustering, distillation, automatic composition generation, genetics and genomics, signal and image processing, to novel applications in economical systems by evaluating a value for economical entities, crime investigation, financial applications such as financial decision making, credit checking, decision support systems, stock valuation, target advertising, and as well measuring the influence of a member in a social network, and/or any other problem that can be represented by graphs and for any group of entities with some kind of relations or association.

Although the methods are general with broad applications, implications, and implementation strategies and technique, the disclosure is described by way of specific exemplary embodiments to consequently describe the methods, implications, and applications in the simplest forms of embodiments and senses.

Also since most of human knowledge and daily information production is recorded in the form of text (or it can be converted or represented with textual/numerical characters) the detailed description is focused on textual compositions to illustrate the teachings and the methods and the systems. In what follows the invention is described in several sections and steps which in light of the previous definitions would be sufficient for those ordinary skilled in the art to comprehend and implement the methods, the systems and the applications thereof. In the following section we first set the mathematical foundation of the disclosed method from where we launch into introducing several "value significance measures" (VSMs) and ways of calculating them and their applications.

We explain the method/s and the algorithms with the step by step formulations that is easy to implement by those of ordinary skilled in the art and by employing computer programming languages and computer hardware systems that can be optimized or customized by build or design of

II-I Participation Matrix Building for a Composition

Assuming we have an input composition of ontological subjects, e.g. an input text, the "Participation Matrix" (PM) is a matrix indicating the participation of one or more ontological subjects of particular order in one or more partitions of the composition. In other words in terms of our definitions, PM indicate the participation of one or more lower order OS into one or more OS of higher or the same order. PM/s are the most important array of data in this disclosure that contains the raw information from which many other important functions, information, features, and desirable parameters can be extracted. Without intending any limitation on the value of PM entries, in the exemplary embodiments throughout most of this disclosure (unless stated otherwise) the PM is a binary matrix having entries of one or zero and is built for a composition or a set of compositions as the following:

1. break the composition to desired numbers of partitions. For example, for a text document, break the documents into chapters, pages, paragraphs, lines, and/or sentences, words etc. and assign an order number (e.g. 0, 1, 2, 3 . . . etc) to any set of similar partitions, i.e. the ordered ontological subjects, 2. select a desired N number of OSs of order k and a desired M number of OSs of order l (these OSs are usually the partitions of the composition from the step 1) according to certain predetermined criteria, and;

3. construct a N×M matrix in which the ith raw ($R_i$) is a vector (e.g. a binary vector), with dimension M, indicating the presence of the ith OS of order k, (often extracted from the composition under investigation), in the OSs of order l, (often extracted from the composition under investigation or sometimes from another referenced composition), by having a nonzero value, and not present by having the value of zero.

We call this matrix the "Participation Matrix" (usually a binary matrix) of the order kl ($PM^{kl}$) which can be represented as:

$$PM^{kl} = \begin{matrix} & OS_1^l & \ldots & OS_M^l \\ OS_1^k & \begin{pmatrix} pm_{11}^{kl} & \ldots & pm_{1M}^{kl} \\ \vdots & \ddots & \vdots \\ OS_N^k & pm_{N1}^{kl} & \ldots & pm_{NM}^{kl} \end{pmatrix} \end{matrix} \quad (1)$$

where $OS_p^k$ is the pth OS of the kth order (p=1 . . . N), $OS_q^l$ is the qth OS of the lth order (q=1 . . . M), usually extracted from the composition, and, according to one embodiment of this invention, $PM_{pq}^{kl}$=1 if $OS_p^k$ have participated, i.e. is a member, in the $OS_q^l$ and 0 otherwise. The desired criteria, in the step 2 above, can be, for instance, to only select the content words or select certain partitions having certain length or, in another instance, selecting all and every word or character strings and/or all the partitions.

The participating matrix of order lk, i.e. $PM^{lk}$, can also be defined which is simply the transpose of $PM^{kl}$ whose elements are given by:

$$PM_{pq}^{lk} = PM_{qp}^{kl} \quad (2).$$

Accordingly without limiting the scope of invention, the description is given by exemplary embodiments using the general participation matrix of the order kl, i.e the $PM^{kl}$ in which k≤l.

Furthermore PM carries much other useful information. For example using binary PMs, one can obtain a participation matrix in which the entries are the number of time that a particular OS (e.g. a word) is being repeated in another partitions of particular interest (e.g. in a document) one can readily do so by, for instance, the following:

$$PM\_R^{15} = PM^{12} \times PM^{25} \quad (3)$$

wherein the PM_$R^{15}$ stands for participation matrix of OSs of order 1 (e.g. words) into OSs of order 5 (e.g. the documents) in which the nonzero entries shows the number of time that a word has been appeared in that document (however the possible repetition of a word in an OS of order 2, e.g sentences, will not be accounted for here). Another applicable example is using PM data to obtain the "frequency of occurrences" of ontological subjects in a given composition by:

$$FO_i^{k|l} = \Sigma_j pm_{ij}^{kl} \quad (4)$$

wherein the $FO_i^{k|l}$ is the frequency of occurrence of OSs of order k, i.e. $OS_i^k$, in the OSs of order l, i.e. the $OS^l$. The latter two examples are given to demonstrate on how one can conveniently use the PM and the disclosed method/s to obtain many other desired data or information.

More importantly, from $PM^{kl}$ one can arrive at the "Co-Occurrence Matrix" $COM^{k|l}$ for OSs of the same order as follow:

$$COM^{k|l} = PM^{kl} * (PM^{kl})^T \quad (5),$$

where the "T" and "*" show the matrix transposition and multiplication operation respectively. The COM is a N×N square matrix. This is the co-occurrences of the ontological subjects of order k in the partitions (ontological subjects of order l) within the composition and is one indication of the association of OSs of order k evaluated from their pattern of participations in the OSs of order l of the composition. The co-occurrence number is shown by $com_{ij}^{k|l}$ which is an element of the "Co-Occurrence Matrix (COM)" and (in the case of binary PMs) essentially showing that how many times $OS_i^k$ and $OS_j^k$ has participated jointly into the selected OSs of the order l of the composition. Furthermore, COM can also be made binary, if desired, in which case only shows the existence or non-existence of a co-occurrence between any two $OS^k$.

The importance of the "co-occurrence matrix" as defined in this disclosure is that it carries or contain the information of relationship and associations of the OSs of the composition which is further utilized in some embodiments of the present invention.

It should be noticed that the co-occurrences of ontological subjects can also be obtained by looking at, for instance, co-occurrences of a pair of ontological subject within certain (i.e. predefined) proximities in the composition (e.g. counting the number of times that a pair of ontological subjects have co-occurred within certain or predefined distances from each other in the composition) as was used in the incorporated reference the U.S. patent application Ser. No. 12/179, 363. Similarly there are other ways to count the frequency of occurrences of an ontological subjects (i.e. the $FO_i^{k|l}$). However the preferred embodiment is an efficient way of calculating these quantities or objects and should not be construed as the only way implementing the teachings of the present invention. The repeated co-occurrences of a pair of ontological subjects within certain proximities is an indication of some sort of association (e.g. a logical relationship) between the pair or else it would have made no sense to use them together in one or more partitions of the composition.

Those skilled in the art can store the information of the PMs, and also other mathematical objects of the present invention, in equivalent forms without using the notion of a matrix. For example each raw of the PM can be stored in a dictionary, or the PM be stored in a list or lists in list, or a hash table, or a SQL database, or any other convenient objects of any computer programming languages such as Python, C, Perl, Java, etc. Such practical implementation strategies can be devised by various people in different ways. Moreover, in the preferred exemplary embodiments the PM entries are binary for ease of manipulation and computational efficiency.

However, in some applications it might be desired to have non-binary entries so that to account for partial participation of lower order ontological subjects into higher orders, or to show or preserve the information about the location of occurrence/participation of a lower order OS into a higher order OSs, or to account for a number of occurrences of a lower OS in a higher OS etc., or any other desirable way of mapping/converting or conserving some or all of the information of a composition into a participation matrix. In light of the present disclosure such cases can also be readily dealt with, by those skilled in the art, by slight mathematical modifications of the disclosed methods herein.

Furthermore, as pointed out before, those skilled in the art can store, process or represent the information of the data objects of the present application (e.g. list of ontological subjects of various order, list of subject matters, participation matrix/ex, association strength matrix/ex, and various types of associational, relational, novel, matrices, various value significance measures, co-occurrence matrix, participation matrices, and other data objects introduced herein) or other data objects as introduced and disclosed in the incorporated references (e.g. association value spectrums, value significance measures, ontological subject map, ontological subject index, list of authors, and the like and/or the functions and their values, association values, counts, co-occurrences of ontological subjects, vectors or matrix, list or otherwise, and the like etc.) of the present invention in/with different or equivalent data structures, data arrays or forms without any particular restriction.

For example the PMs, ASMs, OSM or co-occurrences of the ontological subjects etc. can be represented by a matrix, sparse matrix, table, database rows, no sql databases, JSON, dictionaries and the like which can be stored in various forms of data structures. For instance each part, section, or any subset of the objects of the current disclosure such as a PM, ASM, OSM, RNVSM, NVSM, and the like or the ontological subject lists and index, or knowledge database/s can be represented and/or stored in one or more data structures such as one or more dictionaries, one or more cell arrays, one or more row/columns of an SQL database, or by any implementation of No SQL database/s of different technologies or methods etc., one or more filing systems, one or more lists or lists in lists, hash tables, tuples, string format, zip format, sequences, sets, counters, JSON, or any combined form of one or more data structure, or any other convenient objects of any computer programming languages such as Python, C, Perl, Java, JavaScript etc. Such practical implementation strategies can be devised by various people in different ways.

The detailed description, herein, therefore describes exemplary way(s) of implementing the methods and the system of the present invention, employing the disclosed concepts. They should not be interpreted as the only way of formulating the disclosed concepts, algorithms, and the introducing mathematical or computer implementable objects, measures, parameters, and variables into the corresponding physical apparatuses and systems comprising data/information processing devices and/or units, storage device and/or computer readable storage media, data input/output devices and/or units, and/or data communication/network devices and/or units, etc.

The processing units or data processing devices (e.g. CPUs) must be able to handle various collections of data. Therefore the computing or data processing units to implement the system have compound processing speed equivalent of one thousand million or larger than one thousand million instructions per second and a collective memory, or storage devices (e.g. RAM), that is able to store large enough chunks of data to enable the system to carry out the task and decrease the processing time significantly compared to a single generic personal computer available at the time of the present disclosure."

The data/information processing or the computing system that is used to implement the method/s, system/s, and teachings of the present invention comprises storage devices with more than 1 (one) Giga Byte of RAM capacity and one or more processing device or units (i.e. data processing or computing devices, e.g. the silicon based microprocessor, quantum computers etc.) that can operate with clock or instruction speeds of higher than 1 (one) Giga Hertz or with compound processing speeds of equivalent of one thousand million or larger than one thousand million instructions per second (e.g. an Intel Pentium 3, Dual core, i3, i7 series, and Xeon series processors or equivalents or similar from other vendors, or equivalent processing power from other processing devices such as quantum computers utilizing quantum computing devices and units) are used to perform and execute the method once they have been programmed by computer readable instruction/codes/languages or signals and instructed by the executable instructions. Additionally, for instance according to another embodiment of the invention, the computing or executing system includes or has processing device/s such as graphical processing units for visual computations that are for instance, capable of rendering, synthesizing, and demonstrating the content (e.g. audio or video or text) or graphs/maps of the present invention on a display (e.g. LED displays and TV, projectors, LCD, touch screen mobile and tablets displays, laser projectors, gesture detecting monitors/displays, 3D hologram, and the like from various vendors, such as Apple, Samsung, Sony, or the like etc.) with good quality (e.g. using a NVidia graphical processing units).

Also the methods, teachings and the application programs of the presents invention can be implement by shared resources such as virtualized machines and servers (e.g. VMware virtual machines, Amazon Elastic Beanstalk, e.g. Amazon EC2 and storages, e.g. Amazon S3, and the like etc. Alternatively specialized processing and storage units (e.g. Application Specific Integrated Circuits ASICs, field programmable gate arrays (FPGAs) and the like) can be made and used in the computing system to enhance the performance and the speed and security of the computing system of performing the methods and application of the present invention.

Moreover several of such computing systems can be run under a cluster, network, cloud, mesh or grid configuration connected to each other by communication ports and data transfers apparatuses such as switches, data servers, load balancers, gateways, modems, internet ports, databases servers, graphical processing units, storage area networks (SANs) and the like etc. The data communication network to implement the system and method of the present invention carries, transmit, receive, or transport data at the rate of 10 million bits or larger than 10 million bits per second;"

Furthermore the terms "storage device, "storage", "memory", and "computer-readable storage medium/media" refers to all types of no-transitory computer readable media such as magnetic cassettes, flash memories cards, digital video discs, random access memories (RAMS s), Bernoulli cartridges, optical memories, read only memories (ROMs), Solid state discs, and the like, with the sole exception being a transitory propagating signal."

The detailed description, herein, therefore uses a straightforward mathematical notions and formulas to describe exemplary ways of implementing the methods and should not be interpreted as the only way of formulating the concepts, algorithms, and the introduced measures and applications. Therefore the preferred or exemplary mathematical formulation here should not be regarded as a limitation or constitute restrictions for the scope and sprit of the invention which is to investigate the bodies of knowledge and compositions with systematic detailed accuracy and computational efficiency and thereby providing effective tools, products and application in knowledge discovery, scoring/ranking, decision making, navigation, conversing, man/Machine collaboration and interaction, filtering or modification of partitions of a body of knowledge, string processing, information processing, signal processing and the like.

Having constructed the $PM^{kl}$, we now launch to explain the methods of defining and evaluating the "value significances" of the ontological subjects of the compositions for various important measures of significance. One of the advantages and benefits of transforming the information of a composition into participation matrices is that once we attribute something to the OSs of particular order then we can evaluate the merit of OSs of another order in regards to that attribute using the PMs. For instance, if we find words of particular importance in a textual composition then we can readily find the most important sentences of the composition wherein the most important sentences contain the most important words in regards to that particular importance measure or aspect. Moreover, as will be shown, the calculations become straightforward, language independent and computationally very efficient making the method practical, accurate to the extent of our definitions, and scalable in investigating large volumes of data or large bodies of knowledge.

The investigation method/s and the algorithm/s are now explained in the following sections and subsections with the step by step formulations that is easy to implement by those of ordinary skilled in the art and by employing computer programming languages and computer hardware systems that can be optimized or customized by build or hardware design to perform the algorithm efficiently and produce useful outputs for various desired applications.

II-II Value Significance Measures

This section begins to concentrate on value significance evaluation of a predetermined order OSs by several exemplary embodiments of the preferred methods to evaluate the value of an OS of the predetermined order, within a same order set of OSs of the composition, for the desired measure of significance.

Using these mathematical objects various measures of value significances of OSs in a body of knowledge or a composition (called "value significance measure") can be calculated for evaluating the value significances of OSs of different orders of the compositions or different partitions of a composition. Furthermore, these various measures (usually have intrinsic significances) are grouped in different types and number to distinguish the variety and functionalities of these measures.

The first type of a "value significance measure" is defined as a function of "Frequency of Occurrences" of $OS_i^k$ is called here $FO_i^{k|l}$ and can be given by:

$$\text{vsm\_1}_i^{k|l} = f_1(FO_i^{k|l}), i=1,2, \ldots N \qquad (6)$$

wherein $FO_i^{k|l}$ is obtained by counting the occurrences of OSs of the particular order, e.g. counting the appearances of particular word in the text or counting its total occurrences in the partitions, or more conveniently be obtained from the $COM^{k|l}$ (the elements on the main diagonal of the $COM^{k|l}$) or by using Eq. 4, or any other way of counting the occurrences of $OS_i^k$ in the desired partitions of the composition.

Moreover the $f_1$ in Eq. 6 is a predetermined function such that $f_1(x)$ might be a liner function (e.g. ax+b), a power of x function (e.g. $x^3$ or $x^{0.53}$) a logarithmic function (e.g. 1/log 2(x)), or 1/x function, etc.

Accordingly, a $\text{vsm\_1\_1}_i^{k|l}$, (stands for number one of type one "value significance measure") for instance, can be defined as:

$$\text{vsm\_1\_1}_i^{k|l} = c \cdot FO_i^{k|l} \qquad (7)$$

wherein c is a constant or a pre-assigned vector. The $\text{vsm\_1\_1}_i^{k|l}$ of Eq. 7 gives a high value to the most frequent $OS^k$. In another situation or some applications if, for a desired aspect, less frequent OSs are of more significance one may use the following $\text{vsm\_1\_2}_i^{k|l}$ (number 2 of type 1 vsm)

$$\text{vsm\_1\_2}_i^{k|l} = \frac{c}{(FO_i^{k|l})}, i = 1, 2, \ldots N \qquad (8)$$

Furthermore, another type of $\text{vsm\_x}_i^{k|l}$ is defined as a function of the "Independent Occurrence Probability" (IOP) in the partitions such as:

$$\text{vsm\_2}_i^{k|l} = f_2(iop_i^{k|l}), i=1 \ldots N \qquad (9)$$

wherein the independent occurrence probability $(iop_i^{k|l})$ may conveniently be given by:

$$(iop_i^{k|l}) = \frac{FO_i^{k|l}}{M}, i = 1 \ldots N \qquad (10)$$

and $f_2$ is a predetermined function. For instance a $\text{vsm\_2\_1}_i^{k|l}$ (i.e. the number 1 type 2 vsm) can be defined as:

$$\text{vsm\_2\_1}_i^{k|l} = -\log_2(iop_i^{k|l}), i=1 \ldots N \qquad (11)$$

This measure gives a high value to those OSs of order k of the composition (e.g. the words when k=1) conveying the most amount of information as a result of their occurrence in the composition. Extreme values of this measure can point to either novelty or noise.

Still, another type of $\text{vsm\_x}_i^{k|l}$ is defined as a function of the "co-occurrence of an $OS^k$ with others as:

$$\text{vsm\_3}_i^{k|l} = f_3(com_{ij}^{k|l}), i=1 \ldots N \qquad (12)$$

wherein the $com_{ij}^{k|l}$ is the co-occurrences of $OS_i^k$ and $OS_j^k$ and $f_3$ is a predetermined function. For instance a $\text{vsm\_3}_i^{k|l}$ can be defined as:

$$\text{vsm\_3\_1}_i^{k|l} = f_3(com_{ij}^{k|l}) = \Sigma_j com_{ij}^{k|l}, i=1 \ldots N \qquad (13).$$

This measure gives a high value to those frequent OSs of order k that have co-occurred with many other OSs of order k in the partitions of order l.

This measure (Eq. 13) once combined with other measures can yet provide other measures. For instance when it is being divided by the vsm_1_1$_i^{k|l}$ of Eq. 7, (e.g. being divided by FO$_i^{k|l}$), the resultant measure can indicates the diversity of occurrence of that OS. Therefore, this particular combined measure usually gives a high value to the generic words (since generic words can occur with many other words). Once the generic words excluded from the list of OSs of the order k then this measures can quickly identifies the main subject matter of a composition so that it can be used to label a composition or for classification, categorization, clustering, etc.

Accordingly, more vsm_x$_i^{k|l}$ can be defined using the one or more of the other vsm$_i^{k|l}$ or the variables. For instance one can define a vsm_x$_i^{k|l}$ of type 4 (x=4) as function of vsm_1_2$_i^{k|l}$ given by Eq. 8 and com$_{ij}^{k|l}$ as the following:

$$\text{vsm\_4\_1}_i^{k|l} = f_4(\text{vsm\_1\_2}_i^{k|l}, \text{com}_{ij}^{k|l}) = \Sigma_i (\text{com}_{ij}^{k|l} \cdot \text{vsm\_1\_2}_i^{k|l}) = (1/\text{FO}_i^{k|l})^T \times \text{COM}, i,j=1\ldots N \quad (14)$$

wherein "T" stands for matrix or vector transposition operation and wherein we substitute the vsm_1_2$_i^{k|l}$ from Eq. 8 into Eq. 12 or 14. This measure also points to the diversity of the participations of the respective OS especially when COM is made digital.

For mathematical accuracy it is noticed that in our notation the index "i" refers to the row number and the index "j" refers to the column number therefore the matrices with only the subscript of "i" usually are the column vectors and the matrices with only the subscript of "j" usually are row vectors.

In a similar fashion there could be defined, synthesized, and be calculated various vsm_x$_i^{k|l}$ (x=1, 2, 3, . . . ) vectors for OS$_i^k$ that are indicatives of one or more significances aspect's of an OS$_i^k$ in the composition or the BOK. These groups of vsm_x$_i^{k|l}$ generally refer to the intrinsic value significance of an OS in the BOK.

These "value significance measures" (vsm_x$_i^k$) are more indicative of intrinsic importance or significances of lower order constituent part that can be use to separate one or more of the these OSs for variety of applications such as labeling, categorization, clustering, building maps, conceptual maps, ontological subject maps, or finding other significant parts or partitions of the composition or the BOK. For instance as disclosed in the incorporated references the vsm_x$_i^{k|l}$ can readily be employed to score a set of document or to select the most import parts or partitions of a composition by providing the tools and objects to weigh the significances of parts or partitions of a BOK.

Accordingly, from the vsm_x$_i^k$ vectors one can readily proceed to calculate the vsm_x of other OS of different order (i.e. an order l) utilizing the participation matrices PM$^{kl}$ by a multiplication operation by:

$$\text{vsm\_x}_j^{l|kl} = (\text{vsm\_x}_i^k)^T \times \text{pm}_{ij}^{kl}, j=1,2, \ldots M \text{ and } i=1, 2, \ldots N \quad (15)$$

wherein vsm_x$_j^{l|kl}$ is the type x value significance of OSs of order l obtained from the data of the PM$^{kl}$. An instance meaning of OS of order l for a textual composition or a BOK is a sentence (e.g. l=2), a paragraph (e.g. l=3) or a document (l=5). The vsm_x$_j^{l|kl}$ thereafter can be utilized for scoring, ranking, filtering, and/or be used by other functions and applications based on their assigned value significances.

Generally, many other "value significant measures" can be constructed or synthesized as functions of other "value significance measures" to obtain a desired new value significance measure.

Therefore, from the disclosure here, it becomes apparent as how various filtering functions can be synthesized utilizing the participation matrix information of different orders and other derivative mathematical objects. The method is thereby easily implemented and is process efficient.

An immediate application of the theory and the associated methods, systems, and applications are instrumental in processing of natural languages composition and building the artificial intelligences capable of interacting with humans in an intelligent manner.

II-III the Association Strength

This section look into another important attributes of the ontological subjects of a composition that is instrumental and desirable in investigating the composition of ontological subjects.

According to the theoretical discoveries, methods, systems, and applications of the present invention, the concept and evaluation methods of "association strengths" between the ontological subjects of a composition or a BOK play an important role in investigating, analyzing and modification of compositions of ontological subjects.

Accordingly, the "association strength measures" are introduced and disclosed here. The "association strength measures" play important role/s in many of the proposed applications and also in calculating and evaluating the different types of "value significance evaluation" of OSs of the compositions. The values of an "association strength measure" can be shown as entries of a matrix called herein the "Association Strength Matrix (ASM$^{k|l}$)".

The entries of ASM$^{k|l}$ is defined in such a way to show the concept and rational of association strength according to one exemplary general embodiment of the present invention as the following:

$$\text{asm}_{i \to j}^{k|l} = f(\text{com}_{ij}^{k|l}, \text{vsm\_x}_i^k, \text{vsm\_y}_j^k) \ldots i,j=1 \ldots N, x,y=1,2,\ldots \quad (16),$$

where asm$_{i \to j}^{k|l}$ is the "association strength" of OS$_i^k$ to OS$_j^k$ of the composition and $f$ is a predetermined or a predefined function, com$_{ij}^{k|l}$ are the individual entries of the COM$^{k|l}$ showing the co-occurrence of the OS$_i^k$ and OS$_j^k$ in the partitions or OS$^l$, and the vsm_x$_i^k$ and vsm_y$_j^k$ are the values of one of the "value significance measures" of type x and type y of the OS$_i^k$ and OS$_j^k$ respectively, wherein the occurrence of OS$^k$ is happening in the partitions that are OSs of order l. Usually the vsm_x$_i^k$ and/or the vsm_y$_j^k$ are the same as vsm_x$_i^{k|l}$ and/or the vsm_y$_j^{k|l}$ which means it has been calculated from the participation data of the OS$^k$ in the OSs of order l.

Accordingly having selected the desired form of the function $f$ and introducing the exemplary quantities from Eq. 6, and/or 9 and/or Eq. 12 into Eq. 16 the value of the corresponding "association strength measure" can be calculated.

Figure 2:
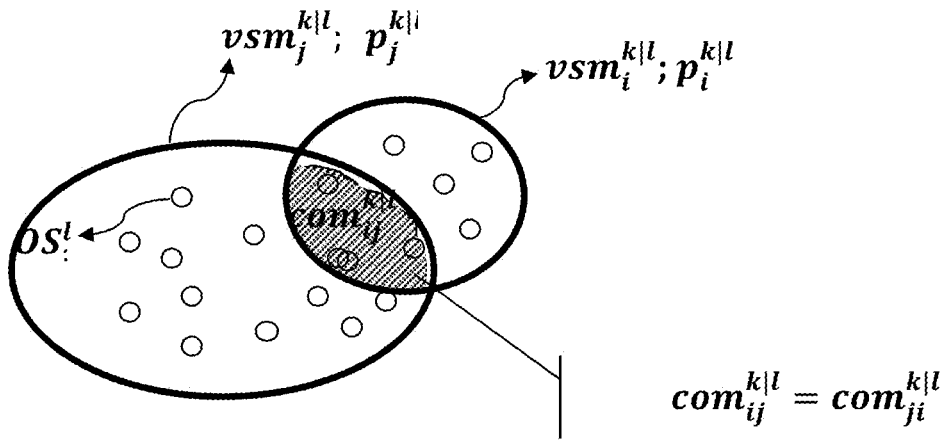
FIG. 2: shows one exemplary illustration of the concept of association strength of a pair of OSs according to one embodiment of the present invention.

Referring to FIG. 2 here, it shows one definition for association of two or more OSs of a composition to each other and shows how to evaluate the strength of the association between each two OSs of composition. In FIG. 2 the "association strength" of each two OSs has been defined as a function of their co-occurrence in the composition or the partitions of the composition, and the value significances of each one of them.

FIG. 2, moreover shows the concept and rational of this definition for association strength according to this disclosure. The larger and thicker elliptical shapes are indicative of the value significances, e.g. probability of occurrences, of $OS_i^k$ and $OS_j^k$ in the composition that were driven from the data of $PM^{k|l}$ and wherein the small circles inside the area is representing the $OS^l$ s of the composition. The overlap area shows the common $OS^l$ between the $OS_i^k$ and $OS_j^k$ in which they have co-occurred, i.e. those partitions of the composition that includes both $OS_i^k$ and $OS_j^k$. The co-occurrence number is shown by $com_{ij}^{k|l}$, which is an element of the "Co-Occurrence Matrix (COM)" introduced before (Eq. 5).

The various $asm_{i \to j}^{k|l}$ can be grouped into types and number in order to distinguish them from other measures in a similar fashion in labeling and naming the VSMs in the previous subsection. Consequently few exemplary types of "association strength measures", $asm_{i \to j}^{k|l}$, are given below:

$$asm\_1\_1_{i \to j}^{k|l} = com_{ij}^{k|l} \ldots i,j = 1 \ldots N \quad (17)$$

$$asm\_2\_1_{i \to j}^{k|l} = com_{ij}^{k|l} / vsm\_x_i^{k|l} \ldots i, j = 1 \ldots N, x, y = 1, 2, \ldots \quad (18)$$

$$asm\_3\_1_{i \to j}^{k|l} = \frac{vsm\_y_j^{k|l}}{vsm\_x_i^{k|l}} \cdot com_{ij}^{k|l} \ldots i, j = 1 \ldots N, x, y = 1, 2, \ldots \quad (19)$$

It is important to notice that the association strength defined by Eq. 16, is not usually symmetric and generally $$asm_{j \to i}^{k|l} \neq asm_{i \to j}^{k|l}.$$

Therefore, one important aspect of the Eq. 16 to be pointed out here is that associations of OSs of the compositions are not necessarily symmetric and in fact an asymmetric "association strength measure" is more rational and better reflects the actual semantic relationship situations of OSs of the composition.

For instance in the patent application Ser. No. 12/939,112 the exemplary and preferred "association strength measure" that in this application is labeled as $asm\_3\_2_{i \to j}^{k|l}$, (it reads as number 2 type 3 "association strength measure") to make it distinguishable from other measures, was defined as:

$$asm\_3\_2_{i \to j}^{k|l} = c \frac{com_{ij}^{k|l}}{\left(iop_i^{k|l} / iop_j^{k|l}\right)} = c \frac{com_{ij}^{k|l} \cdot iop_j^{k|l}}{iop_i^{k|l}}, \quad (20)$$

$$i, j = 1 \ldots N$$

where c is a predetermined constant, or a pre-assigned value vector, or a predefined function of other variables in Eq. 20, $com_{ij}^{k|l}$ are the individual entries of the $COM^{k|l}$ showing the co-occurrence of the $OS_i^k$ and $OS_j^k$ in the partitions of order l, and the $iop_i^{k|l}$ and $iop_j^{k|l}$ are the "independent occurrence probability" of $OS_i^k$ and $OS_j^k$ in the partitions respectively, wherein the occurrence is happening in the partitions that are OSs of order l. In a particular case, it can be seen that in Eq. 20, the un-normalized "association strength measure" of each OS with itself is proportional to its frequency of occurrence (or self occurrence).

This exemplary choice of definition for "association strength measure", i.e. Eq. 20, is further illustrated here. In fact Eq. 20 basically states that if a less popular OS co-occurred with a highly popular OS then the association of the less poplar OS to the highly popular OS is much stronger than the association of the highly popular OS with the less popular OS (remembering the co-occurrence is a symmetric). That make sense, since the popular OSs obviously have many associations and are less strongly bounded to anyone of them so by observing a high popular OSs one cannot gain much upfront information about the occurrence of less popular OSs. However observing occurrence of a less popular OSs having strong association to a popular OS can tip the information about the occurrence of the popular OS in the same partition, e.g. a sentence, of the composition.

In another instance it may be more desirable to have defined the association strength measure as:

$$asm\_2\_2_{i \to j}^{k|l} = c \frac{com_{ij}^{k|l}}{iop_i^{k|l}}, \quad i, j = 1 \ldots N \quad (21)$$

This $asm\_2\_2_{i \to j}^{k|l}$ measure effectively expressing that association of an $OS_i^k$ to another one, say $OS_j^k$, is stronger when the co-occurrences of them is high and the probability of occurrence of $OS_i^k$ is low. In other words if an OS is occurring less frequently and whenever it has occurred it has appeared more often with one particular OS then the association bond of the less frequently occurring OS is strongest with the particular OS that has co-occurred with, the most. In the other way for a given co-occurrence number for a particular OS, say $OS_j^k$, it's highest associated bond is from the OS with less independent occurrence probability. Mathematically, in fact, the $asm\_2\_2_{i \to j}^{k|l}$ is the column normalized version of the $asm\_3\_2_{i \to j}^{k|l}$ of Eq. 20 (when c=1/M in Eq. 21 and assuming binary PM) and is more useful in some instances and applications.

This particular association strength measure can reveal a strong relationship from a less significant OS to the one who has co-occurred the most and is a useful measure to hunt for some types of novelty.

Yet in another instance an application/s is found for the following association strength definition:

$$asm\_4\_1_{i \to j}^{k|l} = c \cdot com_{ij}^{k|l} \cdot iop_j^{k|l} \quad i,j = 1 \ldots N \quad (22).$$

The $asm\_4\_1_{i \to j}^{k|l}$ attributes the strongest association bond from a first OS, say $OS_i^k$, to a second OS, say $OS_j^k$, when the product of their co-occurrences and the independent probability of occurrence of the second OS is the highest. This association strength measure usually is useful for discovering the real association of two important or significant OSs of the composition.

And yet further, this measure can be defined to hunt for mutual associations bonds such as word phrases as the following:

$$asm\_2\_3_{i \to j}^{k|l} = c \frac{\left(com_{ij}^{k|l}\right)^2}{Fo_i^{k|l} \cdot Fo_j^{k|l}}, \quad i, j = 1 \ldots N \quad (23)$$

This measure of association strength (i.e. Eq. 23) is symmetric and gives a high value to those pairs of OSs that frequently co-occur with each other such as word phrases. This becomes equal to 1 (assuming c=1 in Eq. 23) when two words have always co-occurred with each other.

These are few exemplary but useful types of association strength measures which are found to be instrumental in analyzing and investigation of a composition of ontological subjects. However by Eq. 16 it can be seen that there could be defined, synthesized and calculate numerous other association strength measures. Furthermore considering that $com_{ij}^{k|l}$ is also one type of "association strength measure" therefore Eq. 16 can be further generalized as:

$$asm\_x2_{i \to j}^{k|l} = F(asm\_x1_{i \to j}^{k|l}, vsm\_x_i^k, vsm\_y_j^k) \ldots$$
$$i,j=1 \ldots N, x,y=1,2,\ldots, x1,x2=1,2,\ldots \quad (24),$$

wherein F is a predetermined function and x1 and x2 refer to different types of association strength measures and $x_i$ and $y_j$ refer to one of the "value significance measures" of the different types of "value significance measures". To illustrate this, one can see that the $asm\_3\_2_{i \to l}^{k|l}$ can be expressed versus the $asm\_2\_2_{i \to l}^{k|l}$ (Eq. 21) and the $vsm\_1_j^{k|l}$ (Eq. 7) as:

$$asm\_3\_2_{i \to l}^{k|l} = c \cdot asm\_2\_2_{i \to l}^{k|l} \cdot vsm\_1_j^{k|l} \quad (25)$$

wherein c is a constant and "·" indicates an element-wise multiplication of two vectors and wherein Eqs. 7, 10, 20, 21 were combined to derive the Eq. 25.

These illustrating examples are given to demonstrate that with the concept of "value significance" and "association strengths" there will be various ways to synthesize, perform, calculate and obtain the desired association strength for the particular application by those skilled in the art.

II-III-I-Cross Association Strength Measures

Also importantly from the one or more of the "association strength measures" one can go on and define a measure for evaluating the hidden association strength of OS of order k even further by:

$$ASM\_x3^{k|l} = (ASM\_x1^{k|l})^T \times ASM\_x2^{k|l} \quad (26)$$

wherein $ASM\_x3^{k|l}$ stands for type x3 "association strength measure" which is basically a N×N matrix. The Eq. 26 takes into account the transformative or hidden association of OSs of order k (e.g. words of a textual composition or BOK) from one asm measure and combines with the information of another or the same asm measure to gives another measure of association that is not very obvious or apparent from the start. This type of measure therefore takes into account the indirect or secondary associations into account and can reveal or being used to suggest new or hidden relationships between the OSs of the compositions and therefore can be very instrumental in knowledge discovery and research.

Eq. 26 can, in fact, be interpreted as "cross-association strength" between ontological subjects in general with the same or different association strength measure in mind.

When we use the same type of association strength measure, in yet another exemplary and effective way we introduce another measure of association calling it "cross-association strength measure" or CASM for short which is defined as:

$$CASM = (ASM \times ASM^T) \quad (26.1)$$

Wherein, in here, ASM, is one of the desired types of the association matrix and "T" stands for matrix transposition operation and "x" indicates matrix multiplications. Eq. 26.1 is one particular case for the general concept of "cross-association strength measures" which is described, defined, represented, and calculated by Eq. 26. It is understood that CASM (or any other objects of mathematical and data objects this disclosure) can further be processed or go through other mathematical operations when desired.

It is worth mentioning again (as mentioned before or in the incorporated references), that all the data objects of present disclosure and the corresponding matrixes vectors etc. can be made to become normalized That is for instance, any desired matrix of this disclosure can be, and very frequently desirable, to become column normalized, or row normalized (i.e. the norm or the length of each column or row of the desired matrix is unity). Further the multiplications and/or products of the matrices, sometime are element-wise and sometimes are inner products and sometimes are normalized inner products of the vectors of the corresponding Hilbert space. For instance A very important, useful, and quick use of exemplary "association strength measures" of Eq. 17-26 and 26.1 is to find the real associates of a word, e.g. a concept or an entity, from their pattern of usage in the partitions of textual compositions. Knowing the associates of words, e.g. finding out the associated entities to a particular entity of interest, finds many applications in the knowledge discovery and information retrieval. In particular, one application is to quickly get a glance at the context of that concept or entity or the whole composition under investigation. The choice and the evaluation method of the association strength measure is important for the desired application. Furthermore, these measures can be directly used as a database of semantically associated words or OSs in meaning or semantic. For instance if the composition under investigation is the entire (or even a good part of) contents of Wikipedia, then universal association of each entity (e.g. a word, concept, noun, etc.) can be calculated and stored for many other applications such as in artificial intelligence, information retrieval, knowledge discovery and numerous others.

Moreover, from the "association strength measures" one can also obtain and derive various other "value significance measures" which poses more of intrinsic type of significances. For instance in the application Ser. No. 12/939,112 the $asm_{i \to j}^{k|l}$ (e.g. Eq. 20-26) was used to define and calculate few exemplary "value significance measures", i.e. $vsm_i^{k|l}$, in order to evaluate the intrinsic importance, credibility, and importance of OSs of different orders.

In practice, for given a OS, e.g. $OS_j^k$, we want to find out the strongest "associated with" OS (assume it found out to be the $OS_i^k$). To do that we can use Eq. 21. Also one can use the Eq. 22 to find out which OS the given OS, say $OS_i^k$, is highly "associated to" (assume it was found out to be the $OS_j^k$).

To find out the semantically or functionally related OSs one can use Eq. 26 which is an important tool for knowledge discovery. For instance this measure can be used to hunt for the subject matters that can in fact be highly related, but one cannot find their relations in the literature explicitly. The "association strength measure" of Eq. 26, thereby can point to interesting and important topics of further investigation or research either by human researcher or an intelligent machine.

In the next subsection the rational and definition of yet other types of instrumental measures and way of calculating them are given II-III-II Relational Association Measures As mentioned above the association strength values are important for many applications. One or more of such applications is to cluster or to find hidden relationships between the partitions of the compositions. The $asm_{i \to j}$ of the lower order OSs can show the association strength of the higher order OSs of the composition thereby to use them for clustering, categorization, scoring, ranking and in general filtering and manipulating the higher order OSs.

Accordingly, in this section we further disclose and explain the concept of "Relational Association Strength measure" (RASM). In the general terms, from lower order "association strength matrix" we can proceed to calculate association strength of higher order OSs to a lower order OS that we call it "Relational Association Strength measure" (RASM) here.

One exemplary instance of such "Relational Association Strength measure" can be given by:

$$\text{RASM\_1}^{l \rightarrow k|kl} = \text{rasm\_1}_{ij_k}^{l \rightarrow k|kl} = (PM^{kl})^T \times ASM^{kl} \ i_l=1, 2, \ldots M \text{ and } j_k=1,2, \ldots N \quad (27)$$

wherein $\text{rasm\_1}_{ij_k}^{l \rightarrow k|kl}$ or the $\text{RASM\_1}^{l \rightarrow k|kl}$ is the "first type relational association strength measure" of OSs of order l to OSs of order k, which is a M×N matrix and shows the degree that an OS of order l (e.g. the $i_l$th sentence of the composition) is associated or is related to a particular OS of order k (e.g. to the $j_k$th word of the composition).

It is noted that $ASM^{k|l}$ is generally a square asymmetric matrix, whose transpose is not equal to itself, and therefore there could be envisioned another, also important, type of "relational association strength measure". Accordingly, in the same manner the "second type relational association strength measure" can be defined and calculated as:

$$\text{RASM\_2}^{l \rightarrow k|kl} = \text{rasm\_2}_{ij_k}^{l \rightarrow k|kl} = (PM^{kl})^T \times ASM^{kl^T} i_l=1, 2, \ldots M \text{ and } j_k=1,2, \ldots N \quad (28)$$

wherein $\text{rasm\_2}_{ij_k}^{l \rightarrow k|kl}$ or the $\text{RASM\_2}^{l \rightarrow k|kl}$ is the "second type relational association strength measure" of OSs of order l to OSs of order k, which is also a M×N matrix and is similar to $\text{RAS\_M}^{l \rightarrow k|kl}$ except relational emphasis is from different aspect. For instance if the ASM used in Eq. 28 is from the Eq. 20, then for a given OS of order k (e.g. a particular keyword) the $\text{RASM\_1}^{l \rightarrow k|kl}$ shows a high relatedness for those partitions (e.g. sentences or paragraphs etc.) that contain the words that are highly bonded to the target OS. Whereas at the same condition using the $\text{RASM\_2}^{l \rightarrow k|kl}$ then those sentences that contain the words that the target OS is highly associated with show a strong relatedness to the target OS.

Therefore using the above relational rasm one can conveniently find the most related partitions of a composition to one or more target OS for the desired goal of the investigation (e.g quick retrieval of documents, sentences, or paragraphs with high semantic relevancy).

On the other way, the $\text{RASM\_2}^{l \rightarrow k|kl}$ or $\text{RASM\_1}^{l \rightarrow k|kl}$ can be used also to find out the association strength or relatedness of particular OS of order k (e.g. the $j_k$th word of the composition) to a particular OS of order l (e.g. the $i_l$th sentence of the composition) by having the following relationship:

$$\text{RASM\_x}^{k \rightarrow l|kl} = (\text{RASM\_x}^{l \rightarrow k|kl})^T \quad (29).$$

The reason that the present invention call $\text{RASM\_x}^{l \rightarrow k|kl}$ "Relational Association Strength Measure" of type x, is to remind the fact that these types of association strength are not only between a higher order OS (e.g. a sentence, paragraph, or a document, or a segment/partitions of a picture) with a lower order OS (e.g. a word or a keyword, phrase, a pixel, or section of a picture etc) but it is, in an indirect way, also between a higher order OS and the associations of a lower order OS. The name for the other way around relationship (i.e. $\text{RASM\_x}^{k \rightarrow l|kl}$) is also appropriate in which not only a lower order OS is associated with a higher order OS but also is related to other constituent lower order OSs of the higher order OS.

Many more useful mathematical objects and relations are obtained, in a similar fashion as thought in the present invention, from which variety of operations can be envisioned. For instance we can proceed to calculate the association strength between the OSs of order l (e.g. an association strength measure between sentences of a textual composition) by the following:

$$\text{RASM\_x}^{l \rightarrow l|kl} = \text{rasm\_x}_{ij_l}^{l \rightarrow l|kl} = \text{RASM\_x}^{l \rightarrow k|kl} \times \text{RASM\_x}^{k \rightarrow l|kl}, i_l,j_l=1,2, \ldots M \quad (30)$$

wherein $\text{rasm\_x}_{ij_k}^{l \rightarrow l|kl}$ is indicative of one type of "relational association strength measure" between ith OS of order l and jth OS of order l. This matrix is particularly useful to find or select the higher order OSs of the composition or the partitions (e.g. sentences or paragraphs, or documents), that are highly associated with each other. In some applications, though, it would be desirable, for instance, to find out the partitions that have the least amount of associations with any other partitions etc.

In general one or more of these "related associations measures" can be used (either normalized or not) to define and/or synthesize new RASMs.

By the same manner using "Participation Matrix/es" and other objects, other desired features can be quantified in a composition or a BOK and consequently make it possible to select, clustered, or filter out the desired part or parts of the composition to look into, investigate, modified, re-composed, etc.

Eqs. 27-30 make it easy to find the partitions of the compositions that have the highest relatedness or highest relative association with a keyword or the other way around etc. Therefore a computer implemented method utilizing these formulations can essentially filters out the most related parts or partitions of a composition in relation to a target keyword.

One immediate application, of course, is for scoring the relatedness of group of documents to a subject matter or a keyword. Another immediate application of the computer implemented method, utilizing the concept of $\text{RASM\_x}^{l \rightarrow k|kl}$ and the formulation, for instance, is to cluster and separate partitions of a BOK or a large corpus/s, etc into sets of partitions that are related to a particular subject matter. The relatedness is measured by one or more of the above measures and partitions that exhibited an association strength value greater (or sometimes smaller) than a predetermined threshold to a particular OS, can be grouped or clustered together. Further these data can be readily used to build a neural network type system (for learning, reasoning etc.) whose edge/connection weights can be obtained from the data of association strengths of the ontological subjects (e.g. the node of a neural net). In this way the training of a neural net can be done much faster or simply by reading a body of knowledge to attain the necessary data for building a learnt (e.g. adjusted weight by training through observing output/input as done currently without the teachings of the this disclosure) neural net. The association strength data structures usually in the form a matrix therefore is instrumental to build such cognitive networks for variety of tasks in general and for building neural nets in particular. The training iteration and the resource needed to train a neural net is significantly reduced using the information of the association strengths (and various other data objects or data structures introduced in this disclosure) of the ontological subjects obtained by investigating a body of knowledge as taught through this disclosure.

In light of the foregoing explanation, the algorithm and method of clustering become straightforward. For instance, a number of partitions of the composition or the BOK that have exhibited a predetermined threshold of relative association strength or predetermined criteria of satisfying enough association strength to a target subject or to each other can be categorized or being clustered as group together.

As a practical example, these method/s, were successfully and effectively used for clustering and categorizing a large of number of news feeds as shown in FIG. 11 which will be explained in the next subsections (section II-II-I).

Nevertheless in the short note here, the FIG. 11 shows the procedure in which using the concept of "value significance" selected a number of head category are selected from those OSs exhibiting the highest value significances, and consequently using the "related association strength measure" concept it was possible to separate the very many different news feeds into different categories automatically with satisfactory accuracy.

In the next section, in accordance with another aspect of this disclosure the relative or "relational value significance measures" (RVSM) are further introduced to evaluated the relative significances of various OSs in relation to a target OS in the context of the given BOK.

II-IV Relational Value Significance Measures

Considering the case wherein one is looking for an important partition of the BOK related to a target OS (e.g. $OS_j^k$) which could be a word or a phrase, subject matter, keyword etc. Consequently one needs a value significance measure/s that is measured in relation or relative to one or more target OS. One can call this conceptual measure as "relational value significance measure" or RVSM.

In here the RVSM can simply be the association strengths of $OS_i^k$, i=1, 2, ... N to a target $OS_{j_k}^k$, i.e. $asm_{i \rightarrow j_k}^{k|l}$ or the $j_k$th column of the $ASM^{k|l}$ matrix, which when is used as a USM vector that can give a weighted importance of partitions of the composition or the BOK (i.e. an $OS_{i_l}^l$) in relation to the target $OS_j^k$ when operates (multiply) on the participation matrix $PM^{kl}$, as the following:

$$\text{rvsm}\_1\_x_{ij_k}^{l \rightarrow k|kl} = (pm_{iji}^{kl})^T \times \text{asm}\_y_{i_k \rightarrow j_k}^{k|l} \ldots$$
$$i_k j_k = 1, 2, \ldots N \text{ and } i_l = 1, 2, \ldots M \text{ and } x, y = 1, 2, \ldots \quad (31)$$

wherein $\text{rvsm}\_1\_x_{ij_k}^{l \rightarrow k|kl}$ stands for type 1 of number x "relational value significance measure" of OSs of order l, $OS_{i_l}^l$, to a given $OS_{j_k}^k$ which is a row vector and is obtained by processing the participation data of $OS^k$ in $OS^l$ or in other words it has been driven from the data of $PM^{kl}$ and y is indicative the type of the "association strength measure".

For the sake of simplicity usually the x and y are the same type. Accordingly, as can be seen in this embodiment the first type "relational value significance measure", $\text{rvsm}\_1\_x_{ij_k}^{l \rightarrow k|kl}$, is in fact the same as $\text{rasm}\_1\_x_{ij_k}^{l \rightarrow k|kl}$ the "first type relational Association strength measure" introduced in Eq. 27.

Eq. 31, once executed, will assign values to $OS^l$ in which it amplifies the importance or significance values of the partitions (e.g. sentences) of the composition that contains the OSs (e.g. words) that have the highest association strength to the target $OS_j^k$ (i.e. a target keyword) thereby to provide an instrument, i.e. a filtering function, for scoring and consequently selecting one or more highly related partitions to an $OS_j^k$.

In fact the Eq. 31 can also be written in a matrix form wherein the $\text{rvsm}_{ij_k}^{l \rightarrow k|kl}$ is a M by N matrix indicating the relative importance of the partitions to each of $OS_j^k$. In other words $\text{rvsm}_{ij_k}^{l \rightarrow k|kl}$ is a kind of "relational value significance measure" and can be used as, say, "first type relational value significance measure" (e.g. can be shown by RVSM_1 notation).

The RVSM_1 therefore, following the Eqs. 27 and 31, can be given in the matrix form as:

$$\text{RVSM}\_1\_x^{l \rightarrow k|kl} = \text{RASM}\_1^{l \rightarrow k|kl} = \text{rvsm}\_1_{ij_k}^{l \rightarrow k|kl} = (PM^{kl})^T \times ASM^{k|l}, i_l = 1, 2, \ldots M \text{ and } j_k = 1, 2, \ldots N \quad (32)$$

wherein the "T" shows the transposition matrix operation and $\text{RASM}\_1^{l \rightarrow k|kl}$ is the "Relational Association Strength Matrix" and the RVSM_1 is the "first type relational value significance measure". It is noticed that $ASM^{k|l}$ is a N×N matrix and $\text{RASM}\_1^{l \rightarrow k|kl}$ is a M×N matrix indicating the relatedness/association of $OS_i^l$ (e.g. a sentence and i=1 ... M) to a $OS_j^k$ (e.g. a word and j=1 ... N).

In a similar fashion there could be defined a second type relative value significance measure (e.g. can be shown by RVSM_2 notation). as:

$$\text{RVSM}\_2^{l \rightarrow k|kl} = \text{rvsm}\_1_{ij_k}^{l \rightarrow k|kl} = (PM^{kl})^T \times (ASM^{k|l})^T, i_l = 1, 2, \ldots M \text{ and } i_k = 1, 2, \ldots N \quad (33)$$

Or equivalently (see Eq. 28) given by:

$$\text{RVSM}\_2^{l \rightarrow k|kl} = \text{RASM}\_2^{l \rightarrow k|kl} \quad (34)$$

wherein the $\text{RVSM}\_2^{l \rightarrow k|kl}$ or the $\text{RASM}\_2^{l \rightarrow k|kl}$ indicates the relatedness/association strength of $OS_i^l$ (e.g. a sentence and i=1 ... M) or its "relational value significance" to a $OS_j^k$ (e.g. a word and j=1 ... N).

Remembering the $ASM^{k|l}$ in general is asymmetric and have different interpretation in which the rows of $ASM^{k|l}$ indicates the value of association to other and column indicates the value of being association with by others. Therefore the $\text{RVSM}\_1^{l \rightarrow k|kl}$ is indicative of a degree that an OS of order l, $OS_i^l$, (e.g. sentences) containing the OSs of order k, $OS^k$ (e.g. the words) that are used to explain or express or provide information regarding the target $OS_j^k$ (i.e. containing the words that are highly associated with the target OS). Whereas the $\text{RVSM}\_2^{l \rightarrow k|kl}$ is indicative of a degree that an $OS_i^l$ (e.g sentences) containing the $OS^k$ (e.g. the words) for which the target $OS_j^k$ is used or participated to explain or express or provide information about them (i.e. containing the words that the target OS is highly associated with).

Yet a third type of "relational value significance measure" can be defined as:

$$\text{RVSM}\_3_{ij_k}^{l \rightarrow k|kl} = \text{vsm}_{j_k}^{k|l} \cdot \text{RASM}\_1^{l \rightarrow k|kl} = \text{vsm}_{j_k}^{k|l} ((PM^{kl})^T \times ASM^{k|l}) i_l = 1, 2, \ldots M \text{ and } j_k = 1, 2, \ldots N \quad (35)$$

wherein "·" indicates an element-wise multiplication and the $\text{vsm}_{j_k}^{k|l}$ could be the value of the one of the "value significance measures".

And yet "forth type relational value significance measure" can be defined and calculated as:

$$\text{RVSM}\_4_{ij_k}^{l \rightarrow k|kl} = \text{vsm}_{j_k}^{k|l} \cdot \text{RASM}\_2^{l \rightarrow k|kl} = \text{vsm}_{j_k}^{k|l} ((PM^{kl})^T \times ASM^{k|l}) i_l = 1, 2, \ldots M \text{ and } j_k = 1, 2, \ldots N \quad (36)$$

Therefore there could also be defined various "relational value significance measures" by incorporating the "intrinsic value significances" and the "relational association strength".

Accordingly, in general the $\text{RVSM}\_x_{ij_k}^{l \rightarrow k|kl}$ can be rewritten as:

$$\text{RVSM}\_x_{ij_k}^{l \rightarrow k|kl} = f_x(\text{vsm}_{j_k}^{k|l}, \text{RASM}\_1^{l \rightarrow k|kl}, \text{RASM}\_2^{l \rightarrow k|kl}) \quad (37)$$

wherein RVSM_x$_{ij_k}^{l \to k|kl}$ is the "type x relational value significance measure" and the $f_x$ is a predetermined function.

These measures, RVSM_3$_{ij_k}^{l \to k|kl}$ and/or RVSM_4$_{ij_k}^{l \to k|kl}$, put an intrinsically high value on the significance of the partitions that are highly related to the high value significance OS$^k$ of the composition by taking the intrinsic value of the target OSs into account. Therefore these measures can be instrumental to, for example, representing a body of knowledge with the highest relational value significance or to summarize a composition. To do so one can simply select one or more partition of the BOK that scored the highest for these measures in order to present it as summary of a composition.

Furthermore, from RVSM_x$_{ij_k}^{l \to k|kl}$ one can proceed to calculate the "relational value significance measures" between the OSs of higher order l as:

$$\text{RVSM\_}x^{l \to k|kl} = \text{rvsm\_}x_{ij_k}^{l \to k|kl} = \text{RVSM\_}x^{l \to k|kl} \times (\text{RVSM\_}x^{l \to k|kl})^T, i, j, l = 1, 2 \ldots M \quad (38)$$

wherein RVSM_x$^{l \to k|kl}$ is the relative value significance measure between OSs of order l so that it can directly measure the relatedness of partitions of the BOK such as sentences, paragraphs, or documents to each other. Again this measure therefore can readily be used to find the highly related partitions of the BOK either for retrieval purposes, rankings, document comparisons, question answering, conversation, or clustering and the like.

The concept behind the "relational value significance measures" is for processing and investigating compositions of ontological subject as it become important in these investigations to have tools, measures, and filtering functions and methods of building such filtering functions to spot a partition relevant to another part or partition or to a given composition or query.

For instance in the information retrieval it becomes increasingly important to have retrieved the most relevant pieces of information and therefore the retrieved documents or the parts thereof should be the most relevant document and partition to a target OS which could be a keyword or set of keywords or even a composition itself. For instance it would be very useful and desirable to find the most relevant document or piece of knowledge to an input query in the form of a natural language question, or even a paragraphs or a whole text document. In this particular application one or more of the various kind and types of the, so far introduced, "value significance measures" can readily be applied using the method of this discloser to retrieve and present the most relevant part (e.g. a word, a sentence, a paragraph, a chapter, a document) to the sought after subject matter or in response to a query.

Many other desirable outcome and functionality can be built in light of the teachings and the disclosed method of systematic and computer-implementable methods of investigations not only for textual compositions but also for other types of compositions. In fact the disclosed method has been used and applied on image and video compositions as well as genetic code compositions which confirmed the method/s is indeed very effective in investigating compositions of ontological subject to obtain a desirable outcome or information or knowledge or the result.

In another aspect of the present invention, in the next section, are the concept and definitions of "novelty value significance measures" (NVSM), as indication of various situations of novelty of OSs in the composition or the BOK.

II-V-Novelty Value Significance Measures

According to another aspect of investigation methods of compositions yet other value significance measures are introduced and explored herein. According to this aspect of investigation, in some instances it would become desirable to have found the words or the partitions of a composition expressing novel information about one or more subject matter/s. In these instances if one can have an instrument or a function to measure a novelty value of a subject matter (e.g. an OS of the composition) itself or a novelty measure for the partitions then it would become practical to spot the novel information and/or the partitions of the composition carrying novel information in the context of that compositions or a set of compositions or generally a body of knowledge (BOK) as we defined before.

However the degree or value of novelty should be somehow measured in order to identify the part or partitions of the novelty and evaluate their value in terms of the significance of their novelty. In this disclosure these measures are called "novelty value significance measures" (NVSM) which can be categorized in different types and we, herein, define and show the methods of evaluating them for ontological subjects of a composition or a BOK.

In view of that, the first step is to define what constitute a novelty in the context of a BOK and identify different aspects that there is into a novelty investigation.

There could be envisioned several situations in which a novelty can occur that is of value in the investigation process. The detection and evaluation of novelty values can be important to either a knowledge consumer or to be used in other applications, processes, and or other computer implemented client programs.

Accordingly, in the present invention we explain few exemplary instances of novelty, having significance value, to be investigated in more details to demonstrate another investigation method of compositions according to novelty significance aspect/s.

II-V-I Relational Novelty

Novelty is an attribute that is related to newness, surprising factors, entropy, not being well known, not seen before, and unpredictability. However this attributes depends very much on the context and in relations to other ontological subjects of the compositions. For instance something which is new in one domain or context might be an obvious thing in another domain. Or something that is new now, it might become vey well known fact after sometimes. For instance, in news aggregation novelty of the news is very much related to the time of the news being broken and how many other news agencies have published the same news story. Therefore the novelty should be measured in relation to the context, time, and other partitions of the compositions. However, we look for novelty or novelties in the given composition for investigation and since we can treat time and/or a time stamp as an OS, our method of investigation, therefore, would also work for time-related compositions such as news, as well.

Generally, therefore, a valuable novelty occurrence is relational (i.e. more than one OS is participated where the novelty occurs) which should be investigated in the context of a composition. For instance in the context of a body of knowledge (BOK) there could be found many known or anticipated facts in regards to the subject matter/s of the BOK but there could be some partitions, e.g. statements, that are less known and can be considered as novel.

In this subsection therefore, to identify relative or relational novelty in regards to a topic or one or more OSs, several important novelty occurrence situations are envisioned and exemplified in the followings.

One of the situations is a novel relationship between two or more OSs in which case there could yet be envisioned at least two notable and important situations.

In one situation of novel relationship between two or more OSs, for example, a type of "relational novelty value significance measure" can be assigned to spot a novel or less known relationship between two important OSs. In this case the relational novel value should be high because the two significant OSs are less seen with each other in a part or partitions of a composition or a BOK. Therefore the desired "relational novel significance measure" should be proportional to the value significances of each of the OSs and be inversely proportional to their "association strength bond".

Accordingly, one exemplary and simple measure of "relational novel value significance" between two of the OS of order k, say $OS_i^k$ and $OS_j^k$, can be given by:

$$\text{rnvsm\_1}_{i \to j}^{k|l}(OS_i^k, OS_j^k) \propto vsm_i^{k|l}, vsm_j^{k|l}, \frac{1}{com_{ij}^{k|l}} \quad (39)$$

wherein the $\text{rnvsm\_1}_{i \to j}^{k|l}$ stands for type one "relational novelty value significance measure" of $OS_i^k$ to the $OS_j^k$. This measure can be used to hunt for those partitions that contain two or more significant OSs expressing less known relationship. Therefore this measure will give a high value to the pair of the OSs, that are intrinsically significant, and more likely the expressed relationship to be credible and significant yet their relationship with each other is of novelty in the context of the BOK.

Another situation of novel relationship between two or more OSs, is a type of novelty between two OSs in which the novelty reveals less known information about one important OS of the interest (e.g. a target keyword, a high value significance subject of a BOK, etc.), regardless the significance of the other OSs. In this instance, the intrinsic value of the target OS, e.g. an intrinsic vsm, should be a significance factor for measuring and putting a value on the novelty. Also in terms of how to spot a novelty in relation to a significant target OS then the less known associations can be a guide to find the novel part or partitions or statement of a relationship between a significant OS with other OSs of the composition.

Therefore, another type of "relational novelty value significance measure" can be defined as:

$$\text{rnvsm\_2}_{i \to j}^{k|l}(OS_i^k, OS_j^k) \propto vsm_j^{k|l} \cdot \frac{1}{com_{ij}^{k|l}} \quad (40)$$

wherein the $\text{rnvsm\_2}_{i \to j}^{k|l}$ stand for the second type "relational novelty value significance measure" $OS_i^k$ to the $OS_j^k$. This measure put a high relational novelty value on the pairs that at least one of them, e.g. the target OS, have a high intrinsic value (i.e the vsm of the $OS_j^k$) while the other ones are the ones that had the lowest co-occurrences with the target OS. This measure can be used to spot the partitions that are novel and significant but perhaps the expressed relationship, between the two OSs, by the partition, is less credible.

Moreover there could be considered further notable situations, when two or more OSs of the composition have participated in a partition, to convey a novel knowledge or information.

Accordingly, for example, another type of relational novelty can occur between a less significant OS and a high significance target OS. In this case this type of novelty value should be proportional to the value significance of the second OS, e.g. a target OS, and be inversely proportional to the value significance of the less significant OS and also be inversely proportional to their co-occurrences so that:

$$\text{rnvsm\_3}_{i \to j}^{k|l}(OS_i^k, OS_j^k) \propto vsm_j^{k|l}, 1/vsm_i^{k|l}, \frac{1}{com_{ij}^{k|l}} \quad (41)$$

wherein the $\text{rnvsm\_3}_{i \to j}^{k|l}$ stand for the third type of "relational novelty value significance measure" $OS_i^k$ to the $OS_j^k$. This measure can be used to spot highly novel but perhaps even less credible partitions of the BOK than what is found by the $\text{rnvsm\_2}_{i \to j}^{k|l}$.

And yet another type of novelty can occur between two less significant OSs. In this case the significance and relational novelty value should be inversely proportional to the significances, i.e. VSMs, of each of the OSs and also proportional to their co-occurrences so that:

$$\text{rnvsm\_4}_{i \to j}^{k|l}(OS_i^k, OS_j^k) \propto 1/vsm_j^{k|l}, 1/vsm_i^{k|l}, com_{ij}^{k|l} \quad (42)$$

wherein the $\text{rnvsm\_4}_{i \to j}^{k|l}$ stands for the forth type of "relational novelty value significance measure" $OS_i^k$ to the $OS_j^k$. This measure can be used to spot a highly novel relationship between two less known OSs but with some credibility. This measure can be used to spot the rare partitions that might be irrelevant to the context of the BOK but is important to be looked at.

And yet there could be another notable situation and measure of relational novelty as:

$$\text{rnvsm\_5}_{i \to j}^{k|l}(OS_i^k, OS_j^k) \propto 1/vsm_j^{k|l}, 1/vsm_i^{k|l}, \frac{1}{com_{ij}^{k|l}} \quad (43)$$

wherein the $\text{rnvsm\_5}_{i \to j}^{k|l}$ stands for the fifth type of "relational novelty value significance measure" $OS_i^k$ to the $OS_j^k$. This measure can be used to spot a highly novel relationship between two less known OSs but with even less credibility than $\text{rnvsm\_4}_{i \to j}^{k|l}$. This measure can be used to spot the noise like partitions that might be irrelevant to the context of the BOK but might be essential to be looked at such as crime investigation or financial analysis, fraud detections and the like. This measure also can be used to filter out the irrelevant or noisy part of the composition, or be used in data compression, image compression and the like.

In another notable instance a measure of relational novelty value can be defined based on their association strengths to each other as:

$$\text{rnvsm\_6}_{i \to j}^{k|l}(OS_i^k, OS_j^k) \propto \text{asm\_1}_{i \to j}^{k|l}/\text{asm\_1}_{i \to j}^{k|l} \quad (44)$$

wherein the $\text{rnvsm\_6}_{i \to j}^{k|l}$ stands for the sixth type of "relational novelty value significance measure" $OS_i^k$ to the $OS_j^k$. This measure of novelty amplifies the asymmetry of the association strength value between the two OSs and therefore serves as a measure of anomaly and novelty, both too large and too small a value for this measure can point to a novelty situation. However, to have a symmetric rnvsm using asm one might consider the following measure:

$$\text{rnvsm\_7}_{i \to j}^{k|l}(OS_i^k, OS_j^k) \propto \left( \frac{asm_{i \to j}^{k|l}}{asm_{j \to i}^{k|l}} + \frac{asm_{j \to i}^{k|l}}{asm_{i \to j}^{k|l}} \right) \quad (45)$$

wherein the rnvsm_$7_{i \to j}^{k|l}$ stands for the seventh type of "relational novelty value significance measure" $OS_i^k$ to the $OS_j^k$. This measure is particularly good to spot any symmetric kind of novelty or anomaly between $OS_i^k$ to the $OS_j^k$. When the value of this measure is large then there is a novelty situation to look at between $OS_i^k$ to the $OS_j^k$.

It can be noted that the some of the exemplary rnvsm_$x_{i \to j}^{k|l}$, (x=1, 2, 3 . . . ) are generally symmetric and both sided whereas the some other rnvsm_$x_{i \to j}^{k|l}$ are asymmetric.

Once is noted that the co-occurrence is one of the measures and indications of the associations between a pair of OS then the rnvsm_$x^{k|l}$ (x=1, 2, . . . ) can further be generalized as a function of individual values significances of the OSs and their association strength measures. Therefore in general the "relational novel value significance measures" can be defined and calculated in the general form of:

$$\text{rnvsm\_}x_{i \to j}^{k|l}(OS_i^k, OS_j^k) = g_2(\text{vsm}_i^{k|l}, \text{vsm}_j^{k|l}, \text{vsm}_{i \to j}^{k|l}, \text{vsm}_{j \to i}^{k|l}), \ldots i,j=1,2,\ldots N, x=1,2,\ldots \quad (46)$$

wherein $g_2$ is a predefined or predetermined function.

When there are multiple OSs of interest the pair-wise value significances can be used in combination and perhaps with various weight to achieve the same filtering effect for a set of OSs. For instance $$\text{rnvsm}_{q \to i,j,p}^{k|l}(OS_i^k, OS_j^k, OS_p^k) = \alpha_1 \cdot \text{rnvsm\_}x1^{k|l}(OS_q^k, OS_i^k) + \alpha_2 \cdot \text{rnvsm\_}x2^{k|l}(OS_q^k, OS_j^k) + \alpha_3 \cdot \text{rnvsm\_}x3^{k|l}(OS_q^k, OS_p^k) \text{ and } q=1,2 \ldots N \quad (47)$$

wherein $\alpha_1$, $\alpha_2$, and $\alpha_3$ are predetermined weighting functions such as $\alpha_1(OS_i^k) = 1/FO(OS_i^k)$ or $\alpha_1(OS_i^k) = \log 2(\text{iop}(OS_i^k))$ etc. or constants and/or normalization factors, and $x_1$, $x_2$ and $x_3$ are indications of the type of the rnvsm (e.g. Eq. 39-45) and "$OS_p^k$" is the indication of one or more combination of the first OS to the particular target OS. Moreover, Eq. 47 in just one of the notable situations of novelty occurrence and in another instance it might become more useful to multiply the pair-wise rnvsm_$x^{k|l}$ to each other.

All these relationships (i.e. Eq. 39-46) can be written in a matrix form to, once executed numerically, have all combinations of relations between two or more of the $OS^k$ precalculated and handy.

Again by operating these specialty defined "value significance measures" on the PM one can obtain the respective type of value for the partitions of the compositions, e.g. OSs of order l or $OS^l$, by:

$$\text{rnvsm\_}x_{i_l j_l \to i_k j_k}^{l \to k|kl} = (\text{pm}_{i_l j_l}^{kl})^T \times \text{rnvsm\_}x_{i_k \to j_k}^{k|l} \ldots i_k, j_k=1,2,\ldots N \text{ and } i_l=1,2,\ldots M \quad (48)$$

Or in the matrix form as:

$$\text{RNVSM\_}x^{l \to k|kl} = (PM^{kl})^T \times \text{RNVSM\_}x^{k|l} \ i_l=1,2,\ldots M \text{ and } j_k=1,2,\ldots N \quad (49)$$

wherein the "T" shows the transposition matrix operation and the RNVSM_$x^{l \to k|kl}$ is the type x (x=1, 2, . . . ) "relational novelty value significance measure" of the partitions or OSs of order l to the OSs of the order k. It is noticed that RNVSM_$x^{l \to k|kl}$ is a M×N matrix indicating the type x (x=1, 2, . . . ) "relative novel value significance measure" of $OS_i^l$ (e.g. a sentence and i=1, 2, . . . M) to a $OS_j^k$ (e.g. a word and j=1, 2, . . . N) and RNVSM_$x^{k|l}$ is a N×N matrix indicating the type x (x=1, 2, . . . ) "relational novel value significance measure" of $OS^k$ with $OS^k$.

In a similar fashion to the previous subsection, there could be calculated a novelty type relationships between the OSs of order l so that to show how each pair of the partitions are related in terms of the significance of the relational novelty to each other as:

$$\text{RNVSM\_}x^{l \to l|kl} = \text{RNVSM\_}x^{l \to k|kl} \times \text{RNVSM\_}x^{l \to k|kl} \quad (50)$$

wherein RNVSM_$x^{l \to l|kl}$ stands for the "relational novelty value significance measure" of type x between the OSs of the order l, which is a M×M matrix. This measure and the data of such matrix can be used to find a novel partition, exhibiting a predetermined range of "relational novelty value", for a given partition. Also these measures can be combined with other measures to obtain the desired parts of the compositions that one is looking for (e.g. in response to a query or a question).

II-V-II the Association Type Novelty

Many associations are hidden that when is revealed is obviously a case of novelty existence or occurrence. For instance when two OSs have little direct associations but their association spectrum is highly correlated then there could be a novelty of high value revealed for further investigation. In these instances a measure to hunt for these types of novelty association can be given by:

$$\text{anvsm\_}1_{i \to j}^{k|l}(OS_i^k, OS_j^k) \propto \frac{(\text{asm\_}x1_{p \to i}^{k|l} \cdot \text{asm\_}x2_{p \to j}^{k|l})}{\text{asm\_}x3_{i \to j}^{k|l}}, \quad (51)$$

$$p = 1, 2, \ldots N$$

wherein anvsm_$1^{k|l}$ is indicative of the first type "association novelty value significance measure", the "." shows the inner product or scalar multiplication of the asm_$x1_{p \to i}^{k|l}$ and asm_$x2_{p \to j}^{k|l}$ vectors. The indices of x1, x2, x3 (=1, 2, . . . etc) are usually equal and can refer, for instance, to the first or the second type association strength measure (given by Eq. 16, and/or 17-26).

This measure of novelty gives a high value to the relational novelty of those pairs that exhibit strong hidden association correlation but they are not explicitly strongly bonded. This measure is particularly useful for detecting hidden relationships between two OSs of interest, i.e. $OS_i^k$ and $OS_j^k$ and can be used to spot the cases worthy of further research and investigation (e.g. in scientific discovery, medical, crime investigation, genetics, market research and financial analysis etc.).

Although anvsm_$1^{k|l}$ is also one of the "relational novelty value significance measures" but in here it is preferred to be given a more distinct name as "association novelty value significance measure" (ANVSM) in order to have a distinct category for this kind of "value significance measure" in general.

To further amplify the significance of the novelty of anvsm_$1^{k|l}$ one can further incorporate the intrinsic value significance of one or both of the value significances of the $OS_i^k$ and $OS_j^k$ as, for example, the following:

$$\text{anvsm\_}2_{i \to j}^{k|l}(OS_i^k, OS_j^k) \propto \quad (52)$$

$$\frac{(\text{vsm\_}y1_i^{k|l} \cdot \text{vsm\_}y2_j^{k|l}) \times (\text{asm\_}x1_{p \to i}^{k|l} \cdot \text{asm\_}x2_{p \to j}^{k|l})}{\text{asm\_}x3_{i \to j}^{k|l}},$$

$$p = 1, 2, \ldots N$$

wherein y1 and y2 indicates the types and numbers of the "value significance measure" used in this formula.

The proportionality factor can be adjusted to account for normalization of the vectors when desired.

Eq. 51 can be re written in matrix form in general terms which is more useful as:

$$\text{ANVSM\_1}_i^{k|l} = [(\text{ASM\_x1}^{k|l})^T \times \text{ASM\_x2}^{k|l}] \cdot / \text{ASM\_x3}^{k|l} \quad (53)$$

wherein "x" shows the matrix multiplication operator and "·/" shows the element-wise division. Usually, in the preferred exemplary embodiment, in the Eq. 53 the $\text{ASM\_x}^{k|l}$ are column or row normalized.

As can be seen Eq. 51, 52 and 53 are generally the exemplary cases of the general form of:

$$\text{anvsm\_x}_{i \to j}^{k|l}(OS_i^k, OS_j^k) = g_3(\text{vsm\_y1}_i^{k|l} \cdot \text{vsm\_y2}_j^{k|l}, \text{asm\_x1}_{p \to i}^{k|l} \cdot \text{asm\_x2}_{p \to j}^{k|l}, \text{asm\_x3}_{i \to j}^{k|l}, \text{asm\_x4}_{i \to j}^{k|l}), \ldots p, i, j = 1, 2, \ldots N, \quad (54)$$

wherein $g_3$ is predetermined or predefined function and y1, y2, x1 . . . x4 etc refer to the selected type of the respective kind and type of the "value significance measure".

Numerous other forms of "value significance measures" using one or more of the introduced "value significance measures" and the concept behind them can be devised, depends on the applications, which are not further listed here, and in light of the teachings of the present invention become obvious to those skilled in the art.

II-V-III the Intrinsic Novelty

Another important situation of novelty occurrence would be to spot and find the novel OSs and the partitions of the composition regardless of their relationship and just for being intrinsically novel in the context of the composition or convey novelty wherever they appear in the composition or the BOK.

In this case we assign an intrinsic "novelty value significance measure" (NVSM) to each desired OS and then use the NVSM to weight the intrinsic novelty value of other partitions.

The first measure of novelty of course can be derived and defined based on the independent probability of occurrence so that:

$$\text{nvsm\_1}_i^{k|l} = h_1(\text{iop}_i^{k|l}), i=1,2, \ldots N \quad (55)$$

wherein $h_1$ is a predetermined function such as $h_i(x)$ be a liner function (e.g. ax+b), power of x (e.g. $x^3$ or $x^{0.53}$), logarithmic (e.g. a/log 2(x)), 1/x, etc wherein a or b might be scalar constant or a vector.

Usually the term "novelty" implies that it should be inversely proportional to the popularity or frequency of occurrence or independent probability of occurrence and therefore $\text{nvsm\_1}_i^{k|l}$ is usually more justified when the choice of $h_1$ is such that it decreases as the $\text{iop}_i$ increases. For instance one good candidate for defining and calculating a "novelty value significance measure" as a vector is:

$$\text{nvsm\_1\_1}_i^{k|l} = c/\text{iop}_i^{k|l}, i=1,2, \ldots N \quad (56)$$

wherein c might be a scalar or a constant vector. In another instance it might be defined as:

$$\text{nvsm\_1\_2}_i^{k|l} = c/\log_b(\text{iop}_i^{k|l}), i=1,2, \ldots N \quad (57)$$

or in another instance:

$$\text{nvsm\_1\_3}_i^{k|l} = c \cdot \log_b(1/\text{iop}_i^{k|l}) = -c \cdot \log_b(1/\text{iop}_i^{k|l}), i=1, 2, \ldots N \quad (58)$$

or yet in another instance:

$$\text{nvsm\_1\_4}_i^{k|l} = -c \cdot \frac{\log_b(\text{iop}_i^{k|l})}{\text{iop}_i^{k|l}} \quad (59)$$

wherein b is a constant and c could be constant or a vector. For example c can be an auxiliary vector that when multiplies to other vectors it suppresses or dampen the value of particular OSs of the compositions such as the generic words in a textual composition.

Accordingly, by the same manner, there could be defined various "novel value significance measures" if the justification is properly done. For instance with combination of one or more of the $\text{nvsm\_x}_i^{k|l}$ or other variables there could be defined more sensible and useful novelty value significances. As can be seen in Eq. 59 the $\text{nvsm\_1\_4}_i^{k|l}$ is in fact obtained by multiplication of the $\text{nvsm\_1\_1}_i^{k|l}$ and $\text{nvsm\_1\_3}_i^{k|l}$.

In another aspect the novelty is observed in relation or combination with other OSs since novelty could occurs in a context and therefore in relation to other ontological subjects. The stand alone or the intrinsic "novelty value significance value" in this case is defined as sum of the novelty that an OS will have with a desired number of other OSs.

These measures of novelty are intrinsic since it adds up all the pair-wise novelty values for each $OS^k$ so that a NVSM type 2 can be defined as:

$$\text{NVSM\_2}^{k|l}(OS_i^k) = c \Sigma_j \text{rnvsm\_x}_{i \to j}^{k|l}(OS_i^k, OS_j^k) \quad (60)$$

wherein the pair-wise novelty measures are summed over the column (i.e. the j subscript).

Similarly another type of intrinsic novelty value significance measure can be defined as:

$$\text{NVSM\_3}^{k|l}(OS_j^k) = c \Sigma_i \text{rnvsm\_x}_{i \to j}^{k|l}(OS_i^k, OS_j^k) \quad (61)$$

wherein the summation is over the rows (i.e. the i subscript). The same can be calculated using $\text{anvsm\_x}_{i \to j}^{k|l}$ as:

$$\text{NVSM\_4}^{k|l}(OS_i^k) = c \Sigma_j \text{anvsm\_x}_{i \to j}^{k|l}(OS_i^k, OS_j^k) \quad (62)$$

and also:

$$\text{NVSM\_5}^{k|l}(OS_j^k) = c \Sigma_i \text{anvsm\_x}_{i \to j}^{k|l}(OS_i^k, OS_j^k) \quad (63)$$

Or in a general form any combination of them can still serve as an intrinsic measure of novelty of the OSs of the composition as:

$$\text{NVSM\_x}^{k|l}(OS_j^k) = h(\text{NVSM\_1}^{k|l}, \text{NVSM\_2}^{k|l}, \ldots \text{NVSM\_y}^{k|l}) \quad (64)$$

wherein h is predetermined function and y is the type and number of the particular $\text{NVSM}^{k|l}$ used into building other types of $\text{NVSM\_x}^{k|l}$.

These various novelty value measures can find and have many applications in variety of applications and compositions which can be employed to investigate such composition to find and investigate the parts or partitions of novelty values. For instance they can be employed for textual composition processing such as question answering, summarization, knowledge discovery, as well as other kind of compositions like detecting novel and valuable parts in a genetic code strings, finding and filtering the junk DNA, as well as other compositions such as image and video compositions and signal processing such as edge detection, compression, deformations, re-composition to name a few.

II-VI-Transformation and Alteration of Data Objects

The parameters, vectors, and matrices of the present invention are transformation of the information hidden in the participation matrix which can be used for different applications with ease, convenience and efficiency to investigate various aspects of interests in the BOK such as extracting the most significant parts or partitions, finding the highly associated concepts or parts and partition, finding the novel part/s or partition/s of the BOK, finding the best piece of informative part of the composition, clustering and categorization of the partitions of the composition or the BOK, ranking and scoring partitions of a composition based on their relatedness to a subject matter (e.g. a query), excluding one or more partitions or OSs of the BOK or suppressing their role in the analysis, and numerous other application.

Moreover the mathematical objects and data arrays can be easily transformed to other forms, filtered out the desired part or segment of a matrix, amplify or suppress the role of one or more of the OSs of the composition and/or their values being altered numerically without needing to manipulate the input composition string or file. For instance in many of the above calculations it will be more useful to have the matrices or vectors being normalized in order to make the comparisons more meaningful in the context of the BOK. Accordingly one or more of such mathematical objects and data arrays (vectors, matrices etc.) can and might be desired to become column or row normalized or further being multiplied by other matrices or vectors as a mask or filter etc.

Moreover all these matrices (e.g. such as PM, COM, ASM/s, RASM, RVSMs NVSM, RNVSMs etc.) can be regarded as an adjacency matrix for a corresponding graph wherein the matrix carry the data of the connectivity between the nodes or objects of the graph. Therefore, from these connectivity matrixes one can proceed to calculate a corresponding eigenvalue equation/s in order to estimate and calculate other types of desirable value significance measure or in general any type of value significance. These measures of value calculated from the corresponding eigenvalue equations of the matrices are generally indication of intrinsic significance values of the OSs. For instance in the non-provisional U.S. patent applications of Ser. Nos. 12/547,879, 12/755,415 and 12/939,112 one or more of these matrices have been used to calculate the significance values of the OSs of the composition based on their centralities of the corresponding node in the graph that could be represented by that matrix. The centrality value can be, for instance, be the values of largest eigen vector of the eigen value as described in the application Ser. Nos. 12/547,879, 12/755, 415 and 12/939,112 which are incorporated here as references.

II-VI-I-Special Case Coveyers

In many cases one wants to deliberately amplify and/or dampen or suppress one or more of the values of OS of the BOK in order to achieve the right functionality out of the analysis and investigation. Therefore there could be per-built or pre-determined VSM values (e.g vectors) that can be used when it is desired to alter and influence the significance values of one or more of the OSs of the compositions. For instance these vectors or filter can be designed in such a way to amplify the significances of proper sentences of compositions written in a particular natural language such as English. For example, in another instance, the objective can be to give significance to particular types of partitions of the composition having of particular feature/s, attribute/s, or form/s. For instance when one like to hunt the partitions containing connecting or the concluding remarks then one may construct a vector that assigns a low significance value to every OS except those selected OS (e.g. words or phrases such as "therefore", "as a result", "hence", "consequently", "so that" . . . etc.). n another instance, one might have list of OSs that it is not desirable to participate in the calculation (e.g. stop words) one can provide a vector over the range of OSs having a value of one expect for those selected OS that must be omitted from the calculation.

Figure 6A:
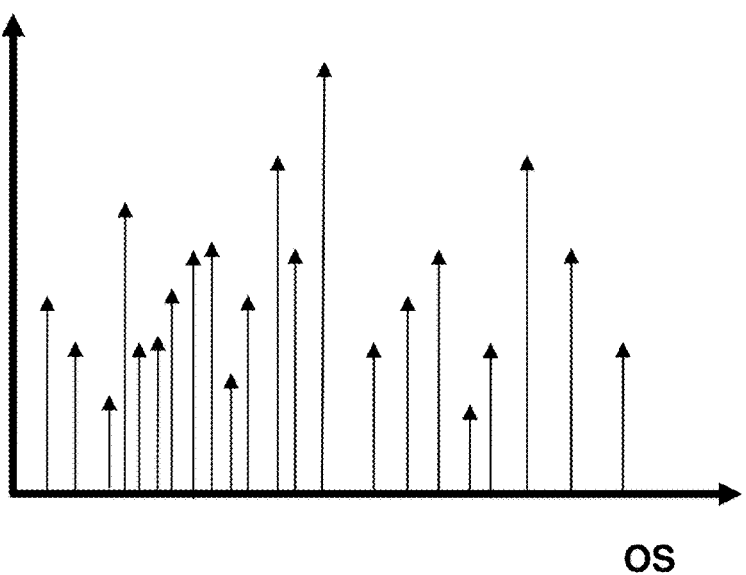
FIGS. 6a, 6b, 6c, show the exemplary values and one way of representing the values of the different conveyers of the different types of the "value significance measures".
Figure 6B:
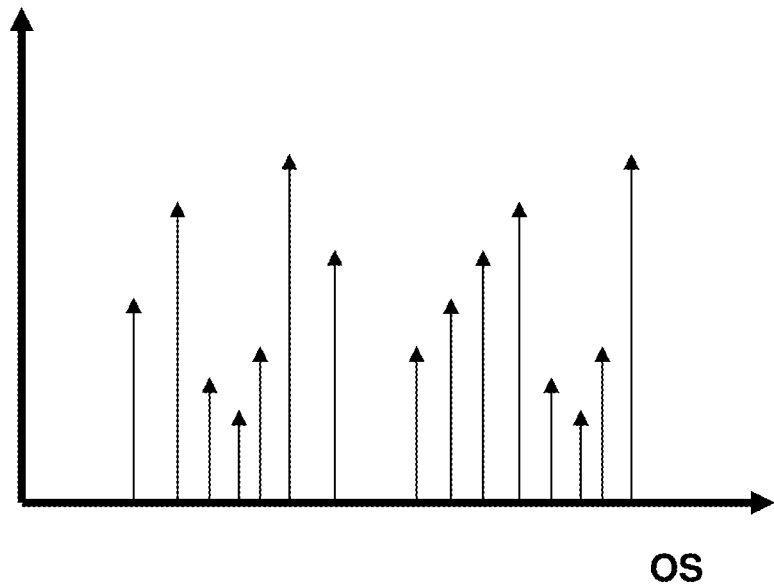
Figure 6C:
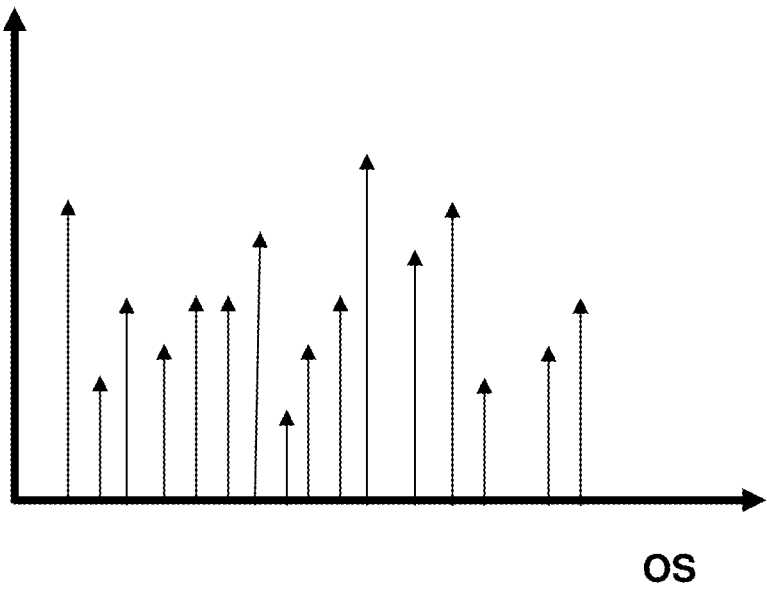

These pre-assigned vectors are called "special cases conveyers" herein or "significance value conveyer vectors" as shown in FIG. 6c, that can be used solely or in combinations with other VSM value vectors to obtain the desired functionality from the investigation. These conveyers are assigned and used based upon the goal of investigation. The special conveyers can be designed and altered for various stage of the process and can be used in different stages of calculations and processes.

II-VI-II-PM Transformation

In accordance with another aspect of the methods of investigation of the compositions of ontological subject of the present invention, the participation matrix can, for instance, routinely being transformed to other types of objects or participation matrices by operating one or more vector or matrices on the PM. For example one can multiply the PM by a diagonal matrix (M by M) from the right side whose diagonal values are the reciprocal of the number of constituent OSs of order k in the partitions or the higher order OS of order l. The "resulting PM" matrix will become a column normalized PM and values of the entries will become the weighted participation factor. For instance from a binary PM one can get to partial PM in which if a word has participated in a sentence with 5 words then its participation entry in the PM would be $\frac{1}{5}$ and if the same word has participated in a sentence with 10 words its participation entry would be $\frac{1}{10}$ and so on. In another instance, in a similar situation, it become desirable to have a "resulting PM" with column geometrical unitary (i.e. the length of the column become one), in this case therefore the elements of the diagonal matrix are the inverse of the square-root of the sum of the square of the individual elements of the original respective PM column (or row).

As another instance of transformation, moreover, the PM matrix can be multiplied from the left side by a diagonal matrix (N by N) whose entries are a vector that will put a value on the OS of the order k so that their participation weight will be altered. For instance if the diagonal of the left matrix is one except for some particular words (such as the generic words of a natural language) for which the corresponding entries are suppressed (e.g. replaced with 0.1) then the role of those particular words (e.g. the generic words) in the computations will be suppressed as well, without having to manipulate the original string of the compositions in order to achieve the same goal of suppressing the role of generic words.

As another instance of transformation and alteration, one or more auxiliary vectors (i.e. filters) can be built to dampen the significance of particular OSs of the composition by multiplying those vectors on the resulting vector objects such as one or more of the different types and number of the "value significance measures" vectors or matrices.

Moreover the method/s can conveniently be used for compositions of different nature such as data file compositions, e.g. audio or video signals, DNA string investigation, textual strings and text files, corporate reports, corporate databases, etc. For instance the investigation method disclosed herein can be readily used to investigate image and video files, such as spotting a novelty in an image or picture or video, edge detection in an image, feature/s extraction, compression of image and video signals, and manipulating the image etc. The disclosed methods of the present invention can readily be applied in applications such as, artificial intelligence, neural network training and learning, network training, machine learning, computer conversation, approximate reasoning, as well as computer vision, robotic vision, object tracking etc.

Numerous other forms of "value significance measures" using one or more of the introduced value significance measures and the concept behind them can be devised and synthesized accordingly, depends on the application, that are not further listed here but in light of the teachings of the present invention become obvious to those skilled in the art.

The disclosed frame work along with the algorithms and methods enables the people in various disciplines, such as artificial intelligence, robotics, information retrieval, search engines, knowledge discovery, genomics and computational genomics, signal and image processing, information and data processing, encryption and compression, business intelligence, decision support systems, financial analysis, market analysis, public relation analysis, and generally any field of science and technology to use the disclosed method/s of the investigation of the compositions of ontological subjects and the bodies of knowledge to arrive the desired form of information and knowledge desired with ease, efficiency, and accuracy.

Furthermore, as pointed out before, those skilled in the art can store, process or represent the information of the data objects of the present application (e.g. list of ontological subjects of various order, list of subject matters, participation matrix/ex, association strength matrix/ex, and various types of associational, relational, novel, matrices, co-occurrence matrix, participation matrices, and other data objects introduced herein) or other data objects as introduced and disclosed in the incorporated references (e.g. association value spectrums, ontological subject map, ontological subject index, list of authors, and the like and/or the functions and their values, association values, counts, co-occurrences of ontological subjects, vectors or matrix, list or otherwise, and the like etc.) of the present invention in/with different or equivalent data structures, data arrays or forms without any particular restriction.

For example the PMs, ASMs, OSM or co-occurrences of the ontological subjects etc. can be represented by a matrix, sparse matrix, table, database rows, dictionaries and the like which can be stored in various forms of data structures. For instance each layer of the a Pm, ASM, OSM, RNVSM, NVSM, and the like or the ontological subject index, or knowledge database/s can be represented and/or stored in one or more data structures such as one or more dictionaries, one or more cell arrays, one or more row/columns of an SQL database, one or more filing systems, one or more lists or lists in lists, hash tables, tuples, string format, zip format, sequences, sets, counters, or any combined form of one or more data structure, or any other convenient objects of any computer programming languages such as Python, C, Perl, Java, JavaScript etc. Such practical implementation strategies can be devised by various people in different ways.

The detailed description, herein, therefore describes exemplary way(s) of implementing the methods and the system of the present invention, employing the disclosed concepts. They should not be interpreted as the only way of formulating the disclosed concepts, algorithms, and the introducing mathematical or computer implementable objects, measures, parameters, and variables into the corresponding physical apparatuses and systems comprising data/ information processing devices and/or units, storage device and/or computer readable storage media, data input/output devices and/or units, and/or data communication/network devices and/or units, etc.

The processing units or data processing devices (e.g. CPUs) must be able to handle various collections of data. Therefore the computing units to implement the system have compound processing speed equivalent of one thousand million or larger than one thousand million instructions per second and a collective memory, or storage devices (e.g. RAM), that is able to store large enough chunks of data to enable the system to carry out the task and decrease the processing time significantly compared to a single generic personal computer available at the time of the present disclosure."

II-VII—The Exemplary Implementation Methods and the Exemplary Systems and Services This section describes few exemplary systems that can be constructed in order to demonstrate the enabling benefits of the deployment of the disclosed method/s of investigation of compositions of ontological subjects in various challenging applications and important functionalities.

As was described throughout the description the goal of the investigation is to produce a useful data, information, and knowledge from a given or accessed composition/s, according to at least one aspect of significance or the goal/s of the investigation.

The result of the investigation can be represented in various forms and presentation style and various devices of modern information technology (private or public cloud computing, wired or wireless connections, etc.). The interaction between a client and an investigator, employing one or more of the disclosed algorithms, can be facilitated through various forms of data network accessibility to an investigator through various interfaces such as web interfaces, or data transferring facilities. The result of the investigation can be displayed or provided in various forms such as interactive page/device environment, graphs, reports, charts, summaries, maps, interactive navigation maps, email, image, video compositions, voice or vocal compositions, different nature composition such as transformation of a textual composition to visual or vice versa, encoded data, decoded data, data files, etc.

For instance a goal of investigation can be to finding out the OSs of the composition scoring significant enough novelty value in the context of the given BOK or an assembled BOK wherein the OSs of the composition can be words, phrases, sentences, paragraphs, lines, document or the like for the BOK under investigation.

Another exemplary goal of investigation can be to get a summary of the credible statements from a BOK or to modify a part or partitions of a composition (e.g. a document, an image, a video clip etc.). Or another instance of investigation can be to obtain a map of relations between the most significant parts or partitions of the BOK. For instance a patent attorney, inventor, or an examiner can use the disclosed method to plan his/her claim drafting by investigation the application disclosure and get the most valuable or novel part of the disclosure to draft the claims. Or to get the map of relationships between the components (i.e. the ontological subjects) of the disclosure in order to draft a summary, an abstract, an argument, one or more claims, litigation, etc. Or the method can be used for examining the application in comparison to one or more collection of one or more patent application disclosures.

In another instance an intelligent being (e.g. a software bot/robot a humanoid, a machine, or an appliances) can use the system and methods internally or by connecting/communicating to a provider of such services to become enabled to interact intelligently with human (e.g. conversing and doing tasks, or entertaining, or assisting in knowledge discover etc.). And many numerous other examples that could be using one or more of the tools, measures and method/s given in this disclosure to get information and finding/composing the knowledge that is being desired or seek after.

Referring now to the accompanying drawings in here, few exemplary embodiments of the methods, the systems and the applications are further illustrated and explained in order to demonstrate the deployment of the teaching of the present invention.

Referring to FIG. 1 here, it depicts one general flow process and the system that can provide one or more exemplary investigation's result, as services, utilizing the algorithms and the methods of the present invention. As shown in the diagram, following the above formulations and methods of building the required variables or the mathematical or data objects (e.g. the matrices and the vectors values etc) and building the various filter, one can design, synthesize, and compose an output according to her/his/it's need or goal of investigation or informational requirements and for an input composition. For example if one applications calls for getting the most credible and valuable partitions of an input compositions then she/he/it must chose (or select through an interface) the corresponding filter (i.e. the suitable XY_VSM/s and algorithm/s) for which to obtain such a credible glance or summary of the composition. Moreover the user or the designer of such system and service can synthesize the suitable filter, using the tools, measures and methods of the present invention to provide the desired response, output or the service.

Alternatively, in another instance, if one is looking only to get the novel parts of the input composition then that can also be readily done following the teaching and computational process of the above to get the novel parts or partitions of the composition using the one or more of the novelty value significance measures.

Turning to FIG. 1 again, as seen in the FIG. 1, the input composition is used to build or generate the one or more participation matrices while the ontological subjects of different orders are grouped, listed, and kept in the short term or more permanent storage media. The actual OSs or the partitions usually are used at the end of the processing and calculations of the desired quantity or quantities, when they are fetched again based on their corresponding value for one or more measures of the values introduced in previous sections. Accordingly after having the PM/s the system will calculate the desired mathematical objects such as COM, ASM/s, the desired VSM/s, one or more RASM if needed for the desired service, one or more RVSM/s if needed for the service, one or more of NVSM/s, or RNVSM/s or ANVSM/s if desired and so on.

These data objects (e.g. matrix/es or vector/s) are used to synthesize the required filter to provide the desired functionality once it operated on the PM. After operating the filter on the PM, the output is further investigated for selection of suitable OSs of the composition for further processing or re-composing or presentation. The output can be presented in predetermined form/s or format, such as a file, displaying on a web-interface or an interactive web-interface, encoded data in a particular format for using by another system or software agent, sending by email, being displayed in a mobile device, projector and the like over a network, or sent to a client over the internet and the like.

For instance if the desired mode of operation is to find out the novel partitions of the composition exhibiting enough novelty value while having enough significance then the corresponding filter will use the RNVSM of the Eq. 39 for finding, scoring and consequently selection of the suitable partitions for this requested service.

In another word after the composition data are transformed or transported into participation matrix/matrices then we only deal with numerical calculations that will determine the value of the members of the listed OSs and (based on their index in the list or based on their row or column number in the participation matrix) once the value for the corresponding measure was calculated then those OSs that exhibited the desirable value or range of values are selected by the selector or a composer that provide the output data or content, e.g. as service, according to predetermined formats for that service.

In references to FIG. 2 now, it involves the conceptualization of the association strength measure/s. As exemplified several times along the disclosure the concept and values of "association strength measure/s" plays an important role in investigation of the composition of ontological subjects as well as providing the data that is valuable itself. That is, knowing the association strength of OSs to each other is important and can be used to build many other applications especially in artificial intelligence applications.

Accordingly, in FIG. 2 here, it is shown one general form of conceptualizing and defining the association strength measures and consequently calculating the association strength values for those measures. As seen in this exemplary embodiment the association strength of the OSs of order k that have co-occurred in one or more OSs of order l is given by a function of their number of co-occurrence and the value/s respective of one or more of the "value significance measure/s" (e.g independent probability of occurrence). Several exemplified such association strength measure were given by Eq. 16-24. The FIG. 2 was also illustrated in some details in the section II-III of this disclosure.

Figure 3:
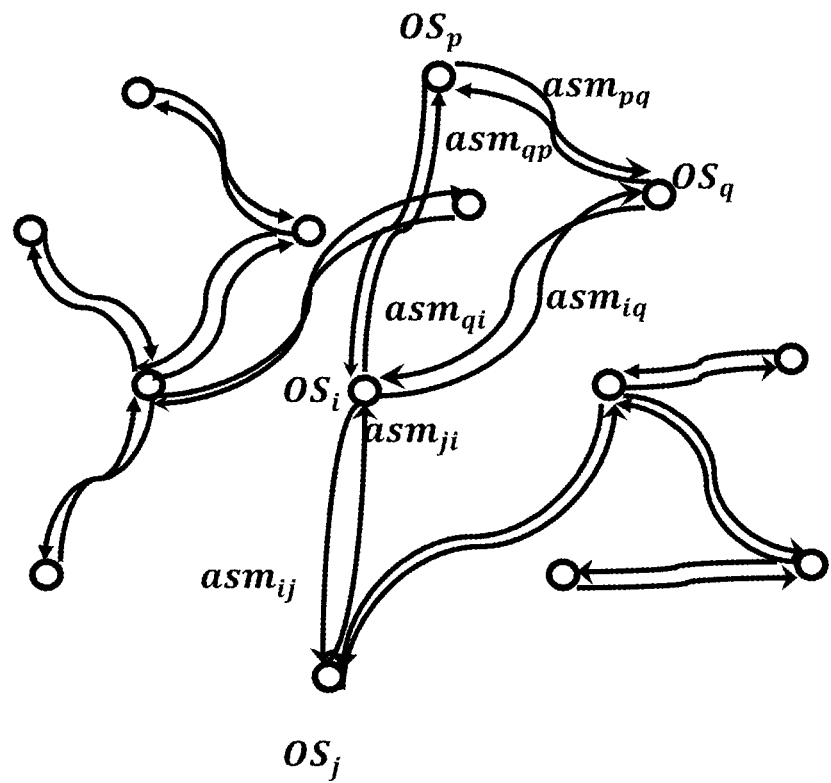
FIG. 3: shows one exemplary embodiment of a directed asymmetric network or graph corresponding to a composition of ontological subjects.

Referring to FIG. 3 now, it is to show that any composition of ontological subjects can in principal be represented by a graph which in this preferred embodiment shown as an asymmetric graph. The exemplified graph is corresponded to one of the exemplary "association strength matrix", i.e. an ASM, as representative of its adjacency matrix. The nodes represent the desired group of OSs and the edge or arrows show the link between the associated nodes and the values on the edges are representative of the association strength from one node to the connected one. This figure is to graphically exemplify and depicts that compositions of ontological subjects and a network of ontological subjects can basically be investigated and dealt with in the same manner according to the teachings of the present invention.

Figure 4:
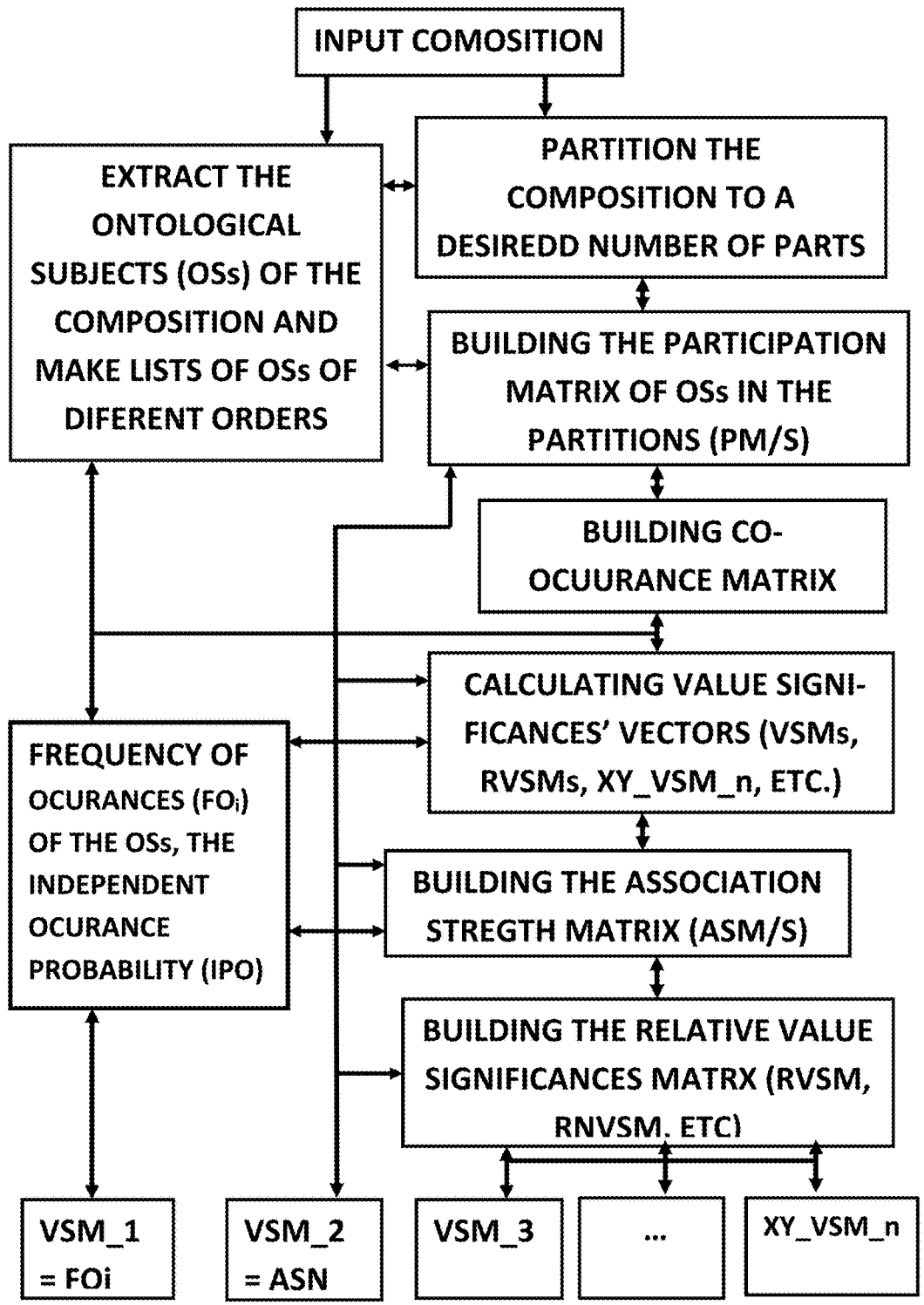
FIG. 4: shows a block diagram of one preferred embodiment of the method and the algorithm for calculating a number of exemplary "Value Significance Measures" of different types for the ontological subjects of a composition according to one embodiment of the present invention.

In FIG. 4, there is shown again another embodiment for the process of calculating various value significance measures in more details. As seen the data of the input composition is transformed to calculable quantities and data from which, employing the above methods and formulations, the desired value significance measures are calculated and/or are stored in the storage areas for further use or being used by other processes or programs or clients.

Figure 5:
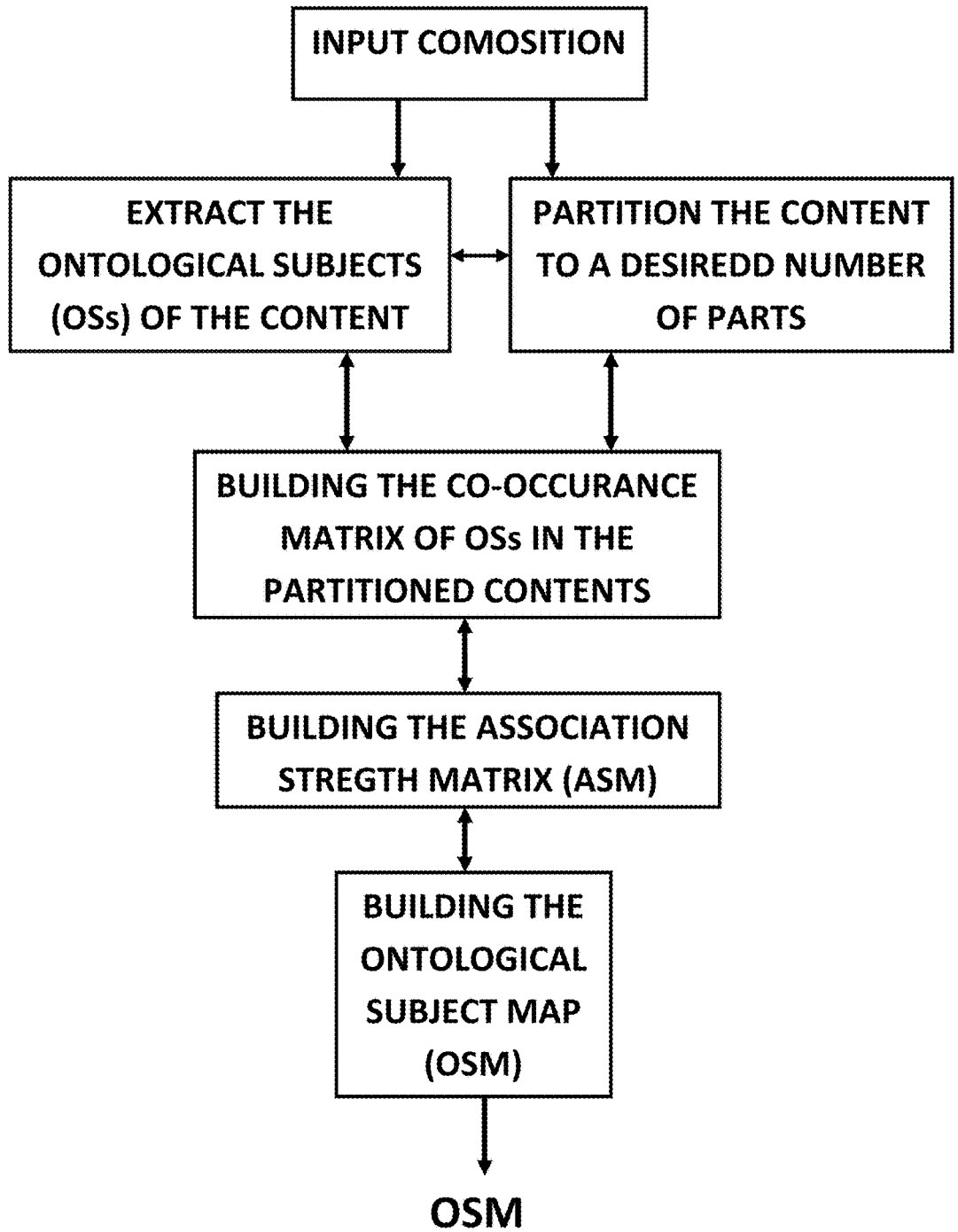
FIG. 5: shows one exemplary block diagram of the method and the algorithm of building the "Ontological Subject Maps" (OSM) from the "Association Strength Matrix" (ASM) which is built for and from an input composition according to one embodiment of the present invention.

In reference to FIG. 5, it became evident that at this stage, and in accordance with the method, and using one or more of the participation matrix and/or the consequent matrices one can also evaluate the significance of the OSs by building a graph and calculating the centrality power of each node in the graph by solving the resultant eigen-value equation of adjacency matrix of the graph as explained in patent application Ser. No. 12/547,879 and the patent application Ser. No. 12/755,415.

FIG. 5 therefore shows the block diagram of one basic exemplary embodiment in which it demonstrates a method of using the association strengths matrix (ASM) to build an "Ontological Subject Map (OSM)" or a graph. The map is not only useful for graphical representation and navigation of an input body of knowledge but also can be used to evaluate the value significances of the OSs in the graph as explained in the patent application Ser. No. 12/547,879 entitled "System and Method of Ontological Subject Mapping for knowledge Processing Applications" filed on Aug. 26, 2009 by the same applicant. Utilization of the ASM introduced in this application can result in better justified Ontological Subject Map (OSM) and the resultant calculated significance value of the OSs.

The association strength matrix could be regarded as the adjacency matrix of any graphs such as social graphs or any network of any thing. For instance the graphs can be built representing the relations between the concepts and entities or any other desired set of OSs in a special area of science, market, industry or any "body of knowledge". Thereby the method becomes instrumental at identifying the value significance of any entity or concept in that body of knowledge and consequently be employed for building an automatic ontology. The $VSM\_1, 2, \ldots x^{k|l}$ and other mathematical objects can be very instrumental in knowledge discovery and research trajectories prioritizations and ontology building by indicating not only the important concepts, entities, parts, or partitions of the body of knowledge but also by showing their most important associations.

Referring to FIG. 6a, 6b, 6c now, they show one graphical representation of the concept of the different values of different "value significance measures". As seen values of different types of value significance measures (labeled as XY_VSM wherein XY is used to show the different types of VSM/s) can be shown as a vector in a multidimensional space. Though XY_VSM/s in general are matrices that might also carry the relational value significances but still any row or column (as shown in FIG. 6 a) of them can be shown as discrete vectors in a multidimensional space. These discreet vectors can also be treated as discrete signals in which they can be further be used for investigation of the compositions. Some types of XY_VSM, that are intrinsic, are vectors (e.g. FIG. 6b) for which they can readily be used to weigh other OSs or the partitions of the composition. Also shown in FIG. 6c are some of the vectors that might be "special conveyer vectors" labeled with "significance conveyer vectors" in the FIG. 6c and are usually predefined or predetermined that can be used for filtering out and/or dampening or amplifying and/or shaping/synthesizing the VSMs of one or more of the predetermined OSs of the composition. FIG. 6c demonstrate that special conveyer vectors or VSM have basically the same characteristics as other XY-VSM except the values might have been set in advance.

FIG. 7 shows one way of demonstrating (e.g. schematically) how two exemplary value significance vectors can be extracted from an exemplary "association strength matrix" (asm) which in this instance are also shown to be used to evaluate the associations of OSs of order 1 (e.g. sentences) to particular OS of order k (e.g. a word or keyword or phrase). Generally FIG. 7 is for further clarification and instantiation of the actual meaning and their use and the way to manipulate and use, deal, and calculate the variables and data or mathematical objects that were introduced in the previous sections. However, the disclosed processes and methods with the given formulations should be enough for those of ordinary skilled in the art to enable them to implement, execute, and apply the teachings of the present invention.

An application of the instance demonstration of FIG. 7 is that an OS of order 1, can be selected by the investigator based on its strength of association to one or more OSs of the order k. The calculation and the selection method of OSs of order 1 can find an important application in document retrieval, question answering, computer conversation, in which a suitable answer or output is being south from a knowledge repository (e.g. a given composition) in response to the input query or composition. As an example, for showing how to utilize the disclosed method/s, an input statement or a query is parsed to its constituent OSs of order k and from the association strength matrix (which might be constructed from and for said knowledge repository) then the mostly related partitions of the stored composition (i.e. the knowledge repository) is retrieved in response of an input query which is a conversational statement or a question. For instance, the mostly related partition of the knowledge repository can be the partition (OS of order 1) that has scored the highest average or cumulative association to the constituent OSs of the input query. The mostly related partition of the knowledge repository might have scored the highest, for example, after multiplication of the association strength vectors of the OSs of the input query in the association strength matrix that have been built from the knowledge repository.

Figure 8:
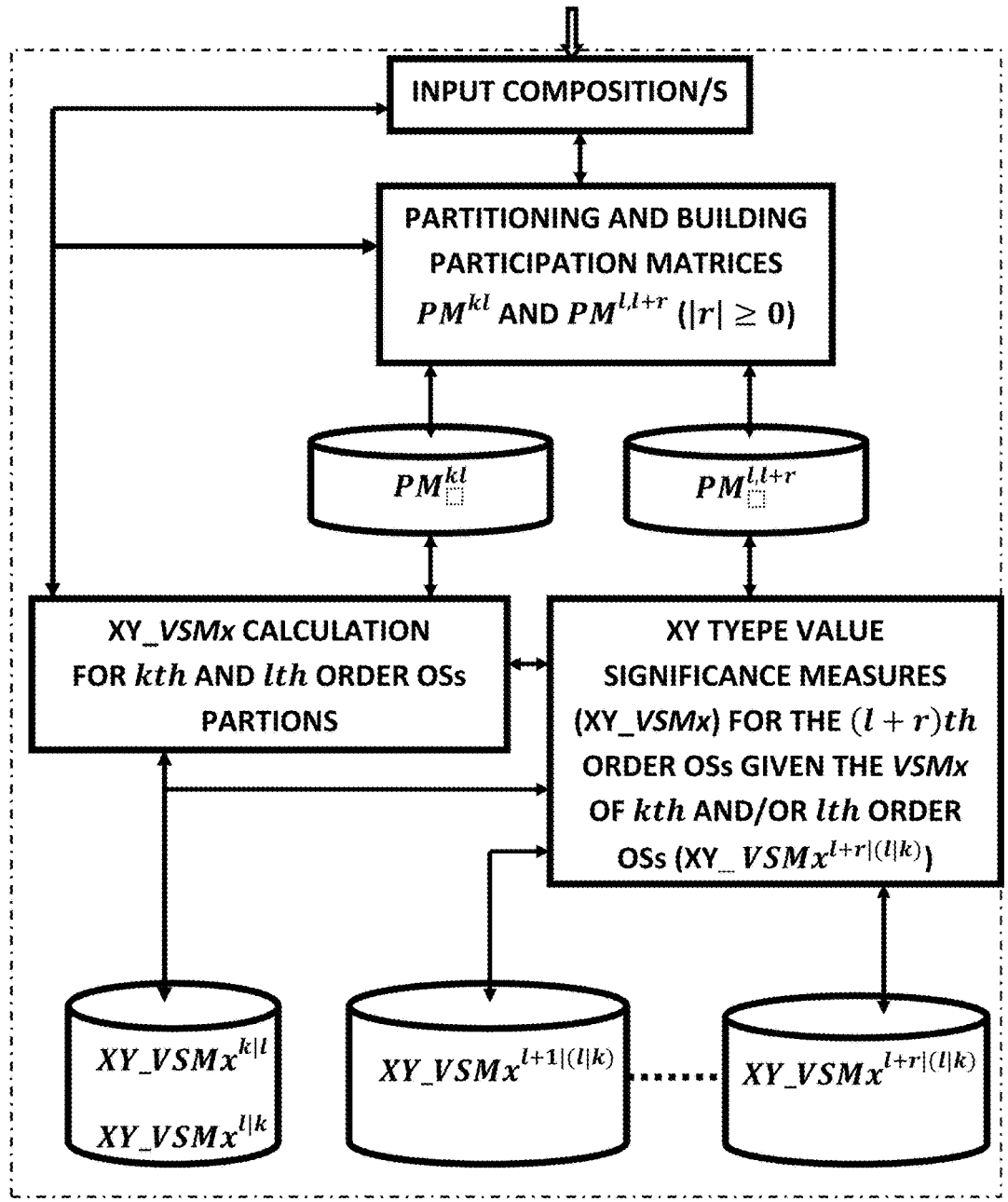
FIG. 8: is an block diagram the system and method of building at least two participation matrixes and calculating VSM for lth order partition, $OS^l$, to calculate the "Value Significance Measures" (VSM) of other partitions of the compositions, $OS^{l+r}$ and storing them for further use by the application servers according to one embodiment of the present invention.

Referring to FIG. 8 now, it shows, in schematic, a block diagram of an exemplary system as well as the process of further clarification as how to use the "value significances" data of one or more OSs of particular order to evaluate and calculate the one or more "value significances" of OSs of another order using the one or more XY_VSM and one or more participations matrix. The XY in the FIG. 8 is the indication, and can be replaced with the desired type and number combination, of the desired "value significance measure". Therefore XY_VSM in FIG. 8 can be replaced with any of the different types of the "value significance measures" (such as RVSM, NVSM, ARASM, RSVM, etc.). The data objects can be stored, if desired, for later use so that the pre-calculated data and objects are pre-made and can easily be retrieved for the corresponding compositions and the desired application. The pre-made stored data can be used to accelerate and speeding up the process of composition investigation in a system that provide such a service/s to one or more clients.

Figure 9:
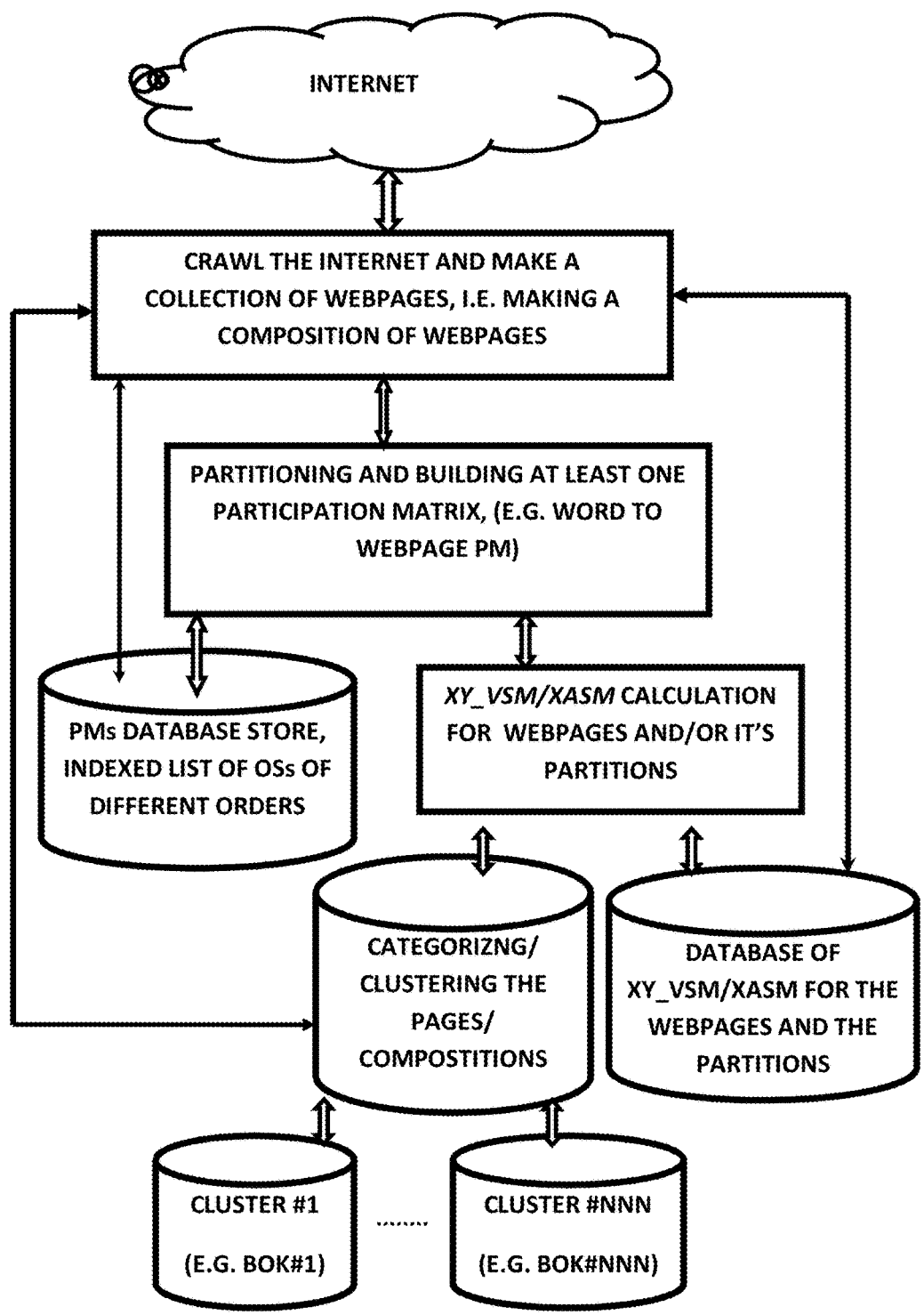
FIG. 9: a block diagram of an exemplary application and the associated system for ranking, filtering, storing, indexing, clustering the crawled webpages, from the internet or other repositories, using "Value Significance Measures" (VSM) according to one embodiment of the present invention.

Referring to FIG. 9 now it shows an exemplary system, process and application of the present invention. FIG. 9 shows an instance of clustering and ranking, and sorting of a number of webpages fetched from the internet for example, by crawling the internet. This is to demonstrate the process of indexing and consequently easily and efficiently finding the relevant information related to a keyword or a subject matter. This is the familiar but very important application and example of the present invention to be used in search engines. As seen after crawling a number of webpage or documents from the internet (or from any other repository in fact) the pages/documents/compositions are investigated so that the associations of the desired part or partitions of such collections are calculated to other desired OSs of the collection of the compositions. Now, in such a exemplary search engine, once a client enter a query or a keyword, it would be straightforward to find the most relevant document, page, or composition to the input query, i.e. or a target OS.

Accordingly, as discussed in the previous sections, having one or more of the "association strength matrix/es" (indicated by XASM) or RVSMs etc., using the disclosed algorithms make it possible to retrieve the documents with the highest degrees of relevancy to the input query or the target OS. This is one of the very important applications and implication of the disclosed teachings and materials, since, as is experienced by many users of the commercial search engines; the relevancy of retrieved documents to the input query has been and is a major challenge in improvement of the search engine performance. However, employing the investigation methods of present invention, through its various measures, make it possible to quickly and reliably retrieve the most semantically related document/page to the input query.

Furthermore, some special OSs can be selected for which the association strength of pages are to be calculated. For instance, special OSs can be the content words such as nouns or named entities. Nevertheless there would be no limitation on the selection or choice of the target OS and they can basically be all possible types of words, or even sentences and higher orders partitions.

Moreover, through the investigation of crawled pages, either in one step or in several steps, OSs of high value significance can be identified so that the whole composition (i.e. the whole collection of the documents or pages) can be clustered or categorized into bodies of knowledge under one or more target subject matter or head categories (e.g. the high value OSs of lower order, such as words or phrases).

The target OSs could usually be the keywords or phrases, or the words or any combinations of the characters, such as dates, special names, etc. However in extreme but useful case the target OSs of such composition could be the extracted sentences, phrases, paragraphs, or even a whole document and the like.

As seen from the teachings of the present invention then it becomes readily straightforward to calculate the association and relevancy of each part of such a composition (such as the webpages or documents or their parts thereof) to each possible target OSs. These data are stored and therefore upon receiving a query (such as a keyword or a question in a natural language form, or in the form of a part of text etc.) the system will be able to retrieve the most relevant partitions (e.g. a sentence, and/or paragraph, and/or the webpage) and present it to the user in a predetermined format and order.

Let's exemplify and explain this even in more detail here, when a service provider system such as a search engine, question answering or computer conversing, which comprises or having access to the system of FIG. 9, receives a query from a user, the system can simply parse the input query and extract all or some of the words of the input query (i.e. the OSs of order one) then by having calculated the associations strength of $rasm\_x^{1 \to 5}$ one can easily calculate the association strength of each of the documents (e.g. wep-pages) to the words of the input query, and eventually the documents which have the overall acceptable association strength with the selected words of the input query will be presented to the queries as the most relevant document or content.

In another exemplary method of retrieval using this embodiment the most related document or partition to the input query are identified and retrieved or fetched as follow:

extract the OSs (e.g. words) of the input query, obtain the $rasm\_x^{1 \to 5}$ vector (e.g. the association strength of a words to each other obtained from the investigation of the crawled repository of webpages consisting one or more webpages/documents) for the input words of the query, make a common association strength spectrum or vector for the input words of the query by, for example, averaging the $rasm\_x^{1 \to 5}$ vectors or multiplying them to each other, use the common association vector to identify the most related or associated documents, or sentences to the input query by multiplying the common association spectrum with the respective participation matrix (e.g. $PM^{15}$ for document retrieval and $PM^{12}$ for question answering or conversation as an example).

Moreover most of calculation can be done in advance and even for each target OSs (though not as a condition but usually the intrinsically significant OSs can be used as possible target) and therefore there could be assembled for each possible target OS a body of knowledge pre-made and pre categorized and ready for retrieval upon receiving a query by a system which has access to these data and materials. The degree of relevancy of such retrieved pages to the target OSs (e.g. the user's Queries) is semantically insured and the relevancy of such retrieved materials far exceeds the quality of the currently available search engines.

More importantly in a similar manner the engine can return for instance the document or the web-page that composed of the partitions of high novelty values, either intrinsic or relative, to the target OS/s. Therefore the engine can also filters out and present the documents or webpages that have most relevancy to the desired "significance aspect" based on the user preferences. So if novelty or credibility or information density of a document, in the context of a BOK, is important for the user then these services can readily be implemented in light of the teachings of the present invention.

Figure 10:
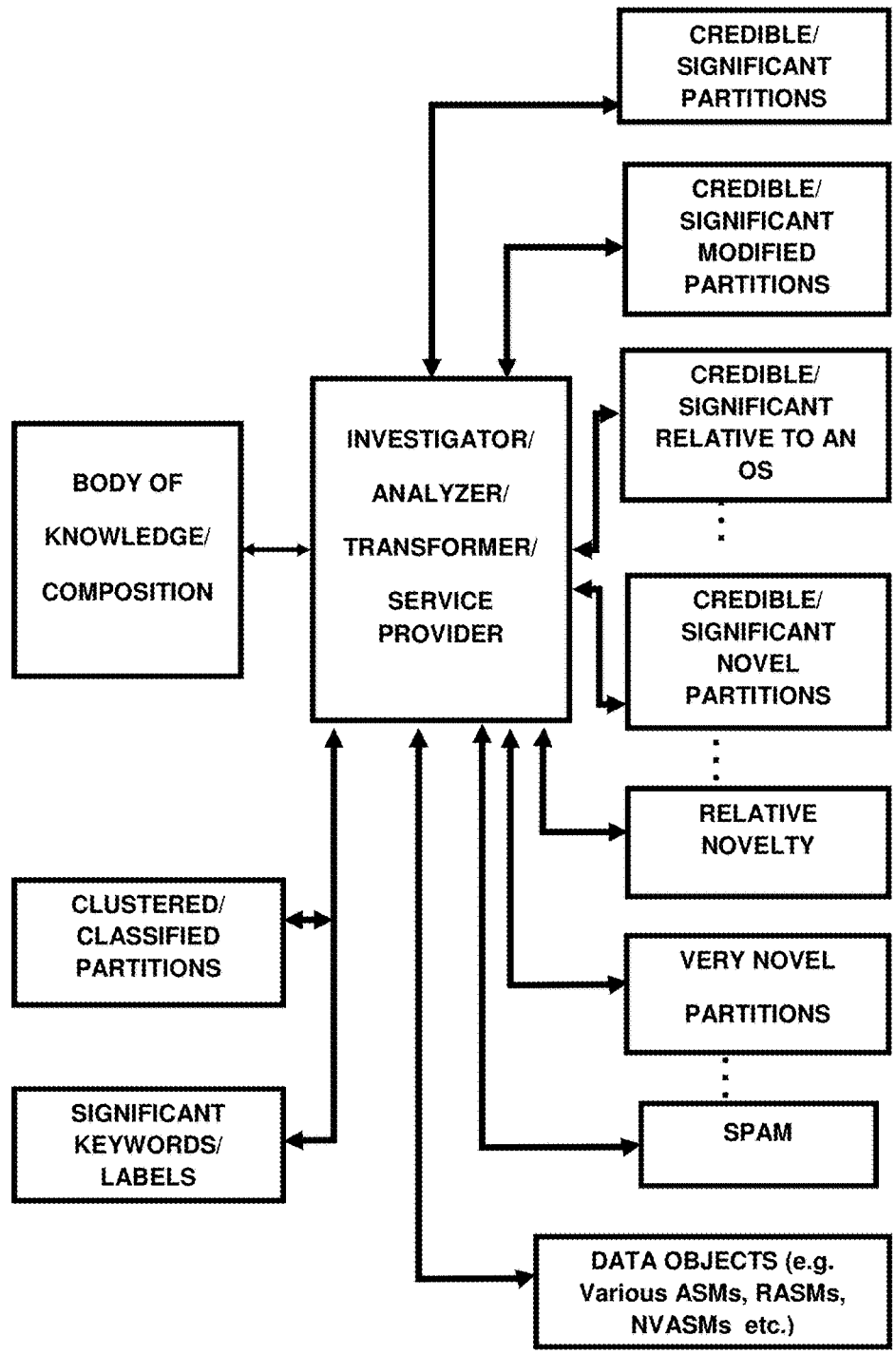
FIG. 10 is an exemplary system of investigating module/s for investigation of composition of ontological subjects providing one or more desired result/data/output according to one embodiment of the present invention.

Referring to FIG. 10 now, it shows schematically a system of composition investigations that can provide numerous useful data and information to a client or user as a service. Such output or services in principal can be endless once combined in various modes for different application. However in the FIG. 10 a few of the exemplary and important and desirable outputs are illustrated. The FIG. 10 illustrates a block diagram system composed of an investigator and/or analyzer and/or a transformer and/or a service provider that can receive or access a composition and provide a plurality of data or content as output. The investigator in fact implement at lease one of the algorithms of calculating one of the measures in order to assign a value on the part or partitions of the compositions and based on the assigned value process one or more of the partitions or OSs of the particular order as an output in the form of a service or data. The output could be simply one or more tags or OS/s that the input composition can be characterized with, i.e. significant keywords of the composition. In this instance, the significant keywords or labels are selected based on their values corresponding to at least one of the aspectual XY_VSM, i.e. one of the value significance measures.

As another example, the output or outcome of the investigator of FIG. 10, could be to provide the partitions of the input composition which have exhibited intrinsic value significances of above a predetermined threshold. Another output could be the novel parts or the OSs of the compositions that scored a predetermined level of a particular type of novelty value significance. Or the output could be the noisy part of a composition or a detected spam in a collection of compositions etc.

Several other output or services of the system of FIG. 10 are depicted in the FIG. 10 itself which are, in light of the foregoing, self explanatory.

Referring to FIG. 11 now, it shows another instance and application of the present invention in which the process, methods, algorithms and formulations used to investigate a number of news feeds and/or news contents automatically and present the result to a client. In this exemplary but important application system, the news are being first categorized automatically through finding the significant head-categories and consequently clustering and bunching the news into or under such significant head-categories and then select one or more partitions of such cluster to represent the content of that clustered news to a reader. Head-categories can simply being identified, by evaluating at least one of the significance measures introduced in the present invention, from those OSs that have exhibited a predetermined level of significance. The predetermined level of significance can be set dynamically depends on the compositions of the input news.

It is important to notice that some of data in respect to any of these features (e.g. association of OSs) can be obtain from one composition (e.g. a good size of body knowledge) in order to be used in investigation of other compositions. For instance it is possible to calculate the universal association of the concepts by investigation the whole contents of Wikipedia (using, for instance, exemplary teachings of present invention) and use these data/knowledge about the association of concept in calculating a relatedness of OSs of another composition (e.g. a single or multiple documents, or a piece or a bunch of news etc.) to each other or to a query.

Moreover other complimentary representations, such as a navigable ontological subject map/s, can accurately being built and accompany the represented news. Various display method can be used to show the head-categories and their selected representative piece of news or part of the piece of the news so that make it easy to navigate and get the most important and valuable news content for the desired category. Moreover the categorization can be done in more than one steps wherein there could be a predetermined or automatic selection of major categories and then under each major category there could be one or more subcategories so that the news are highly relevant to the head category or the sub-categories or topics.

Furthermore many more forms of services can be performed automatically for this exemplary, but important, application such as identifying the most novel piece of the news or the most novel part of the news related to a head category or, as we labeled in this disclosure, to a target OS. Such services can periodically being updated to show the most updated significant and/or novel news content along with their automatic categorization label and/or navigation tools etc.

Figure 12:
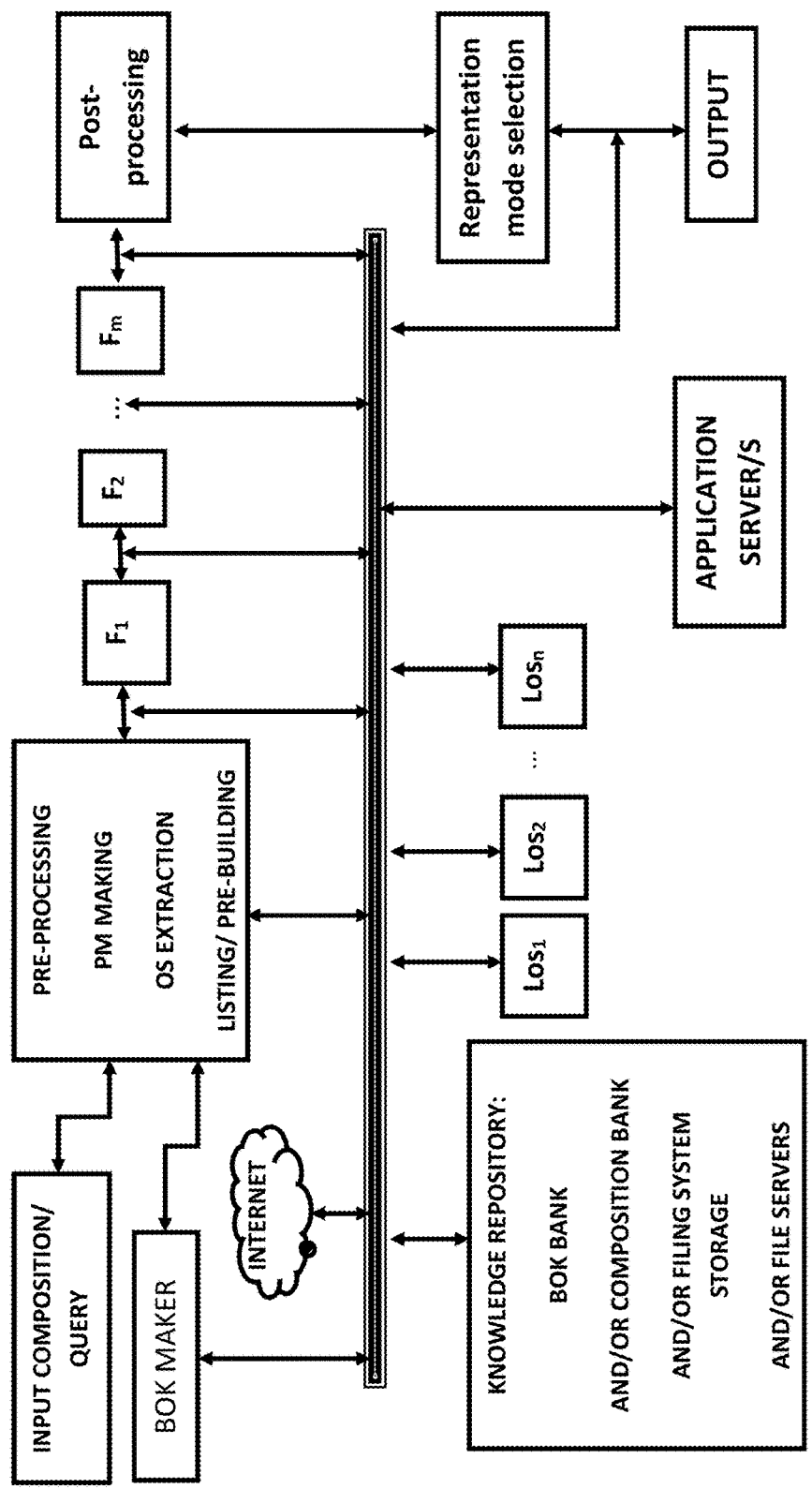
FIG. 12: is another exemplary general system of using the investigator providing various services to the clients over a communication network (e.g. a private or public) according to one embodiment of the present invention. This embodiment shows exemplary general architecture of a system in which one or more of the blocks are optional and can be omitted or one or more blocks can be added.

Referring to FIG. 12 now, it shows one general embodiment of a system implementing the process, methods and algorithms of the present invention to provide one or more services or output to the clients. This figure further illustrates the method that a particular output or service can in practice being implemented. The provider of the service or the outputs can basically utilizes various measures to select from or use the various measures to synthesize the desired sought after part/s of an input compositions. A feature to be noticed in this embodiment is that the system not only might accept an input composition for investigation but also have access to banks of BOKs if the service calls for additional resources related to the input composition or as result of input composition investigation and the mode of the service. Moreover as shown the exemplary embodiment of system of FIG. 12 has a BOK assembler that is able to assemble a BOK from various sources, such as internet or other repositories, in response to an input request and performs the methods of the present invention to provide an appropriate service or output data or content to one or more client. The filtration can be done is several parallel or tandem stages and the output could be provided after any number the step/s of filtrations. The filters $F_1, F_2, \ldots F_n$ can be one of the significance measures or any combinations of them so as to capture the sought after knowledge, information, data, partitions from the compositions. The output and the choice of the filter can be identified by the client or user as an option beside several defaults modes of the services of the system.

Another block in the FIG. 12 to mention is the post-processing block that in fact has the responsibility to transform the output of the filter/s into a predetermined format, or transform the output semantically, or basically composing a new composition as a presentable response to a client from the output/s of the filters of the FIG. 12. Also shown in this exemplary embodiment there is a representation mode selection that based on the selected service the output is tailored for that service and the client in terms of, for instance, transmission mode, web-interfacing style, frontend engineering and designs, etc.

Furthermore the exemplary system embodiment of FIG. 12 shows a network bus that facilitate the data exchange between the various parts of the system such as the BOK bank (e.g. containing file servers) and/or other storages (e.g. storages of $Los_1$, $Los_2$, $Los_3$, etc. and/or list storage/data wherein Los stands for List of the Ontological Subjects and, for instance, $Los_1$ refers to the list of the OSs of order 1) and/or the processing engine/s and/or application servers and/or the connection to internet and/or connection to other networks.

Figure 13:
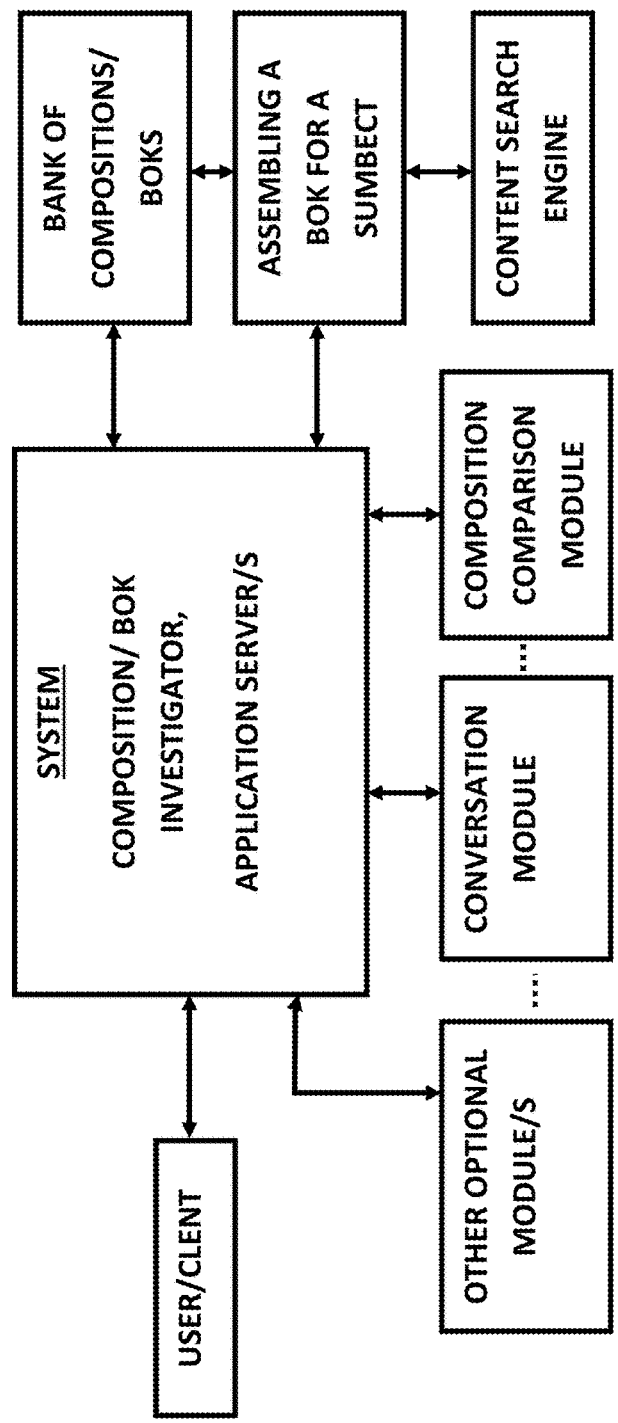
FIG. 13: is another exemplary block diagram of a composition investigation service for a client request for service according to one embodiment of the present invention. One or more functional modules can be still added to this embodiment and/or one or more of the modules can be removed or disabled.

FIG. 13 shows another general embodiment block diagram of a system providing at least one service to a client. In this figure there is a composition investigator wherein the investigator has access to a bank of bodies of knowledge or has access to one or modulus that can assemble a body of knowledge for client. Such said module can for example use search engines to assemble their BOK or from another repository or database. The system can also provide one or more of the services of the FIG. 10 to a client. For instance the system is connected to the client through communication means such as private or public data networks, wireless connection, internet and the like and either can receive a composition from the client or the system can assemble a composition or a body of knowledge for the client and/or the system can enrich or add materials to the client's input composition and perform the investigation and provide the result to the client. For example, by investigating the input composition from the client or user, the system can automatically identifies the related subject matters to the input composition and go on to assemble one or more BOK related to at least one of the dominant OSs of the input composition and offer further services or output such as the information regarding the degree of novelty of the input composition in comparison to one or more of said BOK/s and/or score the input composition in terms of credibility or overall score of the merits of the input compositions in comparison to the said BOK/s and/or identify the substantially valuable and/or novelty valuable part or partitions of the input composition back to the user or other clients or agents. In light of the disclosed algorithms and method/s of the composition investigation there could be provided a software/hardware module for composition comparisons that provide one or more of the services or the output data of the just exemplified application.

The mentioned exemplary application and service can, for instance, be of immense value to the content creators, genetic scientists, or editors and referees of scientific journals or in principal to any publishing/broadcasting shops such as printed or online publishing websites, online journals, online content sharing and the like.

Such a system can further provide, for instance, a web interface with required facilities for client's interaction/s with the system so as to send and receive the desired data and to select one or more desired services from the system.

For instance it can be used as a system of interactive and social knowledge discovery as introduced in the U.S. patent Ser. No. 12/955,496 now the U.S. Pat. No. 8,775,365 entitled "Interactive and Social Knowledge discovery Sessions" which was incorporated entirely as a reference in this application.

Also as shown in the FIG. 13, other optional modulus can be made available to the client that uses the main composition investigator and or the BOK assembler or BOK banks. A client can, for examples, be a machine, human, another software agent, an intelligent being, a remote server, or the like. One of such optional modulus can be a module for client and computer or the client and system converse or conversation. The conversations is done in such a way that the system of this exemplary embodiment with the "converse module" receives an input from a client and identifies the main subject/s of the input and provide a related answer with the highest merit selected from its own bank of BOK/s or a particular BOK or an available composition. The response from the system to the client can be tuned in such a way to always provide a related content according to a predetermined particular aspect of the conversation. For example, the client might choose to receive only the content with highest novelty yet credibility value from the system. In this case the "converse module" and/or the investigator module will find the corresponding piece of content (employing one or more of the "XY value significant measure") from their repositories and provided to the user. Alternatively, for instance, the user can demand to receive the most significant yet credible piece of knowledge or content related to her/his/it's input. The client/system conversation, hence, can be continued. Such conversation method can be useful and instrumental for variety of reasons/applications such as entertainment, amusement, educational purpose, questions and answering, knowledge seeking, customer relationship management and help desk, automatic examination, artificial intelligence, and very many other purposes.

The system, for instance can be used as a system of providing or generating visual and/or multimedia content as introduced the U.S. patent application Ser. No. 12/908,856 entitled "System And Method Of Content Generation", filed on Oct. 20, 2010, and or using the value significance measures and the maps and indexes to automatically generate content compositions as introduced in the U.S. patent application Ser. No. 12/946,838, filed on Nov. 15, 2010, now U.S. Pat. No. 8,560,599 B2 entitled: "Automatic Content Composition Generation", which were incorporated entirely as references in this application In light of the teaching of this disclosure, such exemplified modules and services can readily be implemented by those skilled in the art by, for instance, employing or synthesizing one or more the value significance measures, and the disclosed methods of investigation, filtration, and modification of composition or bodies of knowledge.

Figure 14:
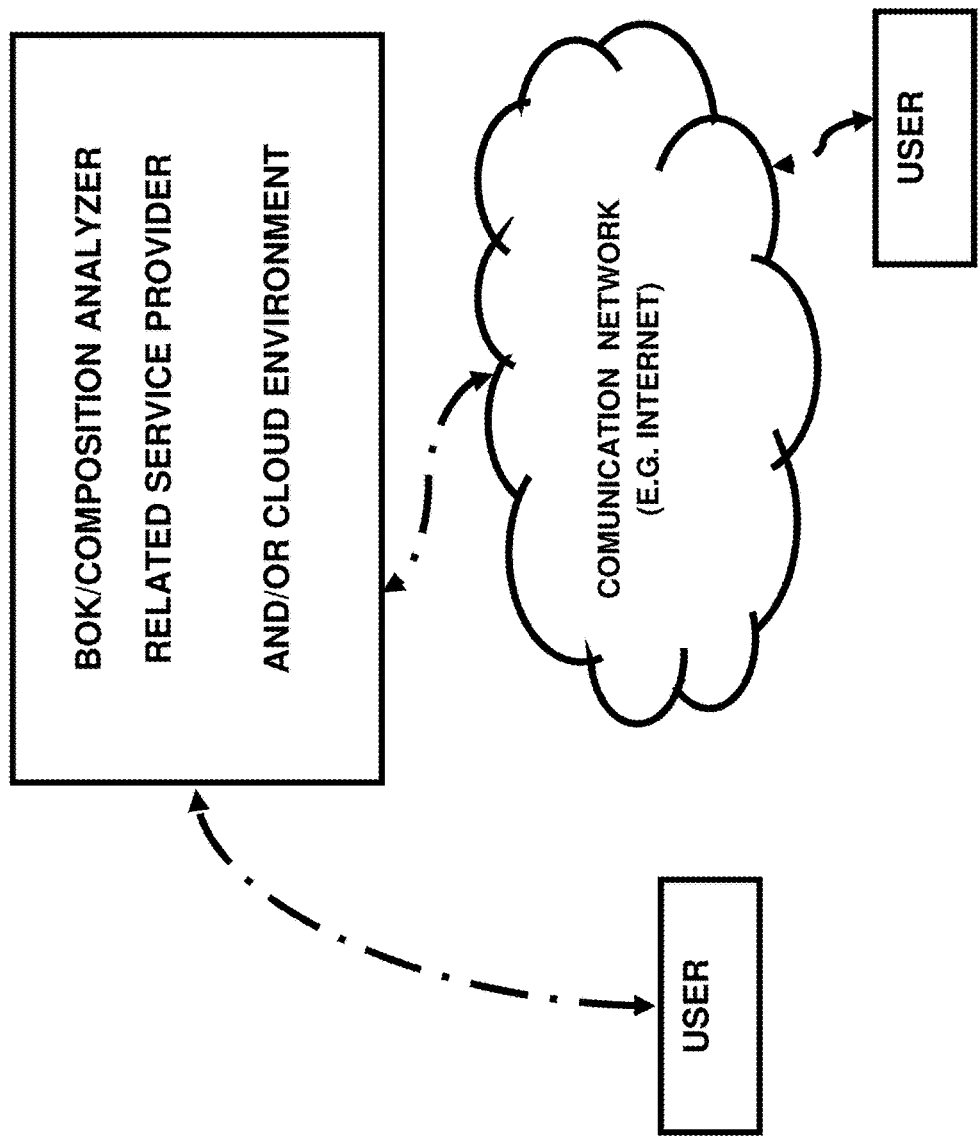
FIG. 14: An exemplary system of using the investigator providing various services to the clients in a private or public cloud environment according to one embodiment of the present invention.

FIG. 14, further exemplifies and illustrates an embodiment of a system of composition investigation that one or more client are connected to the system directly and one or more clients can optionally be connected to the system through other means of communications such as private or public data network such as wireless networks or internet. In this instance the whole system can be a private system providing such services to its user or the system is composed of several hardware and necessary software modules over a private network wherein the users can use the services of composition investigation by the system directly or over the network. Such a system can in one configuration being characterized as a private cloud computing facilities capable of interacting with clients and running the one or more of the process and algorithms and/or implement and execute one or more of the relational value significance calculations processes or implementation of one or more of the formulas or equivalent process in their software module/s to provide data/content and/or a desirable service of composition investigation to one or more client.

Figure 15:
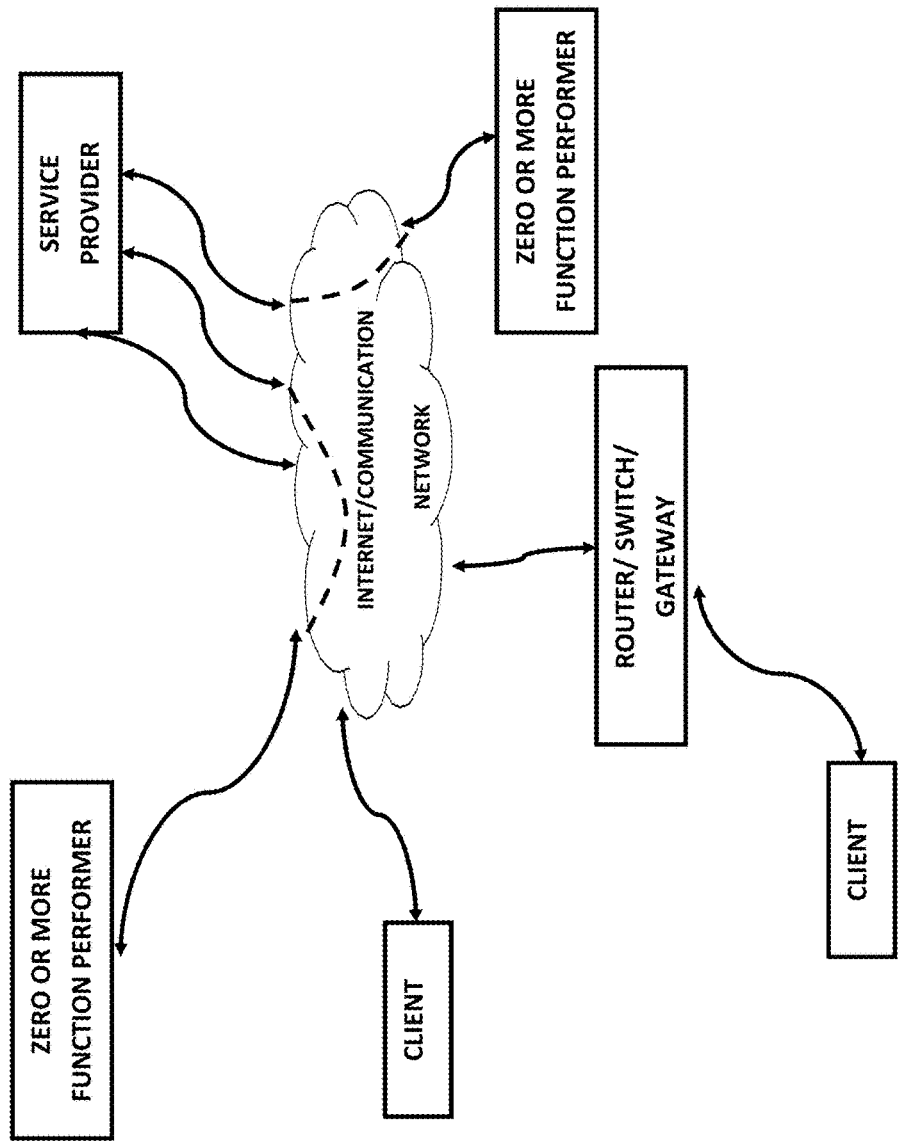
FIG. 15: another exemplary block diagram of a system of providing the various ubiquities service to one or more clients over a network wherein the system can be either localized or distributed according to one embodiment of the present invention.

FIG. 15, shows another exemplary instance of ubiquities system and service provider in which the system can/might be a distributed system and is using resources from different locations in order to perform and provide one or more of the services. One or more of the function performs as shown in FIG. 15, might be physically located across a distributed network. For instance one or more of the calculations, or one or more of the servers, the front end server, or the client's computer or device can be located in different places and still the services is performed over a distributed network. In this configuration an ISP who is facilitating the connection for a client to such a distributed network is regarded as the service provider of such service. Therefore a facilitator that facilitated (e.g. through a switch, router or a gateway etc.) at least some of the request or response data either from the client or from any part of such a distributed service is regarded as instance of such a service provider system.

The data/information processing or the computing system that is used to implement the method/s, system/s, and teachings of the present invention comprises storage devices with more than 1 (one) Giga Byte of RAM capacity and one or more processing device or units i.e. data processing or computing devices, e.g. the silicon based microprocessor, quantum computers etc.) that can operate with clock speeds of higher than 1 (one) Giga Hertz or with compound processing speeds of equivalent of one thousand million or larger than one thousand million instructions per second (e.g. an Intel Pentium 3, Dual core, i3, i7 series, and Xeon series processors or equivalents or similar from other vendors, or equivalent processing power from other processing devices such as quantum computers utilizing quantum computing devices and units) are used to perform and execute the method once they have been programmed by computer readable instruction/codes/languages or signals and instructed by the executable instructions. Additionally, for instance according to another embodiment of the invention, the computing or executing system includes or has processing device/s such as graphical processing units for visual computations that are for instance, capable of rendering and demonstrating the graphs/maps of the present invention on a display (e.g. LED displays and TV, projectors, LCD, touch screen mobile and tablets displays, laser projectors, gesture detecting monitors/displays, 3D hologram, and the like from various vendors, such as Apple, Samsung, Sony, or the like etc.) with good quality (e.g. using a NVidia graphical processing units).

Also the methods, teachings and the application programs of the presents invention can be implement by shared resources such as virtualized machines and servers (e.g. VMware virtual machines, Amazon Elastic Beanstalk, e.g. Amazon EC2 and storages, e.g. Amazon S3, and the like etc. Alternatively specialized processing and storage units (e.g. Application Specific Integrated Circuits ASICs, system/s on a chip, field programmable gate arrays (FPGAs) and the like) can be made and used in the computing system to enhance the performance and the speed and security of the computing system of performing the methods and application of the present invention.

Moreover several of such computing systems can be run under a cluster, network, cloud, mesh or grid configuration connected to each other by, data bus/es, communication ports and data transfers apparatuses such as switches, data servers, load balancers, gateways, modems, internet ports, databases servers, graphical processing units, storage area networks (SANs) and the like etc. The data communication network to implement the system and method of the present invention carries, transmit, receive, or transport data at the rate of 10 million bits or larger than 10 million bits per second;"

"Furthermore the terms "storage device, "storage", "memory", and "computer-readable storage medium/media" refers to all types of no-transitory computer readable media such as magnetic cassettes, flash memories cards, digital video discs, random access memories (RAMSs), Bernoulli cartridges, optical memories, read only memories (ROMs), Solid state discs, and the like, with the sole exception being a transitory propagating signal.

These applications and systems are presented to exemplify the way that the present invention method of investigation might be employed to perform one or more of the desired processes to get the respective output or the content, answer, data, graphs, analysis, and service/s etc. Several modes of services and further applications are exemplified herebelow.

The processes and systems of FIGS. 8-15 can be an on premises system, an intelligent being, or a network system of computation and processing, storage medium, displays and interfaces, and the associated software.

In another instance the systems and processes of the FIGS. 8-15 can be a remote system providing the service in the form of cloud environment for one or more clients providing one or more the services mentioned above.

Yet in another instance the system can be a combination of an on premises private cloud/machine computation facilities connected to a public cloud service provider. These familiar mode of operation characterized as public and/or private and/or hybrid cloud computing environment (either distributed or central, on premises or remote, private or public or hybrid) is known to the skilled to art and the disclosed methods of investigations of compositions of ontological subjects can be performed in variety of topologies which is regarded as service provider system employing one or more of the generating methods/s of output data respective of one or more of the disclosed methods of the investigation of a composition of ontological subjects.

An interesting mode of service is when for an input composition and after investigation the system yet provides further related compositions or bodies of knowledge to be looked at or being investigated further in relation to the one or more aspect of the input composition investigation. Another service mode is that the system provides various investigation diagnostic services for the input composition from user.

Another mode of use is when an intelligent being make connection or communicate with the system of composition investigation (i.e. the brain) by way of communication networks to provide desired services (e.g. conversing, telling stories, talking, instructing, providing consultancy, generating various content, manufacturing, etc.). In another instance the currently disclosed method/s and system/s is implemented within the intelligent being or used to realize new intelligent beings.

Furthermore the method and the associated system can be used as a platform so that the user can use the core algorithms of the composition investigation to build other applications that need or use the service of such investigation. For instance a client might want to have her/her website being investigated to find out the important aspects of the feedback given by their own users, visitors or clients.

In another application one can use the service to improve or create content after a through investigation of literature.

In another instance the methods and systems of the present invention can be employed to provide a human computer conversation and/or computer/computer conversation such as chat-bots, automatic customer care, question answering, fortunetelling, consulting or any general any type of kind of conversation.

In another mode a user might want to use the service of the such system and platform to compare and investigate her/his created content to find out the most closely related content available in one or more of such content repositories (e.g. a private or public, or subscribed library or knowledge database etc.) or to find out the score of her/his creation in comparison to the other similar or related content. Or to find out the valuable parts of her/his creation, or find a novel part etc.

As seen there could be envisioned numerous instance of use, products, beings, and applications of such process and methods of investigating that can be implemented and utilized by those of skilled in the art without departing from the scope and sprit of the present invention.

II-VIII—Artificial Intelligent Systems Using Neural Networks

As disclosed in the U.S. patent application Ser. No. 14/607,588, filed on Jan. 28, 215, entitled "Association strengths and value significances of ontological subjects of networks and compositions" a network of objects is considered a composition and vice versa. Accordingly the methods of investigation disclosed here are applied to build new applications, services and products. Accordingly a network of ontological subjects can be a representative for a composition and vice versa. In particular artificial neural networks are therefore a form or a representative of a composition of ontological subjects itself whose associations of its ontological subjects (e.g. connections between nodes of the network) are to be known.

The popularity of the neural networks and the so-called deep learning is due to its potential ability to train a network of connecting nodes to become able to map a certain set of data (e.g an input dada) to a desired set of data (e.g. the output data).

Currently the connection weight between nodes of a neural network is obtained by various training algorithms and processing which are generally rooted in stochastic gradient decent type of algorithms.

These methods are prone and notorious for non-converging ( . . . which result in relinquishing many of the useful parts of the neural net concept in general) or being non reliable for critical tasks (they can be fooled by slight noise introduction in the input data of such).

In training of such system having a good initializing of the state/s of such network (e.g the initial weight or weight function between connecting nodes) is of vital importance for the success of the training, ability and overall performance of the trained neural network system.

Referring to FIG. 11-A now, here we like to use the disclosed methods for building and training an artificial neural network for various e applications such as categorizations, recognition, content generation or utterance generation. In here we show an exemplary multilayer neural network comprises of a number of neurons in each layer. The whole network can have very many layers (e.g. hidden layers to provide extra degrees of freedom for optimization) each node can be considered or assigned with an ontological subjects of predefined order (e.g. such as each node in the first layer can be represented of a textual word) the second layer.

Each node (e.g. a neuron or perceptron) in each layer is connected to a number of other nodes in its preceding layer and to a number of nodes on its consequent layer. The role of neural network is to learn the impact of each input/neuron to other neuron in other layers either directly or indirectly (through hidden layers).

The fundamentals of neural networks and more recently deep learning neural networks are straightforward and is known in the literature. Basically the aim of learning/or training of a neural network is to find or adjust the weight/impact of each node to/from its connecting nodes.

The training of any reasonably useful neural network however is not a trivial undertaking needing a large number of highly specialized processing devices (e.g expensive Graphical Processing Units) and a long training time.

In FIG. 11-A, it can be shown that a matrix of N×M will map the N inputs of the network in FIG. 11-A to the desired number of outputs (e.g M).

Lets call such a matrix A which would be a N×M matrix and itself can be decomposed to number of ( . . . in fact it can be decomposed to infinite number of other matrixes) like the followings:

Matrix $A$ with dimetion of $N \times M = A1(\text{dimention } N \times M1) \times$ $A2(\text{dimentions } M2 \times M3) \times \ldots An(\text{dimentions } Mn \times M)$ wherein A1, A2, . . . An are matrixes with dimensions specified in the above equations. Each intermediate matrix can be corresponded to the connections of nodes of adjacent layers. These intermediate matrixes show the connection and the weight of the connections between nodes of adjacent layer or back propagating connections from other layers. Computationally and in practice training of a neural network starts/initialized with a randomly populated matrixes and the values are changes and varied through various computational algorithms until the desired results are achieved satisfactorily. Such desired results from the network could be that the network become able to classify an image correctly with high degree of probability, or distinguishes an audio signal and extract or convert the audio signal to its corresponded or equivalent text, and/or translating text/voice between languages etc.

Regardless of the application of a neural network, however, each of these intermediate, matrices that will collectively make the whole neural network to perform a task, are to be fund which is the goal of neural networks learning algorithms. It is conceptually easy to see that if a node (i.e. a neuron) is connected to/from another node so they would have some sort of relationships and or, using the terms of this disclosure, some types of associations and relationship with each other.

Accordingly it is easy to see that the goal of neural of network training algorithms is in fact trying to find a degree or a force intensity or influence or in other word the strength of the associations between the nodes that make up the neural network.

Now considers that nodes of the first layer are corresponded to Ontological subjects of order i and the nodes of a second layer are corresponded or representatives of Ontological subjects of order j (i and j can be the same or equal) and . . . .

For instance, in an exemplary embodiment shown in FIG. 11-A, nodes of the first layer can be regarded or been representative of textual words of a natural language such as words of English languages as input to a system of networks of nodes (e.g. Neural Networks, the so called deep learning neural nets, or any other network of objects with some data processing function). The nodes in the second or third layer can be representatives of sentences or English words again (i=j) whereas the nodes of third layer can be representative of word phrases, sentences, paragraphs, textual templates (sentence template, paragraph templates containing one or more words), and so on. Same can be said for other layers between the input and output layer. (Same can be done for various sets of partitions of images and pictures as will be discussed ore specifically in the next section).

Currently to find such relationship between theses nodes the neural net needs to be trained with huge number of data sets and corpuses in order to have relatively a meaningful working neural network and sensible output.

Without going into the details of shortcoming of such training and drawbacks of neural network to perform intelligent tasks, here it is aimed to use the data objects (e.g. various association strength matrices, various significance values etc.) of this disclosure which are obtained or built by exercising the teachings of this disclosure to build a neural networks both in hardware or software shape with the initial connections and weights are obtained by calculating for example ASM of different types and order and if it is needed further train the neural network to even function better. Said neural network further can be implemented as various classes/types of recurrent neural networks, convolutional neural networks, recursive neural networks, neural history compressor, feed forward neural networks and the like.

The advantage of using ASM/s to build a neural network is threefold as outlined next,
1. First: using the data of ASM/s we would know which nodes has to be connected to each other rather than blindly connecting every node to every other node. Currently to get a satisfactory result one have to have very large number of neurons at each layer (in order of millions to billions) and connecting the nodes to each other as much as possible in order to have enough parameters to play with to eventually synthesize an unknown function (e.g. the artificial intelligent brain). Using the data of associations from this disclosure therefore can reduce the size of the neural network significantly.

2. Secondly, since the data (e.g the entries of ASM matrix or connection weight between the nodes) are close to their actual values in really world, further adjustments to improve the performance of the artificial neural network would converge much quicker while the performance of the whole network (as an artificial brain) would be significantly enhances.

3. Thirdly, Since we have introduced various data objects and various types of associations and relationships between the ontological subjects of a composition or very large set of compositions the neural network become programmable and therefore the designer of such systems has control and insight into to working mechanics of the artificial intelligent system (e.g. a robot or self-driving car/robot etc) which employs an artificial network of ontological subjects (e.g neural network). In this way the designer of such system have advance knowledge and expectation form the system whereas currently the neural networks are trained by brute forces and sheer processing power of processing devices such as NVidia graphical processing accelerators.

To summarize this section the disclosure introduces an artificial intelligent system which uses the various data objects of from the investigator of FIG. 10 to build and train further a network of ontological subjects (a neural net is an instance of network of ontological subjects) to perform intelligent tasks and to implement machine learning by investigating one or more bodies of knowledge to learn about the world.

There could be two different systems to build the AI system here. Onne is that the investigator is part of the system and second is that the AI system (e.g. The hardware or software system) uses the data objects of the investigator in order to learn and train itself much faster, using minimal number nodes as necessary and much efficient while become much more affordable.

Such a system then is incorporated into mechanical systems such as special purpose or general purpose robots and intelligent systems and machines.

II-IX—Investigation Visual Compositions and Image Processing

In this section another instantiation, application and system of image processing is presented. The system of image processing is basically the system of FIG. 10, wherein, as shown in FIG. 11-B, exemplary illustration is given as how to apply the methods of this disclosure to process image data and gain them.

After the processing of the image/s, the system of image processing can classifies related or similar images, through calculating various Association and Significance values of Ontological Subjects of visual nature and order.

As seen in FIG. 11-B, one can initially partitions an image or a movie frame down to its individual RGB components of its pixels as Ontological subjects of order zero, then regards a pixel as composition of RGBs or more conveniently as OSs of order 1, then, for example, every two adjacent pixels (horizontally and/or vertically as desired) as OSs of 2, and every 2 of OSs of order 2 as OSs of order 3 and so on. In this particular illustrations, for example, an OSs of order k is in fact composed of $2^{2(k-2)}$ (for k>2) pixels. Obviously one may elect to partition the image in another fashion and user different order for any certain number of pixels.

In this way we become able to transform the information of a picture into existence of such ordered ontological subjects into each other through constructing data objects or one or more data structures corresponding to the participation matric/es of various order as described and defined several times along this disclosure and/or the incorporated references herein.

Further the lists of OSs of particular order defined for visual objects can be a set (all identical OSs represented with one of such) or be listed as they appear in the picture.

Setting the ordered ontological subjects of the picture will make the PMs less data intensive resulting faster processing and shortening the image processing task thereof. Furthermore sometimes said setting can also enhance the functionality of the process and lessen the clutters. For instance, if the desired function of the process is to categorize the visual objects, setting the OSs may help to reduce unnecessary noise beside the data processing effect.

For some other applications however, it might be desirable to keep all the OSs of any order as they appeared in the picture. In this case index of that OSs in a PM also bears the geometrical information of that OSs (partitions of the picture) in the picture.

For instance the index of the ontological subjects (the index of the column or the rows that each OS will be represented in the participation matrix) bears a very important information about a picture and can be used geometrically to characterize a picture. For instance the ratio of the j index of significant OSs of order 3 of the picture can be used as further information to characterize the picture. New data objects and Matrix/es can be constructed to convey the information of some of the selected OSs of certain order of the image frame/picture respect to each other. Furthermore gain, such geometrical information and/or their ratio can be normalized so that they can be used for comparing to other processing needs (correlating a picture in a standard way to a group of other pictures).

Again, the data objects of the present invention (e.g. varicose PMs, ASMs, VSMs, vectors or matrices) can be adequately described as being a representation of points in a Hilbert space and linear transformations of the data objects does not have drastic effect on the quality and continuity of the investigation results. Most other transformation (such as rotating an image, i.e. rotating the data of its corresponding participation matrix, or other mathematical operations on the data objects) also would not cause a discontinuity type of effect on the behavior of the result of desired data, e.g the result of a novelty detection or finding significant partitions/segments or edge detection etc, of an image. In other words the disclosed image processing method is much more robust and process efficient than the image processing with neural networks, or deep learning, convolutions neural nets, and classical image processing methods.

Nevertheless as is the case with the textual compositions, the result of investigation of visual compositions, e.g. the presented image processing, can be used to build a more efficient and compact neural networks than building a heuristically large neural network. Moreover the data objects that are generated after investigations of a body knowledge, composed of a number of images, can be used to initialize the neural networks for further training. Since the data of the investigation results (e.g. ASMs, VSMs, RASMs and other data objects of this disclosure) like) are obtained from existing and real images (or in general exhibiting ontological subjects rather than randomly possibly existing Ontological subjects) a deep learning network built and initialized (by using the data of the presented investigation method of compositions of ontological subjects) is more likely to converge, and converge faster.

The process is efficient in doing intelligent actions and decision making based on a received or input image/picture. Another advantage of using the present invention as a method of image processing in application ranging from computer vision, navigation, categorization, content generation, gaming and many more, is that the method/s is less sensitive to the orientation and angle and almost invariant since many data objects are built during the investigation that are assigned to segments of deferent sizes of the image. Accordingly using or more of these data objects or a combination of different ASM/VSM measures and the information that are extracted from the images during the investigation process, one can assign a distinguishable signature to an input images.

Once the image is partitioned into segments of predefined sizes or pluralities of ontological subjects of different orders calculating then obtaining data objects of interests become similar to the described in detailed methods for the textual compositions (see Eq. 1-64).

Accordingly the system of image processing based on the teaching of this disclosure become able to provide all functionalities of FIG. 10. An exemplary application therefore would be in computer vision for clustering or classification of images characterization of images, and then acting upon such characterization and recognition.

In particular, for robot visions, autonomous robots, intelligent expert (e.g. medical assistant robots), autonomous or semi-autonomous transportation robots (e.g. self-driving car, truck, drone, self-flying objects, etc.).

Once an image is characterized and its relation to a cluster, category or class become known (e.g. see the incorporated co-pending U.S. patent application Ser. No. 15/589,914) a system/machine, comprising the images processing/ investigation of the present disclosure, can issue further instructions or signals to be used by other systems or parts (e.g. another the machine, software, robot, intelligent being etc). Such systems/machines can therefore achieve a cognition and understanding of their surrounding environment. Further using the present disclosure method of investigation of compositions such systems and machines are capable of conversing and exchanging data and knowledge not only with other machines but also with human by conversing with human clients through human consumable languages or content such as voice or machine generated multimedia content.

For instance using the Novel relational associations measure (E.q. 1-38 and 39 onwards) the investigator system of FIG. 10 become able to distinguish movements and their speed (as shown in FIG. 11-B visual OS s can be traced by their indices in the partitioned images and therefore partitions of the consequent images of live a camera (i.e. movie frames) can be traced and their identity and motion can be calculated by using their indices in the partitioned image.

One particular use of the methods and algorithm of this disclosure in this would be ranking of the images based on relational value significances using association strengths values of Ontological Subjects of different order.

An interesting system is for image recognition when ranking an input image as how that could be related to an ontological subjects (for example how an image is close or contain certain object or living thing etc.) for instance whether there is tree in the image.

In such system for this application the system of FIG. 10 comprising data processing or graphical processing units have the details of a tree picture along with partition as number of sets of ontological subjects of predefined order as been illustrated in FIG. 11-$b$.

Then among a body of compositions of images we can identify whether an input images contain certain ontological subject (considering that one can regard a whole image of tree/tress as OS of order 4, 5, or higher) then its constituent partitions such single pixels as OS order 1, 2 pixel partitions as set of OSs of order 2, 4 pixel partitions as set of OSs of order 3, 16 pixels partitions as set of OSs of order 4 and so on.

One can find the associations of the partitions of the picture and using some or all the Eqs. 1-64 to build data structures, programming a GPU, program an FPGA, design a system on chip, design and build an application specific computing devices such as ASIC using silicon or III-V materials, a data processing apparatus comprising one or more computing or data processing devices, and to evaluate or score or rank the relevancy of an input image/picture to a target or desired image/picture, category, concept, function, signal, or instructing a machine or order a machine to perform a desired task or operations.

For example how closely an input image or picture is related to certain entity/ies, like a Cat, a Tree, a House, A car, A passenger, a movable objects (as the target Ontological subject). Or when there are very number of images then use the method for classification and categorization of images.

Of course the image/pictures can be preprocessed by known digital signal processing to do for example, rotate the input picture once or more with certain angle, change the orientation, resize the image/picture to a predefined pixel size, or a desired height and width, or predefined dimension (e.g every picture transformed re scaled, or resizes to 320*320 pixels or to a 1000 by 1000 pixels, or one Mega pixels etc.) Further the range of possible combinations (R, G, B), with or without the pixel depth data, can be changed or reduced. For example the image/picture can be transformed to gray scale only, or range of pixel color be reduced to a desired number of colors, e,g. from 256×256 x256 number of colors be reduced to 16×16×16 number of colors or the like.

Using the novel type of association or novel relational association, a computer vision system is built using the one or more of the investigation methods of this disclosure or using the data objects of the investigator to interpret and track the novelty to their corresponding ontological subjects (e.g. a cat is moving near a tree) in order to build a computer vision system to be used in systems requiring vision cognitions (e.g. using in humanoid Robots and/or self-deriving car/robots or drowns security systems etc.)

In practice, the data volume an image frame or an image file is way more than the data of an average text file. Accordingly the processing time of an image frame especially if it is a high definition image, is considerably higher. Also consider that usually the image in some scenarios or embodiments is processed with a large number of other pictures of the same category or a diverse group or number of images.

Therefore, in one exemplary method, application, and system of image processing with teachings of this disclosure we use graphic processing units, each having one or more processing cores, coupled with enough random access computer readable memories (e.g. RAMs) to accelerate the computing speed.

One or more graphic processing units are programmed to receive an image frame, for instance from a video port, process the image encoded image data to partition the image and extract the constituent Ontological subjects of different order, build the participation matrix/es, build one or more Association strength measure between ontological subjects of the said image. The ASM could be calculated for Ontological subjects of the same order or different order, each order corresponds to partition or a segments of various size of the image (as described before). Further building data structures corresponding to value significance of the portions of at least one order. Further calculate other data objects of various type such RASM, RNASM, VSMs, NVSMs, and any other desired data objects expressed by Eq. 1-65 to investigate the image or group of images as outlined in FIG. 10 for example. And further execute the instructions by the processing units to do at least one of the exemplary applications disclosed in this disclosure (such as clustering a large number of images into one or more categories, novelty detection, summarization, recognition, tagging, transforming to text, reconstruction of an image with certain desired features, construction of other images, new image creation etc.) or further process the image to do other desirable functions based on the data of the investigation results. The processing units further or coupled with other processing devices can control other machines, artificial limbs, robots or decide on further actions and/or executing other functions and processing.

II-X—Summary

The disclosed frame work along with the algorithms and methods enables the people in various disciplines, such as artificial intelligence, robotics, information retrieval, search engines, knowledge discovery, genomics and computational genomics, signal and image processing, information and data processing, encryption and compression, business intelligence, decision support systems, financial analysis, market analysis, public relation analysis, and generally any field of science and technology to use the disclosed method/s of the investigation of the compositions of ontological subjects and the bodies of knowledge to arrive the desired form of information and knowledge desired with ease, efficiency, and accuracy. Since the disclosed underlying theory, methods and applications are universal it is worth to implement in the system of executing the methods and products directly on processing chips/devices to further increase the speed and reduce the cost of such investigations of compositions. In one instance, for example, the data processing operations (e.g. vector/matrix manipulations, manipulating data structures, association spectrums calculations and manipulation, etc.) and even storage of the data structures, is implemented with designs of Application Specific Integrated Circuits (ASICS), or Field-Programmable Gate Arrays, (FPGA), or the system-on-chip, based on any computing and data processing device manufacturing platforms and technologies, such as silicon based, III-IV semiconductors, and quantum computing artifacts to name a few. Similarly, if the disclosed methods of the investigation and applications are going to be used in/with implementing neural or cognitive based type of computations, still one can implement the system on such chips and by said technologies. Accordingly, those competent in the art can implement the disclosed methods for various applications/products in/with various data processing device manufacturing and designs on the physical material level.

The invention provides a unified and integrated method and systems for investigation of compositions of ontological subjects. The method can be implemented language independent and grammar free. The method is not based on the semantic and syntactic roles of symbols, words, or in general the syntactic role of the ontological subjects of the composition. This will make the method very process efficient, applicable to all types of compositions and languages, and very effective in finding valuable pieces of knowledge embodied in the compositions. Several valuable applications and services also were exemplified to demonstrate the possible implementation and the possible applications and services. These exemplified applications and services were given for illustration and exemplifications only and should not be construed as limiting application. The invention has broad implication and application in many disciplines that were not mentioned or exemplified herein but in light of the present invention's concepts, algorithms, methods and teaching, they becomes apparent applications with their corresponding systems to those familiar with the art.

Among the many implications and application, the system and method have numerous applications in knowledge discovery, knowledge visualization, content creation, signal, image, and video processing, genomics and computational genomics and gene discovery, finding the best piece of knowledge, related to a request for knowledge, from one or more compositions, artificial intelligence, realization of artificially or new intelligent begins, computer vision, computer or man/machine conversation, approximate reasoning, as well as many other fields of science and generally ontological subject processing. The invention can serve knowledge seekers, knowledge creators, inventors, discoverer, as well as general public to investigate and obtain highly valuable knowledge and contents related to their subjects of interests. The method and system, thereby, is instrumental in increasing the speed and efficiency of knowledge retrieval, discovery, creation, learning, problem solving, and accelerating the rate of knowledge discovery to name a few.

It is understood that the preferred or exemplary embodiments, the applications, and examples described herein are given to illustrate the principles of the invention and should not be construed as limiting its scope. Those familiar with the art can yet envision, alter, and use the methods and systems of this invention in various situations and for many other applications. Various modifications to the specific embodiments could be introduced by those skilled in the art without departing from the scope and spirit of the invention as set forth in the following claims.

What is claimed is:

1. A visual investigation system comprising:
   a first one or more computing or data processing devices, operationally coupled to a first one or more non-transitory computer-readable storage devices;
   accessing one or more reference data structures, stored in a second one or more computer-readable non-transitory storage media, corresponding to a previously investigated collection of images, wherein at least one image from said collection of images is at least 100 pixels wide in each image dimension, said one or more reference data structures are built by a system comprising:

i. a second one or more computing or data processing devices, operationally or communicatively accessing to the second one or more non-transitory computer-readable storage devices,
ii. having access to said collection of images,
iii. reading one or more image, from said collection of images, and accessing the one or more images data through the second one or more non-transitory computer-readable storage devices,
iv. partitioning each image of said one or more images into at least two groups of partitions wherein each partition of each of said groups is composed of a predefined number of pixels,
v. accessing one or more sets of image partitions wherein each member of each set of said sets of partitions is composed of a predefined number of pixels, wherein said each set of partitions is premade or is obtained by setting the partitions of at least one of the groups of partitions of the one or more images to form one or more sets of partitions wherein each set is assigned with predefined order and each member of each set is composed of predefined number of pixels,
vi. building one or more participation data structures indicating participations of two or more partitions from one set of partitions, having a first order, into two or more partitions from another set of partitions having a second order,
vii. calculating numerically, by the second one or more computing or data processing devices, association strengths between two or more of the partitions from the set of partitions of the first order or partitions from the set of second order, by processing the data of one or more participation data structures, and build a data structure corresponding to association strength spectrum for at least one of the partitions from one of said sets of partitions, assigned with the first or the second predefined order,
viii. calculating numerically, by the second one or more computing or data processing devices and assigning a value significance number to two or more of the partitions of said first order, said value significance is calculated from combinations of one or more measures of significances comprising:
  a. frequency or probability of occurrences of a partition of particular order in one or more images,
  b. novelty value significances,
  c. associational value significances,
  d. relational value significances,
  e. relational novelty value significance,
  f. intrinsic novelty value significance,
  g. association novelty value significance,
ix. recognizing one or more parts of the one or more images based on the value significances and association strength of a number of partitions, having certain range of value significances or association strength to each other,
x. selecting one or more partitions of each recognized parts of the one or more images and build a signature data structure, comprise of association spectrums of said one or more selected partitions, corresponding to said each recognized parts of the one or more images,
xi. grouping or clustering said signature data structures of the one or more recognized parts of the one or more images of said collection of images into one or more clusters of signature data structures, by evaluating association strengths between said one or more signature data structures, and storing at least one of the signature data structure for each of said clusters in the second one or more non-transitory storage media, as the one or more reference data structures, accessing a given image and recognizing one or more parts of the given image by performing the steps of iii to x, processing the signature data structure of a recognized part of the given image with said one or more reference data structures, and outputting an ontological subject corresponding to the one or more recognized parts of the given image, whereby a machine can act upon the one or more recognized parts of the given image, thereby giving the machine the ability to visually become aware of its environment.

2. The visual processing system of claim 1, further comprising one or more computing or data processing devices and executable instructions operable to cause the one or more computing or data processing devices to re-scale at least one of the images to a different cell width and cell height.

3. The visual processing system of claim 1, further comprising executable instructions operable to cause the first one or more computing or data processing devices to cluster said one or more images from the collection of images into at least one cluster by calculating association strengths of each of said set of one or more images to each other, based on at least one measure of association strength.

4. The visual processing system of claim 1, further comprising one or more computing or data processing devices and executable instructions operable to cause the first one or more computing or data processing devices, to evaluate or score or rank the relevancy of an input image to a desired target, wherein said desired target is one or more of: an image, a category, a concept, a function, or a signal.

5. The visual processing system of claim 4, further comprising executable instructions operable to cause the first one or more computing or data processing devices, to instruct a machine to perform a task or operations based on said score of relevancy of the input image to one of said desired targets.

6. The visual processing system of claim 1, further comprising computer vision system and executable instructions operable to cause the first one or more computing or data processing devices to calculate novel type of association or novel relational association between the partitions of said one or more images.

7. The visual processing system of claim 1, wherein the images are partitioned into two or more pluralities of partitions assigned with predefined orders wherein each partition of each plurality of partitions, assigned with a predefined order k and k>=1, having $2^{k-1}$ number of pixels.

8. The visual investigation system of claim 1, wherein said one or more participation data structures also indicate the geometrical locations of the partitions in the image.

9. The visual investigation system of claim 1, wherein said first one or more data processing or computing devices are the second one or more data processing or computing devices.

10. The visual investigation system of claim 1, wherein said first one or more non-transitory computer-readable storage devices is the second one or more non-transitory computer-readable storage devices.

11. A non-transitory computer readable medium having executable instructions operable to cause one or more computing or data processing devices, operationally or communicatively coupled with one or more non-transitory computer-readable storage devices, to process a body of knowledge composed of one or more images, wherein at least one image from the one or more images is at least 100 pixels wide in each image dimension, comprising:

reading an image, from the one or more images, and accessing the image data, generating two or more groups of partitions from the image by partitioning the image into at least two groups of partitions wherein each partition of each of said groups is composed of a predefined number of pixels, accessing one or more sets of image partitions wherein each member of each set of said sets of partitions is composed of a predefined number of pixels, said predefined number is larger than one, wherein said each set of partitions is premade or is obtained by setting the partitions of at least one of the groups of partitions of the image to form one or more sets of partitions wherein each set is assigned with predefined order wherein each member of each set is composed of predefined number of pixels, building one or more participation data structures indicating participations of two or more partitions from one set of partitions, having a first order, into two or more partitions from another set or group of partitions having a second order, calculating numerically, by the one or more computing or data processing devices, an association strength between two or more of the partitions from the set of partitions of the first order or partitions from the set of second order, by processing the data of one or more participation data structures, and build a data structure corresponding to association strength spectrum for at least one of the partitions from one of said sets of partitions which is assigned with the first or the second predefined order, calculating numerically, by the one or more computing or data processing devices and assigning a value significance number to two or more of the partitions of said first order, said value significance is calculated from combinations of one or more measures of significances comprising:
        a. frequency or probability of occurrences of a partition of particular order in one or more images,
        b. novelty value significances,
        c. associational value significances,
        d. relational value significances, recognizing one or more parts of the image based on the value significances and association strength of a number of partitions, having certain range of value significances or association strength to each other, and the geometrical information of the partitions contained in the one or more participation data structures, selecting one or more partitions of each recognized parts of the image and build a signature data structure, comprise of association spectrums of said one or more selected partitions, outputting an ontological subject corresponding to the one or more recognized parts of the image for further processing by a client machine.

12. The non-transitory computer readable medium of claim 11, further comprising executable instructions operable to cause the one or more computing or data processing devices, to re-scale at least one of the at least one image to a different cell width and cell height.

13. The non-transitory computer readable medium of claim 11, further comprising executable instructions operable to cause the one or more computing or data processing devices, to cluster said set of one or more images into at least one cluster by calculating association strengths of each of said one or more images to each other, based on at least one measure of association strength.

14. The non-transitory computer readable medium of claim 11, further comprising executable instructions operable to cause the one or more computing or data processing devices, to evaluate or score or rank the relevancy of an input image to a desired target, wherein said desired target is one or more of: an image, a category, a concept, a function, or a signal.

15. The non-transitory computer readable medium of claim 14, further comprising executable instructions operable to cause the one or more computing or data processing devices, to instruct a machine to perform a task or operations based on said score of relevancy of the input image to one of said desired targets.

16. The non-transitory computer readable medium of claim 11, further comprising computer vision system and executable instructions operable to cause the one or more computing or data processing devices, to calculate novel type of association or novel relational association between the partitions of said body knowledge.

17. The non-transitory computer readable medium of claim 11, wherein the image is partitioned into two or more pluralities of partitions assigned with predefined orders wherein each partition of each plurality of partitions, assigned with a predefined order k and k$>=$1, having $2^{k-1}$ number of pixels.

18. The non-transitory computer readable medium of claim 11, wherein said one or more participation data structures also indicate the geometrical locations of the partitions in the image.

\* \* \* \* \*